(12) United States Patent
Kim

(10) Patent No.: US 8,964,365 B2
(45) Date of Patent: Feb. 24, 2015

(54) PORTABLE DISPLAY APPARATUS

(76) Inventor: Si-Han Kim, Gwangju (KR)

( * ) Notice: Subject to any disclaimer, the term of this patent is extended or adjusted under 35 U.S.C. 154(b) by 168 days.

(21) Appl. No.: 13/509,645

(22) PCT Filed: Nov. 16, 2010

(86) PCT No.: PCT/KR2010/008110
§ 371 (c)(1),
(2), (4) Date: May 14, 2012

(87) PCT Pub. No.: WO2011/059301
PCT Pub. Date: May 19, 2011

(65) Prior Publication Data
US 2012/0274570 A1 Nov. 1, 2012

(30) Foreign Application Priority Data

Nov. 16, 2009 (KR) .................. 10-2009-0110228

(51) Int. Cl.
*H05K 5/00* (2006.01)
*H04M 1/02* (2006.01)
*G06F 1/16* (2006.01)

(52) U.S. Cl.
CPC ........... *H04M 1/0237* (2013.01); *G06F 1/1624* (2013.01); *G06F 1/1647* (2013.01); *H04M 1/0266* (2013.01); *H04M 2250/16* (2013.01)
USPC .................................................. 361/679.04

(58) Field of Classification Search
USPC .................................................. 361/679.04
See application file for complete search history.

(56) References Cited

U.S. PATENT DOCUMENTS

| 6,532,146 | B1 * | 3/2003 | Duquette ................. 361/679.04 |
| 7,936,558 | B2 * | 5/2011 | Chang ..................... 361/679.04 |
| 8,018,715 | B2 * | 9/2011 | Chang ..................... 361/679.04 |
| 2006/0012951 | A1 * | 1/2006 | Kim ............................... 361/681 |
| 2006/0268500 | A1 * | 11/2006 | Kuhn ............................. 361/683 |
| 2007/0127195 | A1 * | 6/2007 | King, Jr. ....................... 361/681 |
| 2007/0127196 | A1 * | 6/2007 | King, Jr. ....................... 361/681 |
| 2007/0232368 | A1 * | 10/2007 | Feightner et al. ........... 455/575.1 |
| 2008/0144265 | A1 * | 6/2008 | Aoki ............................. 361/681 |
| 2008/0192416 | A1 * | 8/2008 | Kim ............................... 361/681 |
| 2008/0247128 | A1 * | 10/2008 | Khoo ............................. 361/681 |
| 2008/0253073 | A1 * | 10/2008 | Kee et al. ...................... 361/681 |
| 2008/0266767 | A1 * | 10/2008 | Nicholas et al. .............. 361/681 |
| 2010/0124006 | A1 * | 5/2010 | Chang ..................... 361/679.04 |

(Continued)

FOREIGN PATENT DOCUMENTS

| KR | 10-2004-0024939 | 3/2004 |
| KR | 10-2004-0025624 | 3/2004 |

(Continued)

*Primary Examiner* — Forrest M Phillips
(74) *Attorney, Agent, or Firm* — Lexyoume IP Meister, PLLC

(57) ABSTRACT

Stacked panel housings are stretched to join displays to each other to form a single screen, the stacked panel housings are stretched and two displays are jointed to each other to form a single screen. Horizontal sliding means and vertical moving means can be provided so as to displace the stacked displays to be flush with each other. A portable display device is provided which has at least two panel housings vertically stacked and displays mounted on the panel housings, respectively, in which the displays horizontally slide and then vertically move so as for the displays of the panel housings to be contiguous to each other. When the displays are contiguous to each other, the distance between the displays is in the range of 0.1 mm to 5 mm and a joint between the displays is provided with a lid.

25 Claims, 97 Drawing Sheets

(56) References Cited

U.S. PATENT DOCUMENTS

2011/0043990 A1* 2/2011 Mickey et al. ............ 361/679.04
2011/0105189 A1* 5/2011 Lee et al. ...................... 455/566
2013/0021734 A1* 1/2013 Singhal .................... 361/679.04
2013/0128439 A1* 5/2013 Walters et al. ............ 361/679.04

FOREIGN PATENT DOCUMENTS

| KR | 10-2005-0108706 | 11/2005 |
| KR | 10-2006-0030143 | 4/2006 |
| KR | 10-2006-0122633 | 11/2006 |

* cited by examiner

PORTABLE DISPLAY APPARATUS

TECHNICAL FIELD

The present invention relates to a technique of using two displays as a single screen, and more particularly, to a structure in which two or more panel housings mounted with a display are stacked and the displays are horizontally joined to each other with a gap of 0.1 mm to 5 mm so as to function as a single display by causing the panel housings to slide.

BACKGROUND ART

In order to enlarge a screen of a portable display device, two displays are joined to each other to form a single screen. Various flat displays such as an LCD, an OLED, an FED, a PDP, and an electric paper can be used for this purpose. That is, any flat display can be used, as long as it has a flat panel display structure The portable display device includes plural panel housings that can slide and has a structure in which the displays are contiguous to each other when the displays are mounted on the panel housings, respectively.

One side of each display is designed to minimize a non-display area between the displays. That is, by arranging such displays, one side of which is designed effectively, to be contiguous to each other, the joint therebetween is minimized.

However, in order to cause the displays to slide relative to each other to be flush with each other, effective sliding means and vertically-moving means should be provided, which have not been proposed.

DISCLOSURE OF THE INVENTION

Technical Problem

An advantage of some aspects of the invention is to cause two displays to be joined to each other to form a single screen when stacked panel housings slide to be continuous to each other. Another advantage of some aspects of the invention is to provide horizontal sliding means and vertical moving means for displacing stacked displays so as to be flush with each other.

Solution to Problem

According to an aspect of the invention, there is provided a portable display device having at least two panel housings which are vertically stacked and displays which are mounted on the panel housings, respectively, in which the displays horizontally slide and then vertically move so as for the displays of the panel housings to be contiguous to each other, wherein when the displays are contiguous to each other, the distance between the displays is in the range of 0.1 mm to 5 mm and a joint between the displays is provided with a lid.

A support supporting the upper panel housing may be provided, the support may move through the use of the upper panel housing and a spring assembly, and the spring assembly may be compressed or expanded when a force is applied thereto and may be restored when the force is released. A lower lid covering the side surface of a joint of the lower display may be provided to the lower panel housing and the lower lid may be vertically movable.

The displays may be directly mounted on a frame housing, display main elements may be disposed at the lower end of the frame housing, and a connection connecting the displays to each other may be provided to the frame housing. A support supporting the upper panel housing may be provided to extend outward from the boundary of the lower panel housing.

The thickness of one of the two panel housings may be smaller than that of the other. The distance between input units disposed on the displays may be in the range of 0.1 mm to 5 mm

Advantageous Effects of the Invention

When at least two panel housings having a display mounted thereon are joined to each other to form a single screen, the stacked panel housings are stretched and two displays are joined to each other to form a single screen. Horizontal sliding means and vertical moving means can be provided so as to displace the stacked displays to be flush with each other.

BRIEF DESCRIPTION OF THE DRAWINGS

FIG. 64 is a diagram illustrating an example where the portable display device is used to input characters or the like.

20, 40: PANEL HOUSING, 2, 4: DISPLAY
50: HOUSING, 45: GRIP
43: PROTECTIVE LID, 20a, 40a: SIDE WALL
16: CHASSIS, 250: INPUT UNIT
2n: JOINT-NEIGHBORING PIXEL, 2f: PARTITION WALL
2g: BOUNDARY, 250n: LEAD LINE
250f: PARTITION WALL, 8: JOINT
51, 52: SUBSTRATE, 16d: MASK PRINT
26a, 26b, 26c, 26d: SUPPORT, 20c: STEPPED PORTION
20d: PROTRUSION, 24: UPPER COVER
20b: PROTECTIVE FILM, 30: INTERMEDIATE SUPPORT
30a, 30b: INTERMEDIATE PLATE, 2k: DRIVER
2i: SUPPLY LINE, 200, 400: INPUT UNIT
250-1, 250-2: INPUT UNIT, 105: BODY CONTROLLER
130, 140: DRIVING UNIT, 135: SENSOR
110: CONTROL UNIT, 51: LID
5a: SLIDING GROOVE, 51a: INNER SIDE SURFACE

DETAILED DESCRIPTION OF THE INVENTION

The invention provides a foldable portable display device in which at least two flat displays are jointed to each other to for a single screen. Examples of the flat display include an LCD, an OLED, an FED, a PDP, and an electric paper. Any display can be used as long as it is a flat display.

When panel housings vertically stacked are stretched, two displays are joined to each other within a gap of 0.1 mm to 5 mm therebetween to form a single screen.

Hereinafter, exemplary embodiments of the invention will be described with reference to the accompanying drawings.

Embodiment 1

Figure 1:
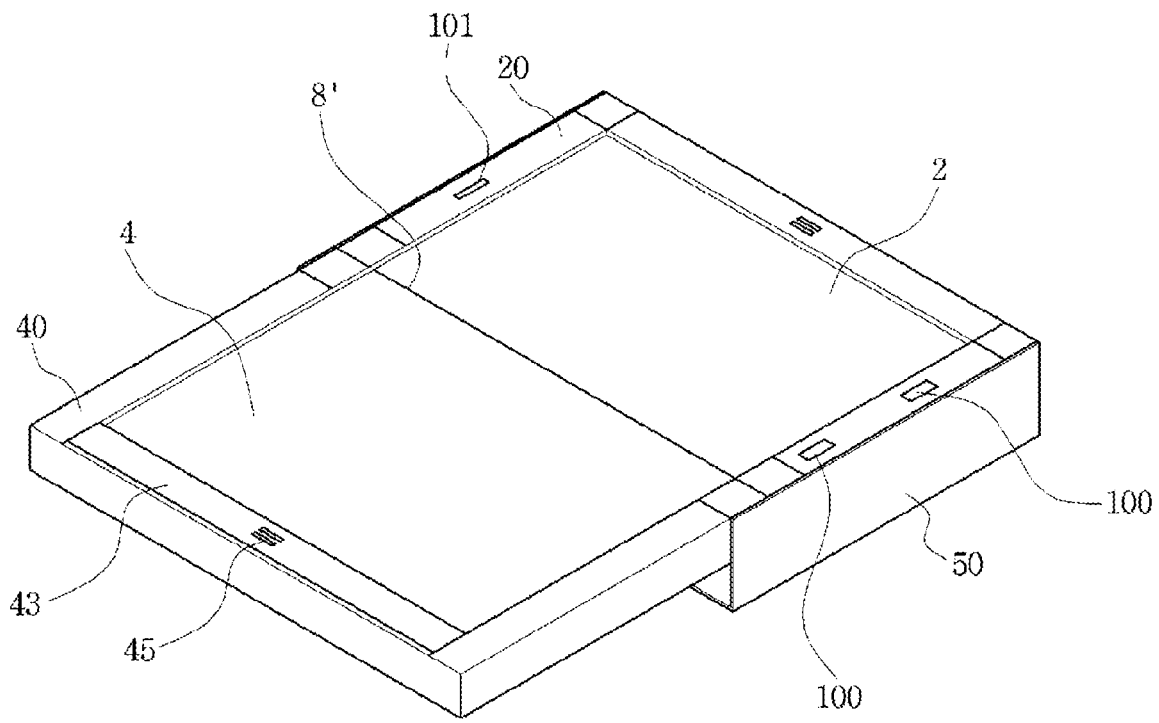
FIG. 1 is a diagram illustrating a portable display device according to the invention.

FIG. 1 is a diagram illustrating a portable display device according to the invention.

FIG. 1 shows a state where displays 2 and 4 are stretched. A upper panel housing 20 is provided with an upper display 2 and a lower panel housing 40 is provided with a lower display 4. The upper and lower panel housings 20 and 40 are included in a housing 50.

Figure 2:
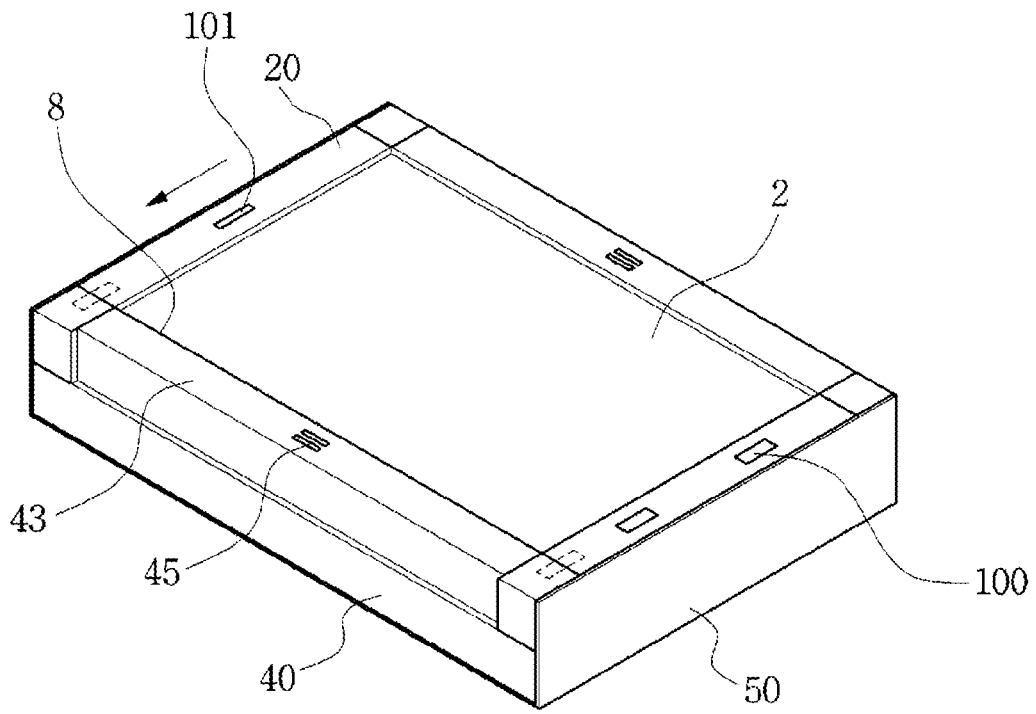
FIG. 2 is a diagram illustrating a state where displays are vertically stacked.

FIG. 2 is a diagram illustrating a state where the displays are vertically stacked.

As shown in the drawing, the lower panel housing 40 mounted with the lower display 4 is disposed below the upper panel housing 20 mounted with the upper display 2. That is, the upper panel housing 20 and the lower panel housing 40 are superimposed and stacked.

The upper and lower panel housings 20 and 40 are fixed to the housing 50. Accordingly, the lower panel housing 40 can be made to slide in the horizontal direction (the direction of an arrow) through the use of a grip 45.

Figure 3:
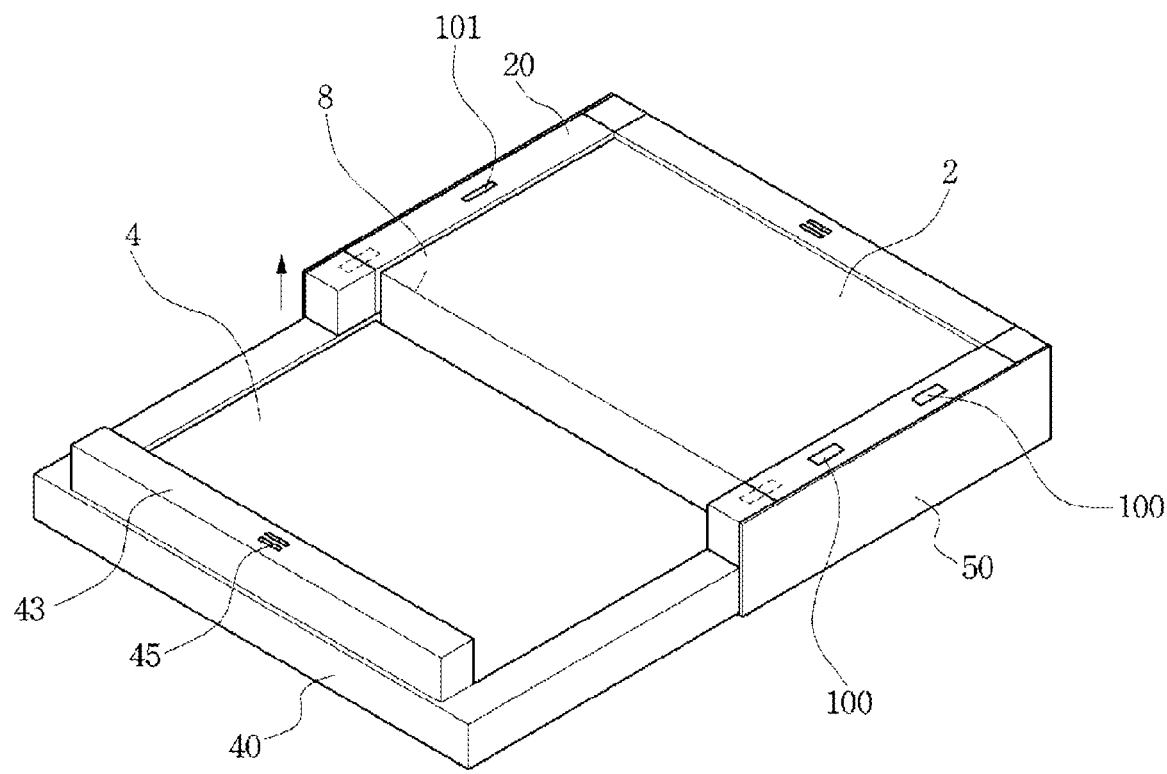
FIG. 3 is a diagram illustrating a state where the displays slide.

FIG. 3 is a diagram illustrating a state where the displays slide.

As shown in the drawing, the lower panel housing 40 and the lower display 4 are stretched to enlarge the screen. At this time, a protective lid 43 is fixed to the lower panel housing 4 and moves along the lower panel housing.

When the lower panel housing 40 is made to slide in the vertical direction (the direction of arrow), the lower display 4 and the upper display 2 are contiguous to each other to form a single screen as shown in FIG. 1. The upper and lower displays 2 and 4 are flush with each other.

When the protective lid 43 is pressed, the protective lid goes in the lower panel housing 40 and is received therein. That is, when the upper panel housing 20 and the lower panel housing 40 are stretched, the protective lid 43 can be received as shown in FIG. 1.

Figure 4:
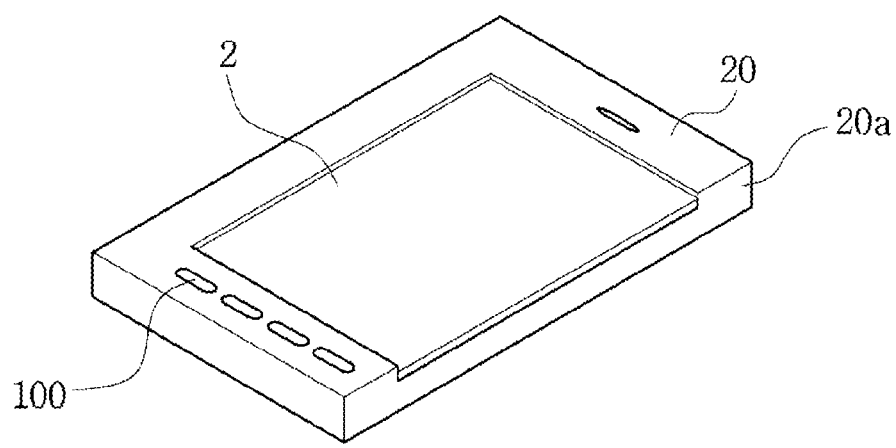
FIG. 4 is a diagram illustrating a panel housing from which a protective lid is removed.

FIG. 4 is a diagram illustrating a panel housing from which the protective lid is removed.

As shown in the drawing, the side surfaces of the displays 2 and 4 are disposed close to the side walls 20a of the panel housings, respectively.

Figure 5:
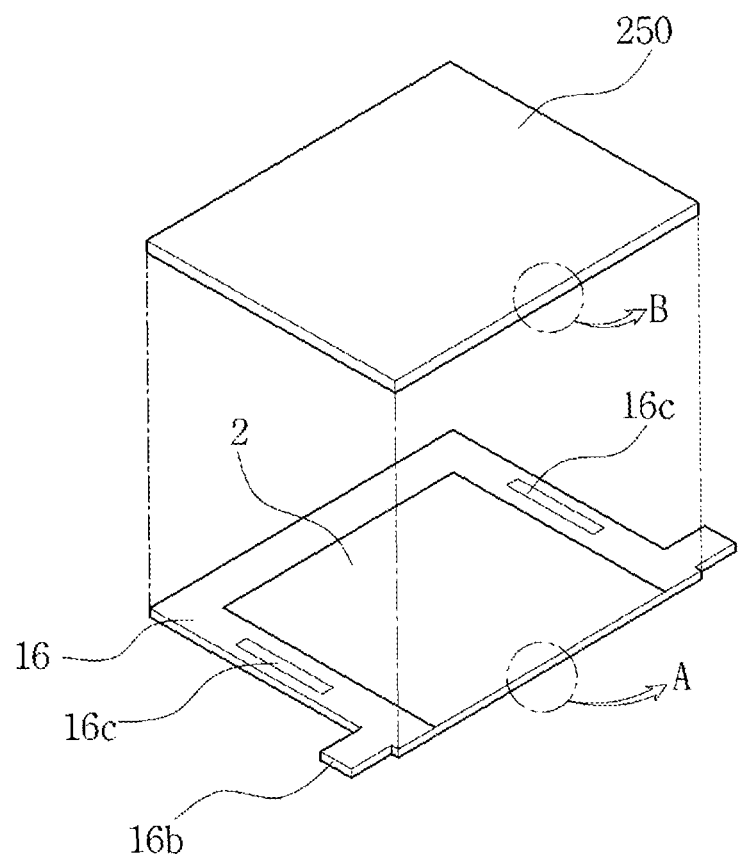
FIG. 5 is a diagram illustrating a state where a input unit is disposed on the top of a display.

FIG. 5 is a diagram illustrating a state where an input unit is disposed on the display.

In general, an input unit 250 is disposed on the top of the displays 2 and 4. In the invention, the input unit 250 is disposed on the tops of the displays 2 and 4.

The displays 2 and 4 are mounted on the panel housings 20 and 40 in the state where the displays are mounted on chasses 16. Accordingly, the input unit 250 is disposed on the top of the chassis 16.

Attachment portions 16c are disposed on the sides of the chassis 16 so as to attach the input unit thereto. Here, a double-sided adhesive tape or an adhesive such as a glue can be used as the attachment portion 16c. Fixing portions 16b are disposed on both sides of the chassis.

The input unit may be disposed as sensors in pixels of the display instead of separately providing the input unit to the display. In this case, the invention can be employed. Micro sensor elements such as optical sensor or a resistive sensor can be used as the sensor.

Figure 6:
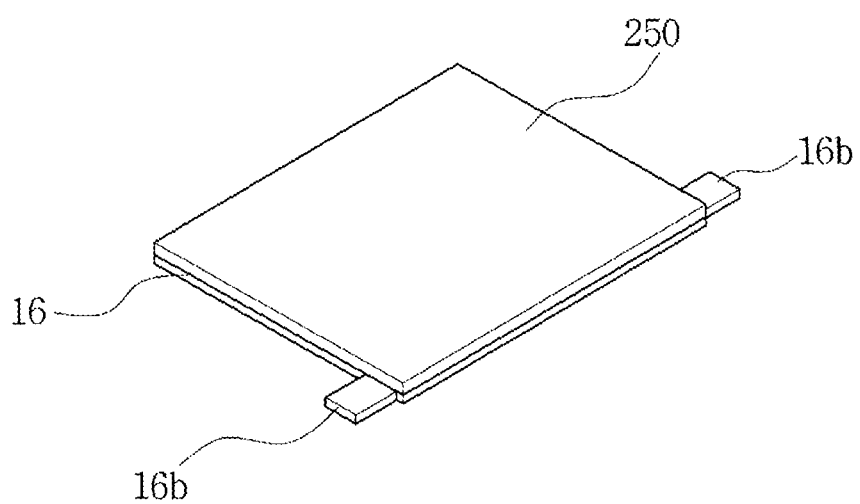
FIG. 6 is a diagram illustrating a state where the input unit 250 is disposed on the tops of the displays 2 and 4.

FIG. 6 is a diagram illustrating a state where the input unit 250 is disposed on the tops of the displays 2 and 4.

Figure 7:
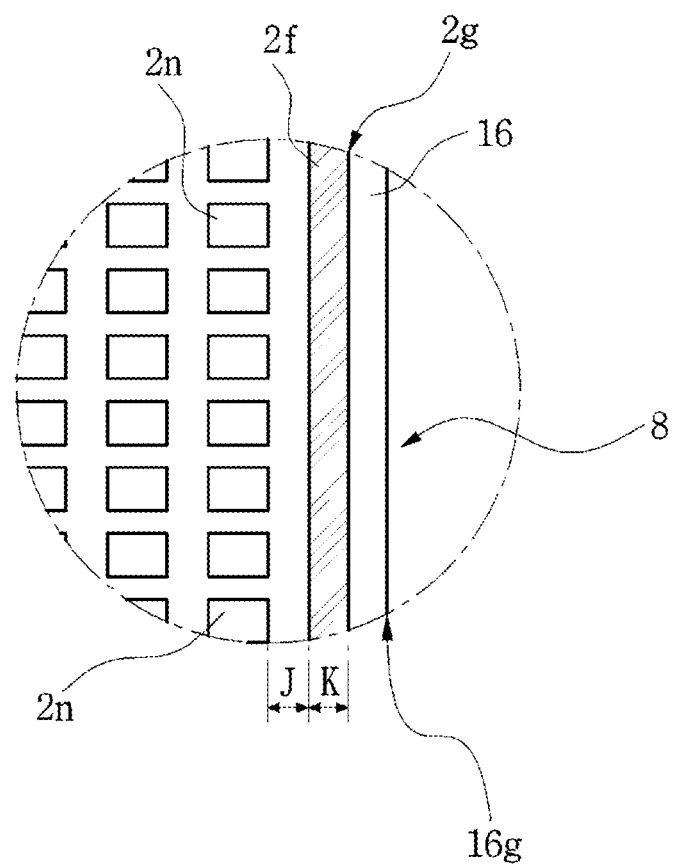
FIG. 7 is an enlarged view of a joint between the displays where part A in FIG. 5 is enlarged.

FIG. 7 is an enlarged view of a joint of the display where part A in FIG. 5 is enlarged.

As shown in the drawing, when a pixel $2n$ most neighboring the joint 8 is present, the distance J between the joint-neighboring pixel $2n$ and a partition wall $2f$ is set to 1 mm or less and may be set to 0.01 mm or less in the nearest case. The boundary of the pixel $2n$ and the boundary of the partition wall $2f$ may be matched with each other.

The thickness of the partition wall $2f$ is set to 1 mm or less and 0.05 mm or more. Accordingly, the distance between the joint-neighboring pixel $2n$ and the boundaries $2g$ of the displays 2 and 4 is preferably in the range of 0.06 mm to 2 mm.

The thickness of the chassis 16 is set to be in the range of 0.1 mm to 1 mm. The maximum thickness of the chassis 16 is preferably not greater than 0.5 mm. Therefore, the distance between the pixel $2n$ most neighboring the joint 8 and the boundary of the chassis 16 is preferably in the range of 0.16 mm to 2.5 mm.

The boundary line $2g$ of the joint 8 and the boundary of the partition wall $2f$ do not have to be matched with each other. The partition wall $2f$ may be disposed within 0.001 mm to 0.5 mm from the boundary line $2g$. In this case, the distance between the pixel most neighboring the joint 8 and the outer boundary $16g$ of the chassis is 3.0 mm or 3.5 mm at most.

Figure 8:
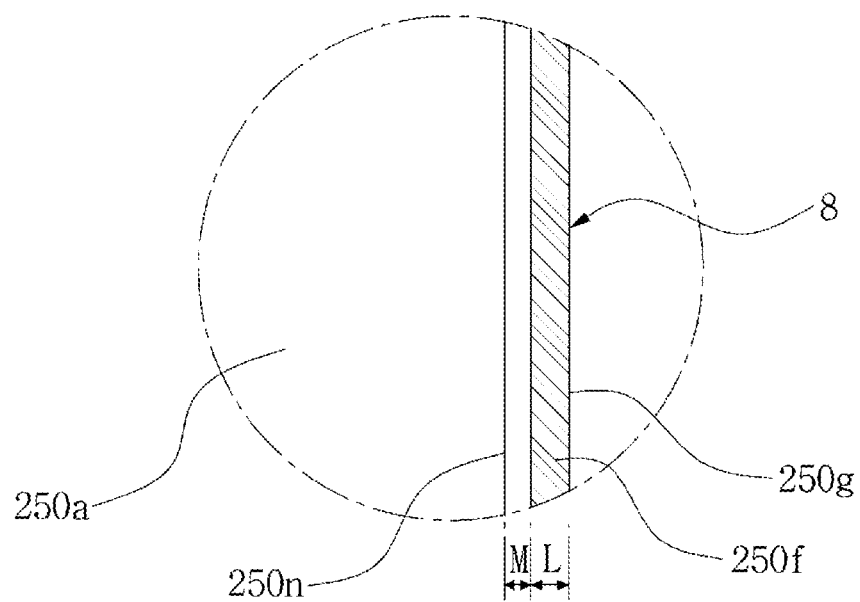
FIG. 8 is an enlarged view of the input unit where part B in FIG. 5 is enlarged.

FIG. 8 is an enlarged view of an input unit where part B in FIG. 5 is enlarged.

In general, an input unit is mounted on the top of a display and is used to input or select information. The portable display device according to the invention may further include an input unit 250. The general input unit should not be used as the input unit 250 and a change in design is applied to the input unit.

That is, lead lines used to read capacitance or resistance are disposed on the sides of the input unit and the positions of the lead lines $250n$ in the joint should be changed in design. A partition wall $250f$ may be provided. The partition wall $250f$ may not be provided in some cases.

The gap M between the lead line $250n$ and the partition wall in the joint 8 is in the range of 0.005 mm to 1 mm, and the thickness L of the partition wall $250f$ is in the range of 0.005 mm to 1 mm or in the range of 0.005 mm to 2 mm.

Accordingly, the distance between the lead line $250n$ and the boundary $250g$ of the input unit 250 in the joint 8 is in the range of 0.0055 mm to 2 mm or in the range of 0.005 mm to 3 mm.

The boundary of the joint 8 does not have to match with the boundary of the partition wall $250f$ and the partition wall $250f$ may be disposed within 0.5 mm from the boundary $250g$. In this case, the maximum distance between the lead line $250n$ and the boundary $250g$ is 2.5 mm or 3.5 mm.

On the other hand, the partition wall is not essential depending on the type of the input unit such as a capacitive type. In this type, the distance between the boundary $250g$ and the lead line $250n$ is in the range of 0.01 mm (which is obtained by the minimum thickness 0.05 mm from 0.06 mm) to 2 mm or in the range of 0.01 mm to 3 mm.

Reference numeral $250a$ represents an information input unit of the input unit which serves as an active area of the input unit. The structure thereof differs depending on the resistive type or the capacitive type and typically-known methods can be used. Any type of input unit may be employed, as long as the input unit has a flat panel structure and is an input unit to which information is input through the surface of the input unit.

Figure 9:
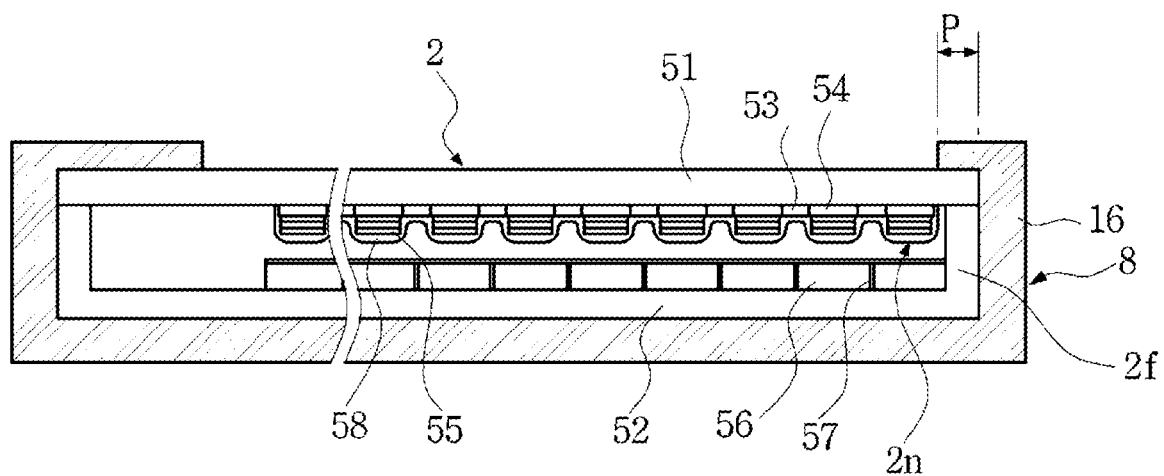
FIG. 9 is a sectional view of the display.

FIG. 9 is a sectional view of a display.

An LCD, an OLED, or an electric paper can be used as the display. In any case, the distance between the boundary $2g$ of the display and the pixel $2n$ most neighboring the boundary is very important in the joint 8. The design values in the invention can be applied to all the flat displays.

The portable display device according to the invention employs an OLED and the section thereof is shown in FIG. 9.

Each display 2 or 4 includes an insulating layer 53, electrodes 54, a coated electrode 58, an organic multi-layered film 53 on a substrate 51 and further includes a moisture-absorbing layer 56 into which separation films 57 are inserted.

The substrate 51 is covered with a lid substrate 52. At this time, the partition wall $2f$ may be formed of a sealant such as an adhesive or the substrate may serve as the partition wall $2f$.

That is, when a part of the surface of the substrate is removed through the use of an etching process to form a space inside the surface of the substrate and then the insulating layer, the organic multi-layered film, the electrodes, and the like are formed therein, the edge part of the substrate remaining through the etching process serves as the partition wall $2f$.

As shown in the drawing, the joint-neighboring pixel $2n$ should be close to the joint 8 and the distance therebetween is the same as in the embodiment shown in FIG. 7.

On the other hand, the chassis 16 covers a part of the non-display area on the display 2 or 4 and the covered width ("P" in the drawing) in the joint 8 should be determined.

That is, when the width covering the non-display area in the joint 8 is defined as "P", the value of P is set to 2 mm or 3 mm or less as in the embodiment shown in FIG. 7. The minimum value thereof is set to 0.06 mm. The joint-neighboring pixel 2n should not be covered in this case. In the joint, the chassis 16 should not cover the pixels of the display 2 or 4.

Figure 10:
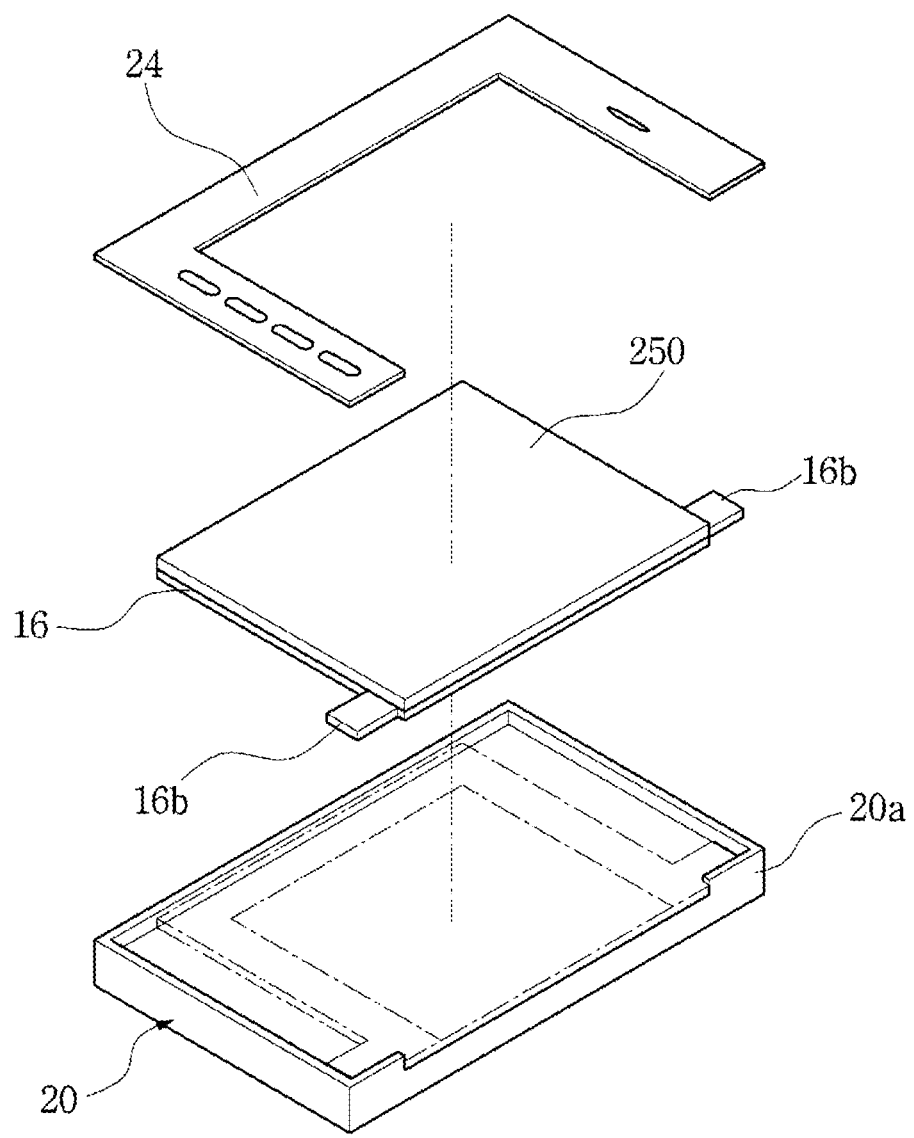
FIG. 10 is a diagram illustrating a state where a display having an input unit attached thereto is mounted on a panel housing.

FIG. 10 is a diagram illustrating a state where a display having an input attached thereto is mounted on a panel housing.

The joint 8 of the display 2 or 4 having the input unit 250 attached thereto is located on a side wall 20a of the panel housing.

A "⊂-shaped" lid 24 is disposed on the panel housing 20 and covers the edge of the non-display area of the display 2 or 4.

Figure 11:
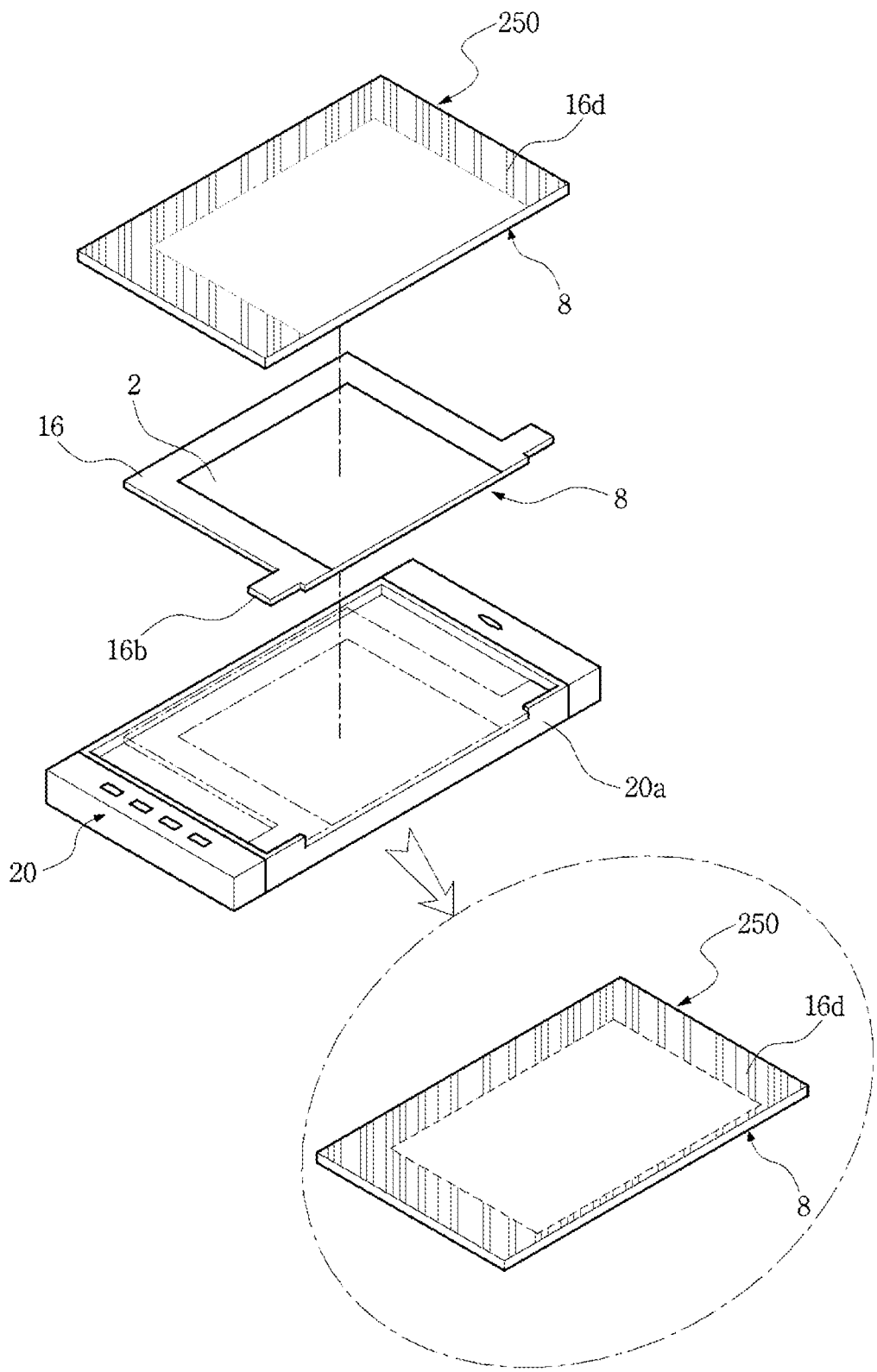
FIG. 11 is a diagram illustrating a state where a display and an input unit are separately mounted on a panel housing.

FIG. 11 is a diagram illustrating a state where a display and an input unit are separately mounted on a panel housing.

As shown in the drawing, the display 2 and the input unit 250 are separately mounted on the panel housing 20 and the lid 24 shown in FIG. 10 is not provided.

Accordingly, the input unit 250 also serves as an external protective plate protecting the surface of the display 2 in the portable display device.

At this time, a "⊂-shaped" mask print 16d is formed in the input unit 250. The mask print 16d covers the non-display area of the display 2 or 4. The covering effect has a visual meaning.

Another example of the mask print 16d is shown in the circle of the drawing. In this case the mask print 16d has a "⊂"-shape in which a part corresponding to the joint is thinner. The reason of forming the part corresponding to the joint to be thinner is the same as the principle of determining the value of "P" in FIG. 9.

Figure 12:
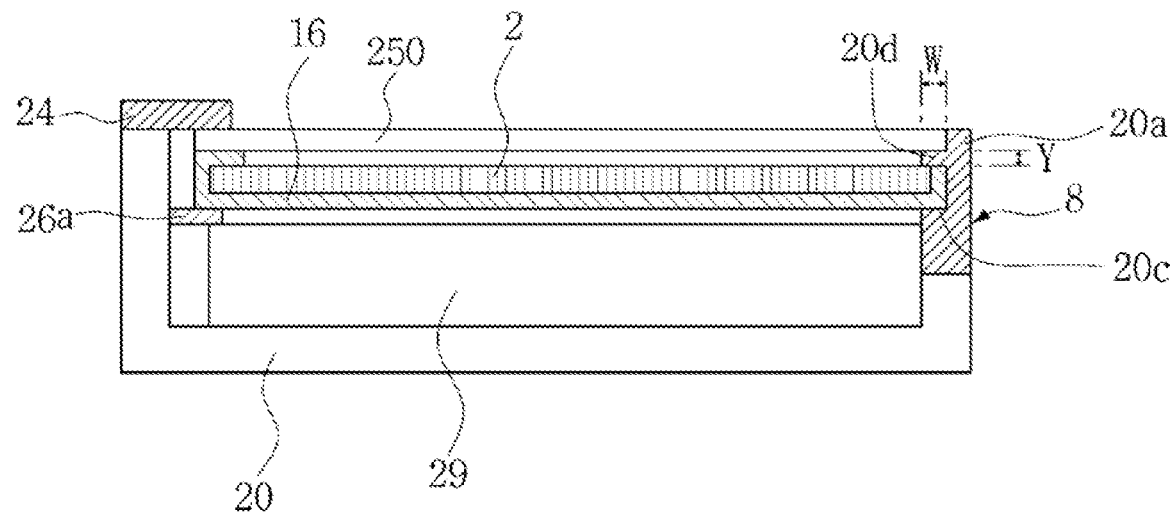
FIG. 12 is a sectional view illustrating an example where a display having an input unit attached thereto is mounted on a panel housing.

FIG. 12 is a sectional view illustrating a state where a display having an input unit attached thereto is mounted on a panel housing.

A battery or a circuit body 29 is disposed inside the panel housing 20 and a support 26a is further provided thereto. The support 26a supports the display 2 or 4.

A stepped portion is formed in the side wall 20a of the panel housing in the joint 8 as shown in the drawing, and the display 2 or 4 is mounted on the stepped portion 20c. A protrusion 20d is formed to support the input unit 250.

In general, when an input unit 250 is disposed on a display 2 or 4, a gap is present between the display and the input unit 250 and the protrusion 20d is formed to complement the gap. Accordingly, the thickness Y of the protrusion 20d is the same as the gap between the display and the input unit. In addition, the length W of the protrusion 20d should not be greater than 2.5 mm or 3.5 mm in consideration of the thickness of the chassis 16 and the non-display area. In consideration of supporting the input unit 250, the length W of the protrusion 20d should be set to 0.1 mm or more.

Figure 13:
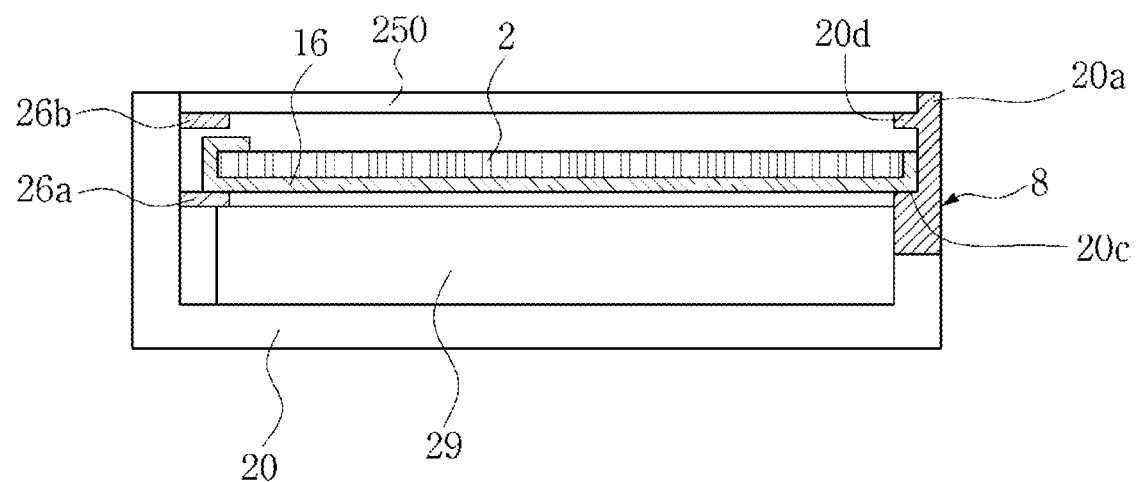
FIG. 13 is a sectional view illustrating an example where a display and an input unit are separately mounted on a panel housing.

FIG. 13 is a sectional view illustrating an example where a display and an input unit are separately mounted on the panel housing.

As shown in the drawing, the upper cover 24 is removed and thus the input unit 250 performs the function of the upper cover.

In this case, a first support 26a supporting the display 2 and a second support 26b supporting the input unit 250 are provided. However, the structure in which the display 2 and the input unit are coupled in the joint 8 is similarly to that shown in FIG. 12.

Accordingly, the display 2 is supported by the stepped portion 20c of the side wall 20a and the input unit 250 is supported by the protrusion 20d of the side wall 20a. In this case, the length W of the protrusion 20d should not depart from the non-display area of the display panel and is in the range of 0.1 mm to 2.5 mm or in the range of 0.1 mm to 3.5 mm.

Figure 14:
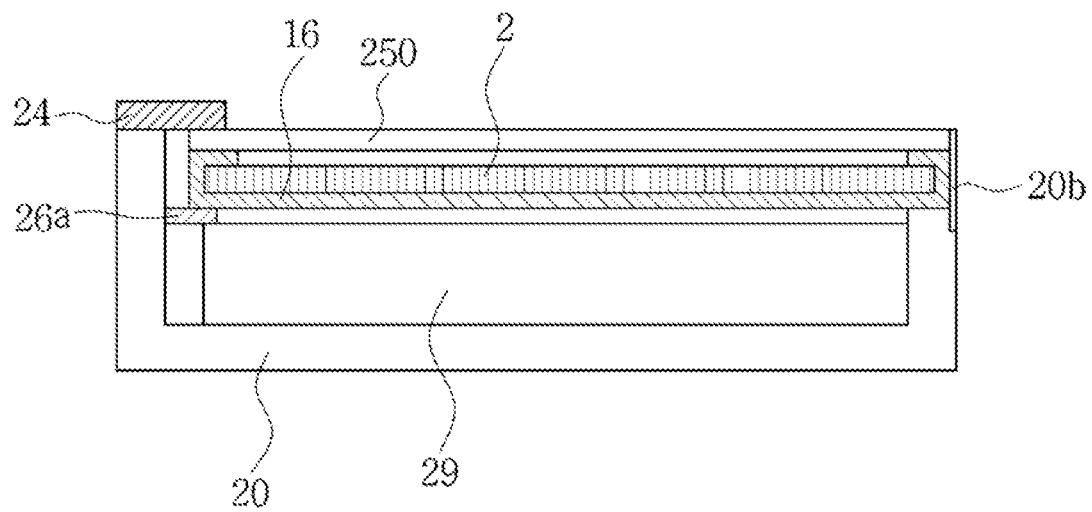
FIG. 14 is a diagram illustrating a state where a display having an input unit attached thereto is mounted on a side wall of a panel housing.

FIG. 14 is a diagram illustrating an example where a display having an input unit attached thereto is mounted on the side wall of a panel housing.

Figure 15:
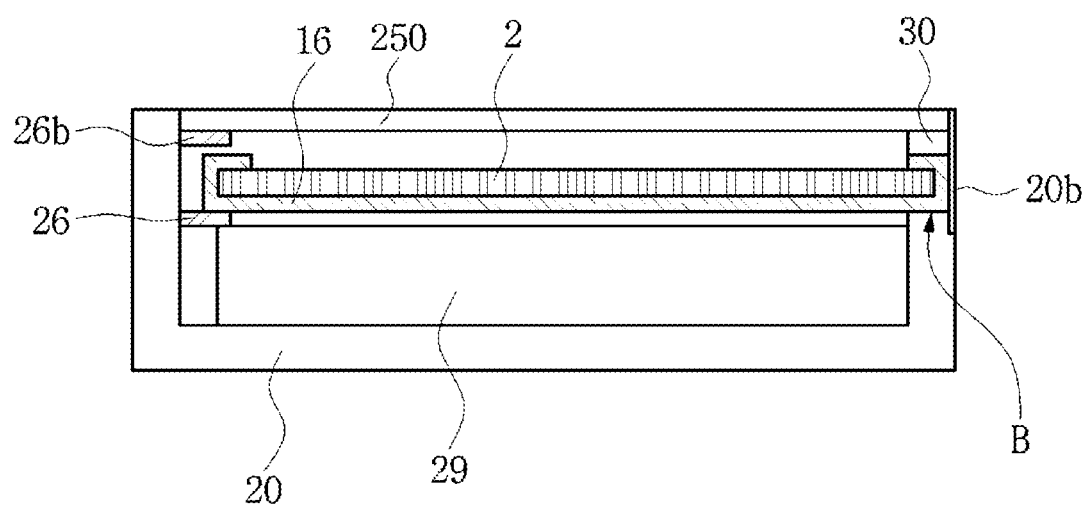
FIG. 15 is a diagram illustrating a state where a display and an input unit are separately mounted on a panel housing.

FIG. 15 is a diagram illustrating an example where a display and the input unit are separately mounted on a panel housing.

A protective film 20b is further provided to protect the side surface of the display 2 and the side surface of the input unit 250. In this case, the protective film 20b serves to seal the side surfaces rather than to protect the side surfaces from physical impact. Accordingly, the thickness of the protective film does not have to be greater and is set to the range of 0.01 mm t 0.5 mm. When the side surfaces should be protected from external impact, the thickness of the protective film 20a can be set to the maximum value of 1 mm.

When the displays 2 and 4 are disposed on the tops of the side walls of the panel housings 20 and 40, respectively, the protective film 20b may be removed. In this case, the chassis 16 may be increased in thickness to serve as a protective film. Part "B" as a boundary in the drawing may be coated with an adhesive, there achieving a sealing effect (the adhesive may perform a sealing function instead of the protecting film).

On the other hand, in the example shown in FIG. 15, since the gap between the display 2 and the input unit 250 increases, an intermediate support 30 may be provided to support the input unit 250.

The intermediate support 30 is present in the non-display area of the joint 8 of the display 2. Accordingly, the intermediate support 30 has a width of 0.16 mm to 2.5 mm or a width of 0.16 mm to 3.5 mm as described with reference to FIG. 8.

Figure 16:
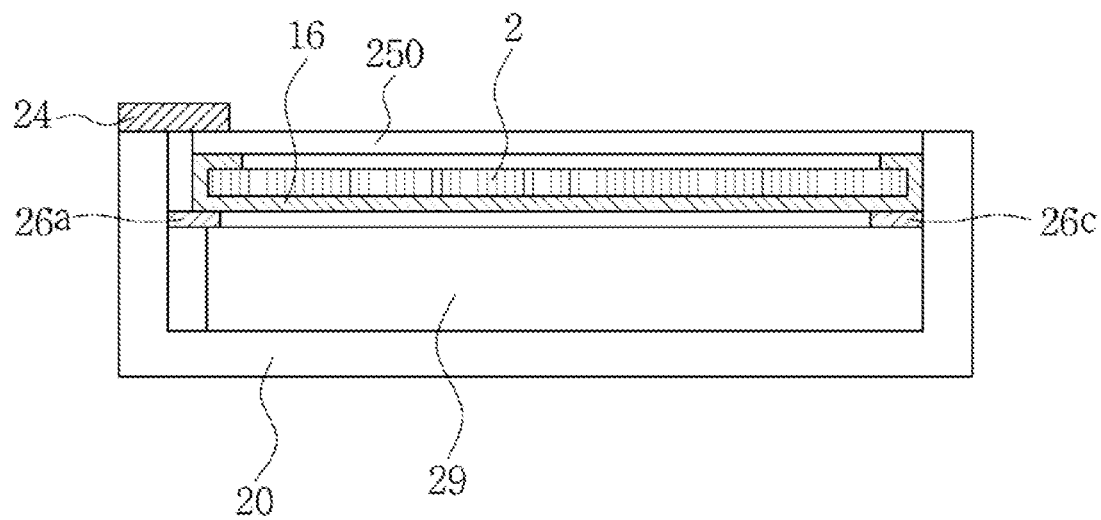
FIGS. 16 to 18 are diagrams illustrating a state where a display and an input unit are separately mounted on a panel housing.
Figure 17:
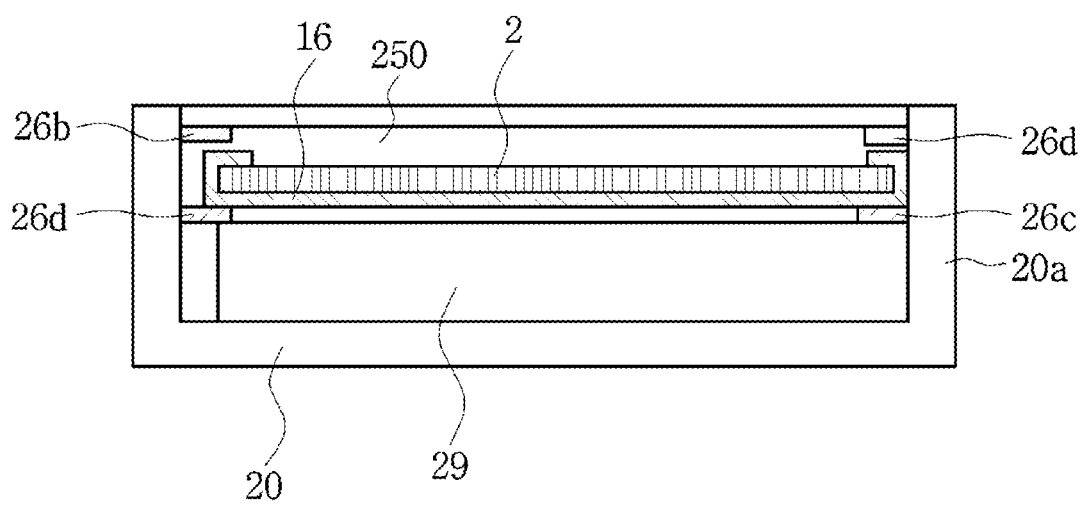
Figure 18:
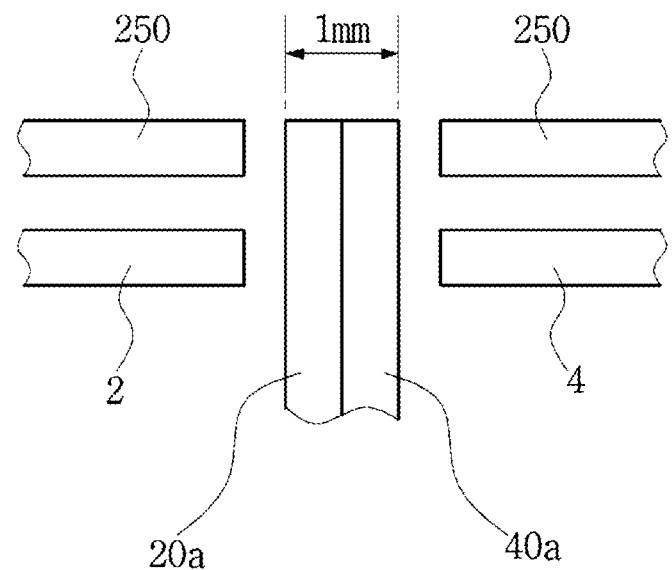

FIG. 16 shows an example where the display 2 having the input unit 250 attached thereto is mounted on the panel housing 20, and FIGS. 17 and 18 show an example where the display 2 and the input unit 250 are separately mounted on the panel housing 20.

A third support 26c is disposed on the side wall 20a of the panel housing 20 of the joint so that the third support 26c supports the display 2 and the display supports the input unit 250.

However, when the input unit 250 and the display 2 are separately mounted on the panel housing 20 as shown in FIG. 17, a fourth support 26d may be further disposed on the side wall 20a of the panel housing 20 to support the input unit 250.

The width of the fourth support 26d is in the range of 0.16 mm to 2.5 mm or the range of 0.16 mm to 3.5 mm. That is, the fourth support 26d is present in the non-display area in the joint of the display 2.

Since the non-display area is a non-display area of a single display (mounted on a chassis), the non-display area when two displays are contiguous to each other is present within 5 mm or 6 mM.

When the display 2 comes in close contact with the side wall of the joint of the panel housing 20 as shown in FIG. 16, the thickness of the side wall of the joint of the panel housing 20 is not greater than 1.5 mm and the thickness of the chassis 16 is about 1 mm, in consideration of reliability. Accordingly, the total thickness of the chassis 16 surrounding the side surface of the joint of the display 2 and the side wall of the joint of the panel housing 20 is 2.5 mm.

Accordingly, when two panel housings 20 and 40 come in close contact with each other, the distance between the two displays 2 and 4 is 5 mm which doubles the total thickness 2.5 mm.

On the other hand, when the thickness of the respective side walls 20a and 40a of the panel housings is 0.5 mm (when the total thickness is 1 mm) as shown in FIG. 18 and the thickness of the respective chasses 16 is 0.5 mm, the distance between the two displays 2 and 4 is not greater than 5 mm. In this case, the distance between the two displays is 2 mm.

As in the embodiment shown in FIG. 18, the sides walls 20a and 40a of the panel housings and the displays 2 and 4 (mounted on the chasses) may be disposed separate from each other and the distance between the displays 2 and 4 may be 5 mm. Similarly, even when the side walls 20a and 40a of the panel housings are further thinned and the chasses 16 are further thinned, the distance between the displays may be 5 mm.

The distance between the input units can be determined similarly to the distance between the displays. That is, the distance between the displays and the distance between the input units may be equal to each other.

In the invention, the chassis is an element formed of aluminum to surround the display, but may be a plastic member in some cases. The chassis and the plastic member may be used together. In any case, the principle of covering the top of the joint is based on the invention.

Figure 19:
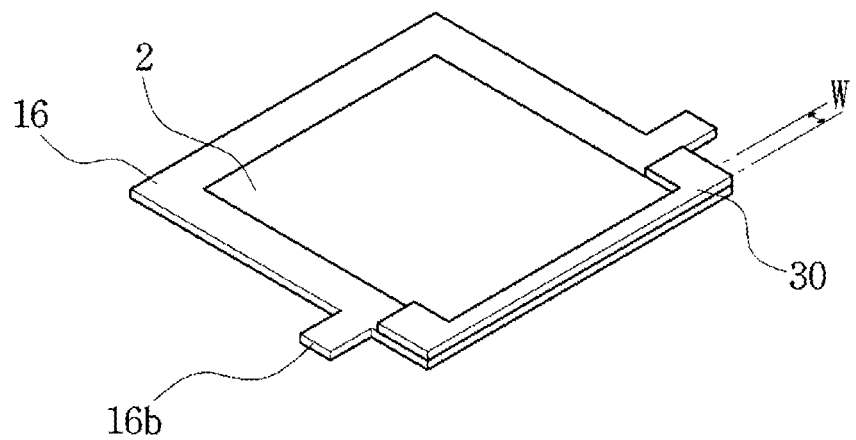
FIG. 19 is a diagram illustrating support means between a display and an input unit.

FIG. 19 is a diagram illustrating support means between the display and the input unit.

The display 2 or 4 and the input unit 250 are separated from each other with a and the distance therebetween is in the range of 0.5 mm to 5 mm. This distance may vary depending on the device characteristics. Accordingly, it is necessary to separately support the input unit and such support means is shown in FIG. 19.

The shape of the intermediate support 30 and the shape of the fourth support 26d are equal, but the intermediate support serves to support the input unit 250 at the upper of the display 2 and the fourth support 26d is formed on the side wall 20a of the panel housing 20 to serve to support the input unit 250.

Although a single display 2 or 4 and a single panel housing 20 or 40 are shown and described in the drawings and description of FIGS. 7 to 18, another display and another panel housing may be similarly disposed at positions symmetric about the joint 8

FIG. 19 shows the shape of the intermediate support 30 and the fourth support 26d has a shape similar thereto.

The width "W" represents the non-display area in the invention and is less than 2.5 mm or 3.5 mm.

Figure 20:
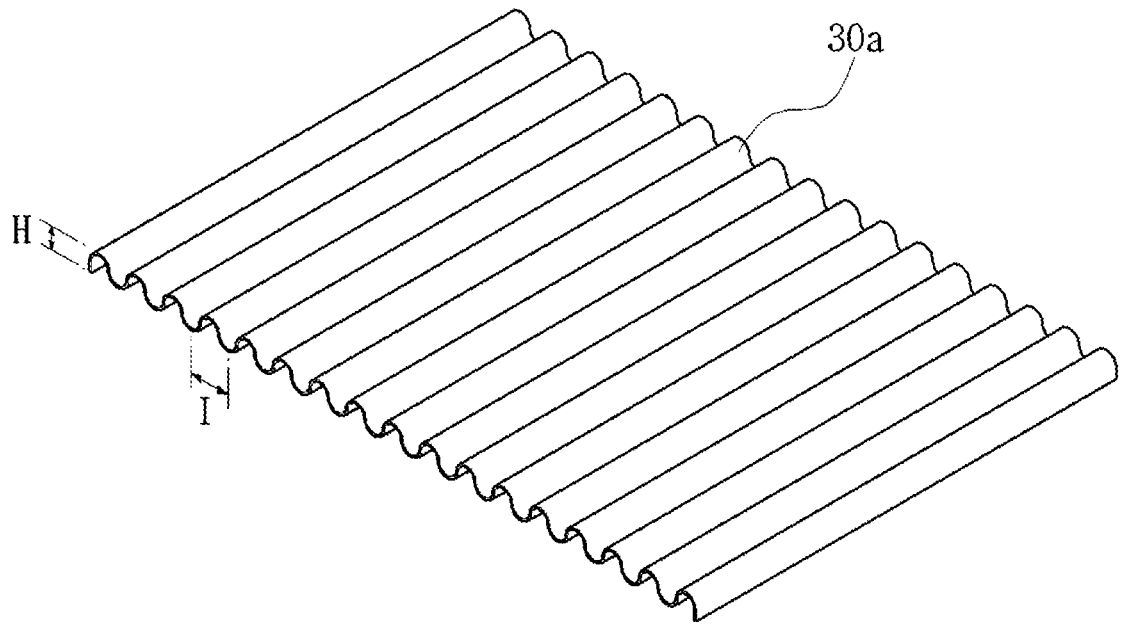
FIGS. 20 to 22 are diagrams illustrating support means as an intermediate plate between a display and an input unit.
Figure 21:
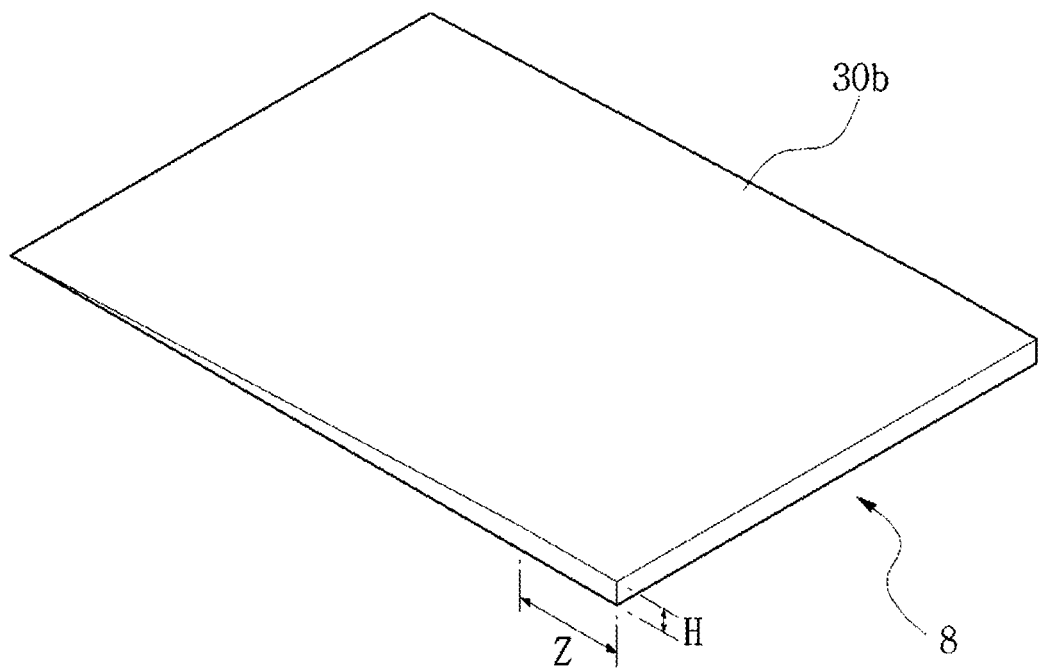
Figure 22:
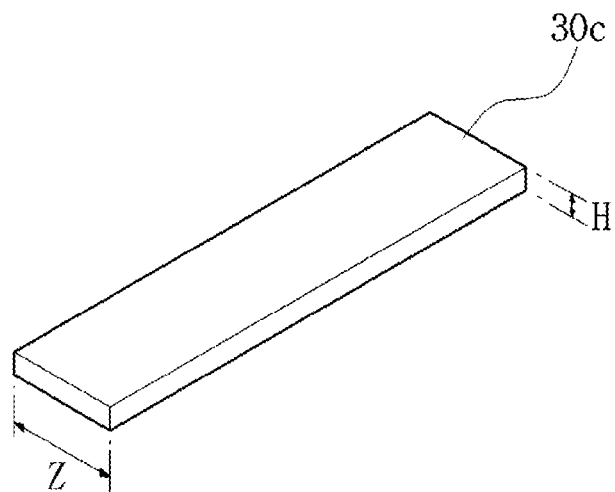

FIGS. 20, 21, and 22 are diagrams illustrating support means of an intermediate plate type of the display and the input unit.

The support means is formed of a transparent plastic plate. Examples of the transparent plastic include a PC (Poly Carbonate) and a PET (Poly Ethylene Terephthalate), etc.

That is, the intermediate support plate may be formed of a transparent plastic plate having a thickness corresponding to the distance between the display 2 (or the chassis 16) and the input unit 250. Alternatively, an intermediate plate 30a having wave patterns may be provided In FIG. 20, "L" represent the width of a wave pattern and has a size of 0.2 times to ten times the height "H" thereof. The height "H" corresponds to the distance between the display 2 or 4 and the input unit 250.

An intermediate plate 30b shown in FIG. 21 in which a part close to the joint 8 has a constant thickness and the other part becomes thinner may be provided. The height "H" corresponds to the gap between the display 2 or 4 and the input unit 250 and the constant width "Z" means such a width to effectively support the input unit in the joint. In general, the width "Z" is set to 0.2 times to 20 times the height "H".

As shown in FIG. 22, an intermediate plate 16c supporting only the part corresponding to the joint 8 may be provided. In this case, the magnitudes of "H" and "Z" are set to the same as in FIG. 20.

Figure 23:
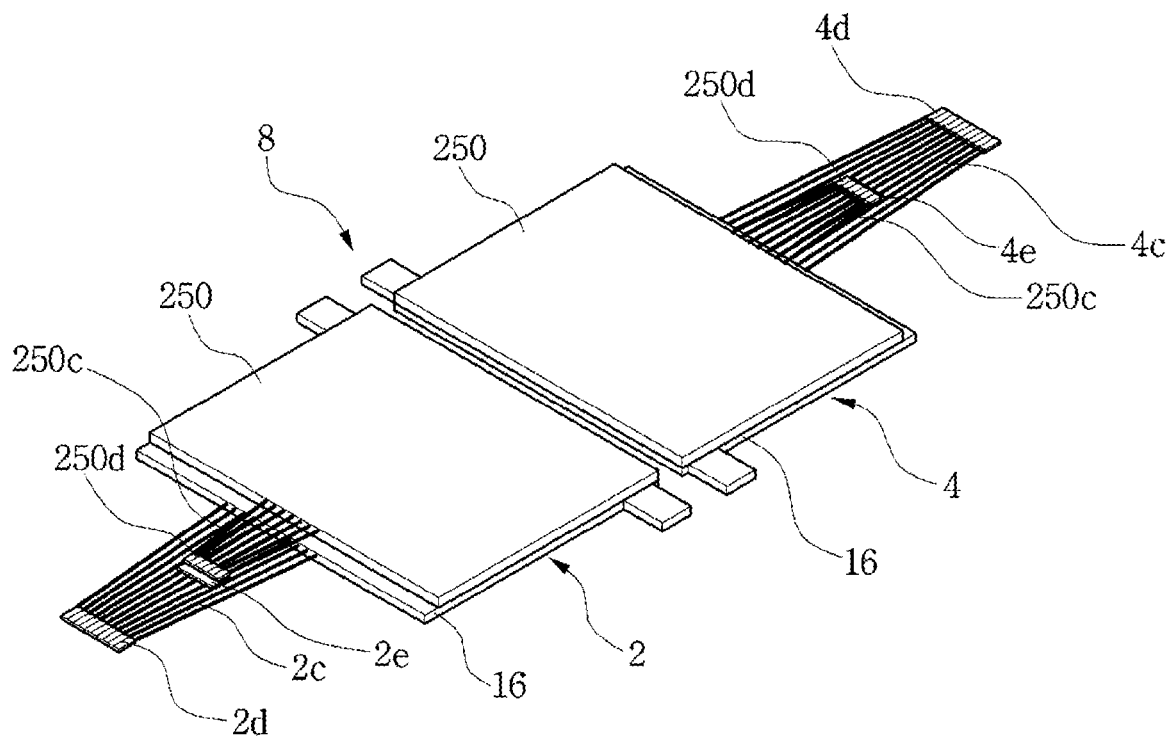
FIG. 23 is a diagram illustrating a display to which a connector is attached.

FIG. 23 is a diagram illustrating a display having a connector attached thereto.

Connectors are used to connect the displays and the input units to the main body of the display device. In the invention, the positions of the connectors can be changed in design.

As shown in the drawing, the displays 2 and 4 and the input units 250 are disposed symmetric about the joint 8. Here, FPCs (Flexible Printed Circuits) 2c, 4c, and 250c are disposed to connect the displays and the input units to the connectors 2d and 250d. The FPCs 2c, 4c, 250c are disposed opposite to the joint 8, and The connectors 2d and 250d are disposed opposite to the joint 8.

The connectors 250d of the input units 250 are electrically connected to junctions 2e and 4e of the displays 2 and 4 through the use of soldering or the like. Accordingly, the input units 250 are electrically connected to the main body with the electrical connection of the connectors 2d and 4d of the displays 2 and 4 to the main body. That is, the connectors 2d and 4d of the displays have a function as the connectors of the input units.

As a result, the external signal lines (FPC) are connected to one side of each display and each input unit. The external signal lines (FPC) are connected to one side opposite to the joint shown in FIGS. 12 to 18.

When the displays 2 and 4 and the input units 250 are separately mounted on the panel housings 20 and 40 (see FIGS. 13, 15, and 17), the external signal lines (FPC) can be connected to one side of each input unit 200 among three sides other than the joint 8.

Figure 24:
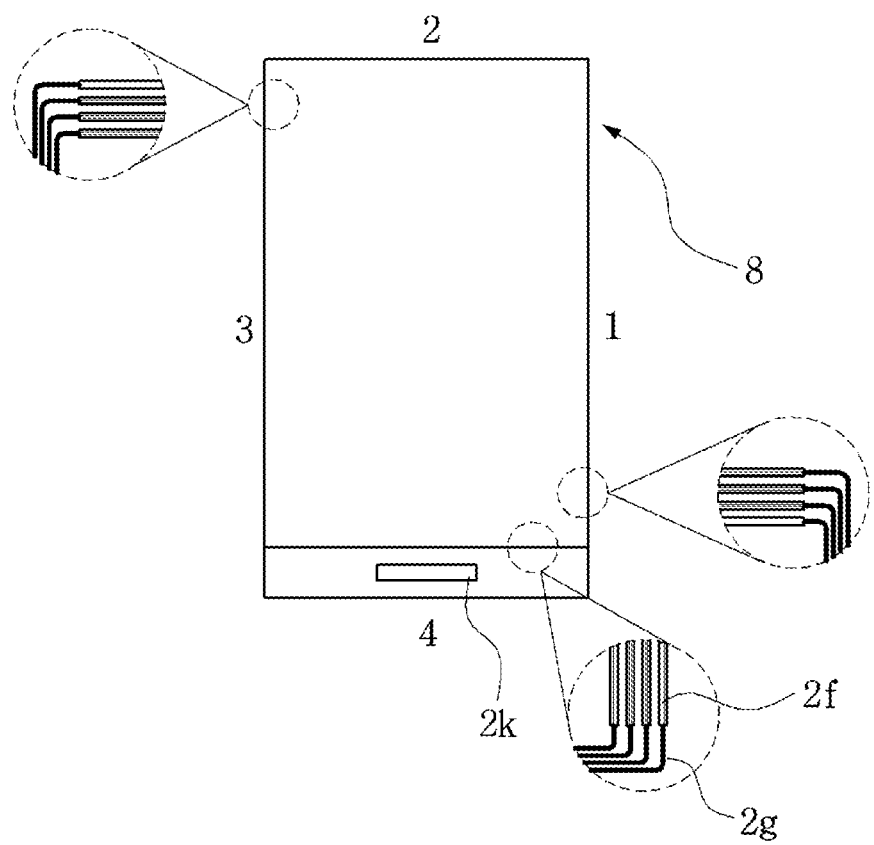
FIGS. 24 to 26 are diagrams illustrating shapes of a display according to another embodiment.
Figure 25:
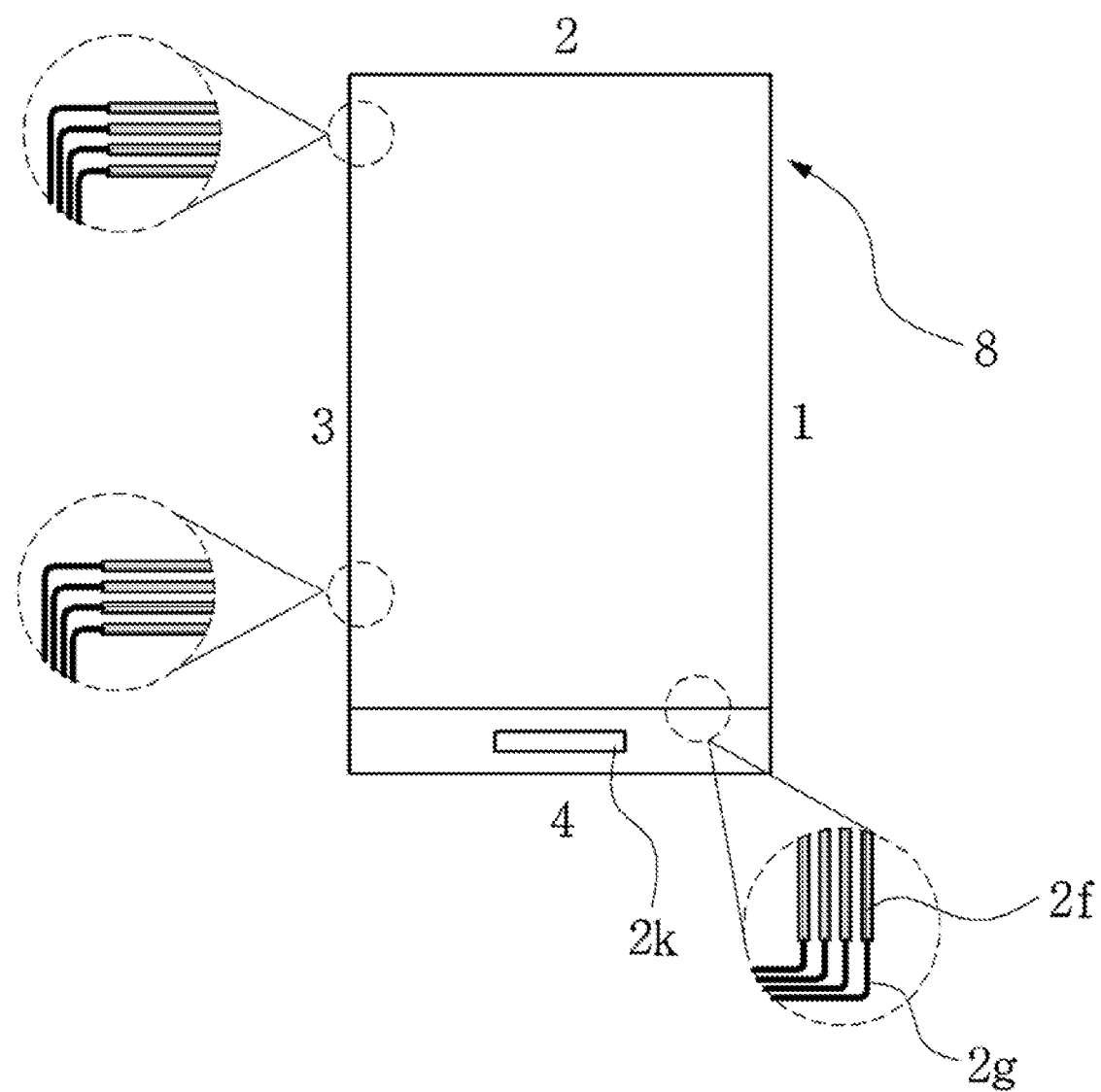
Figure 26:
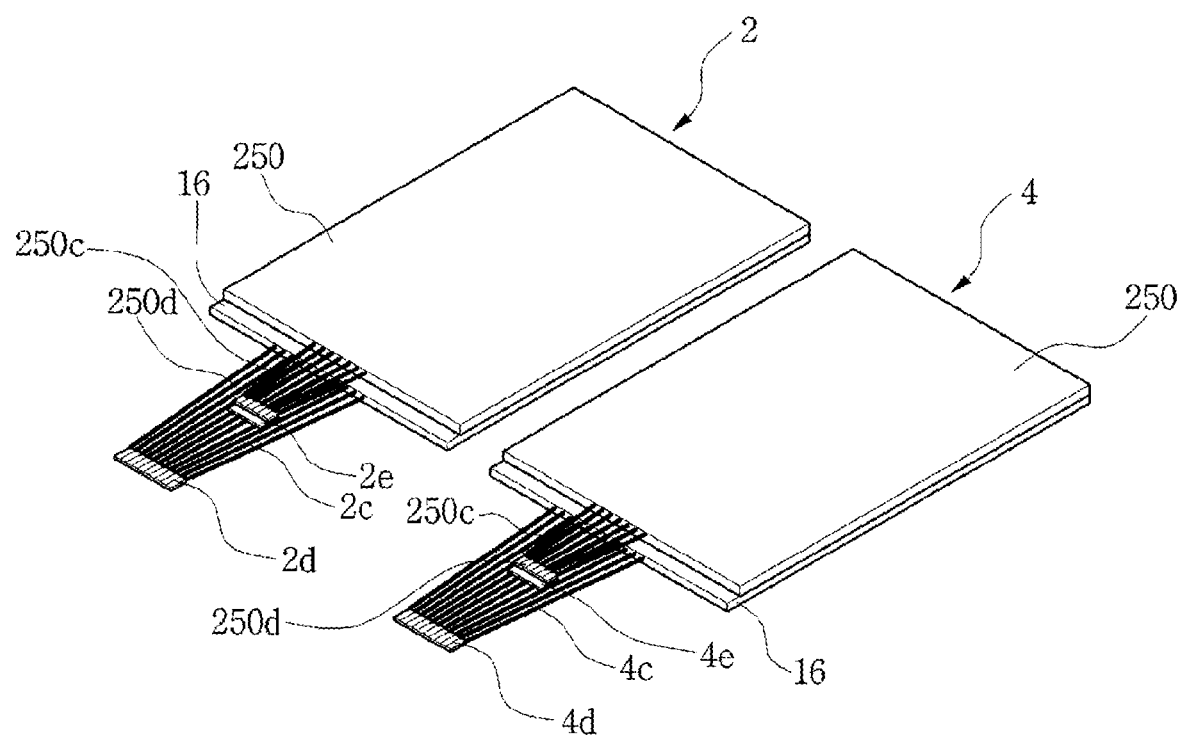

FIGS. 24 to 26 are diagrams illustrating the shape of a display according to another embodiment.

In FIG. 24, when the first side is the joint, a driver 2k (a driving IC chip) is located on the fourth side. That is, when the joint is located on the right side (the left side in some cases), the driver 2k is located on the upper side or the lower side.

Supply lines 2i connected to panel electrodes 2f on the first or third side are drawn to the fourth side so as to mount the driver 2k on the fourth side. That is, the supply lines 2i are drawn to the fourth side via the first and third sides. The supply line 2i is an electrical wire connected to the driver 2k to supply signals. The electrodes 2f in the invention may be pixel electrodes supplying driving signals to thin film transistors (TFT) or.

In this case, a margin of 1.5 mm is added to 2 mm which is the sum of the value of "J" and the value of "K" shown in FIG. 7. This is intended to guarantee a space passing the supply lines 2i to be less than 1.5 mm. Accordingly, it is preferable that the distance from the pixel closest to the joint 8 to the boundary of the display 2 or 4 is not greater than 3.5 mm.

FIG. 25 is a diagram illustrating an example where the supply lines are modified.

When the first side is the joint, the supply lines 2i should not pass through the first side so as to minimize the width of the joint. The supply lines 2i are connected to the driver 2k via the third side which is a side opposite to the joint 8. Then, on the first side, the distance from the pixel closest to the joint 8 to the boundary of the display 2 or 4 can be set to be equal to or less than 2.0 mm.

Depending on some design conditions, more supply lines 2*i* can be designed to pass through the third side and less supply lines 2*i* can be designed to pass through the first side. That is, the supply lines 2*i* can be divided for the third side and the first side at a predetermined ratio.

FIG. 26 is a diagram illustrating an example in which two displays are arranged.

In the drawing, an on-cell system in which the input units 200 and 400 are mounted just on the displays 2 and 4 is shown. When the joint 8 is the right side (the left side in some cases), the FPCs 2*c* and 4*c* or the external connectors 2*d* and 4*d* connected to the driver are disposed on the lower side (the upper side in some cases).

Similarly, the FPCs 250*c* and the connectors 250*d* for connection to the input units are disposed on the lower side.

When the display 2 or 4 and the input unit 200 or 400 are mounted with a constant gap therebetween, the connector for the input unit can be mounted on three sides other than the joint.

FIGS. 27 to 30 are block diagrams illustrating the constitution of the portable display device according to the invention.

In the invention, two displays 2 and 4 and two input units 250-1 and 250-2 are employed, and the input units are mounted on the displays.

Accordingly, in the invention, a control unit controlling the two displays 2 and 4 also controls the signals output from two input units 250-1 and 250-2.

Figure 27:
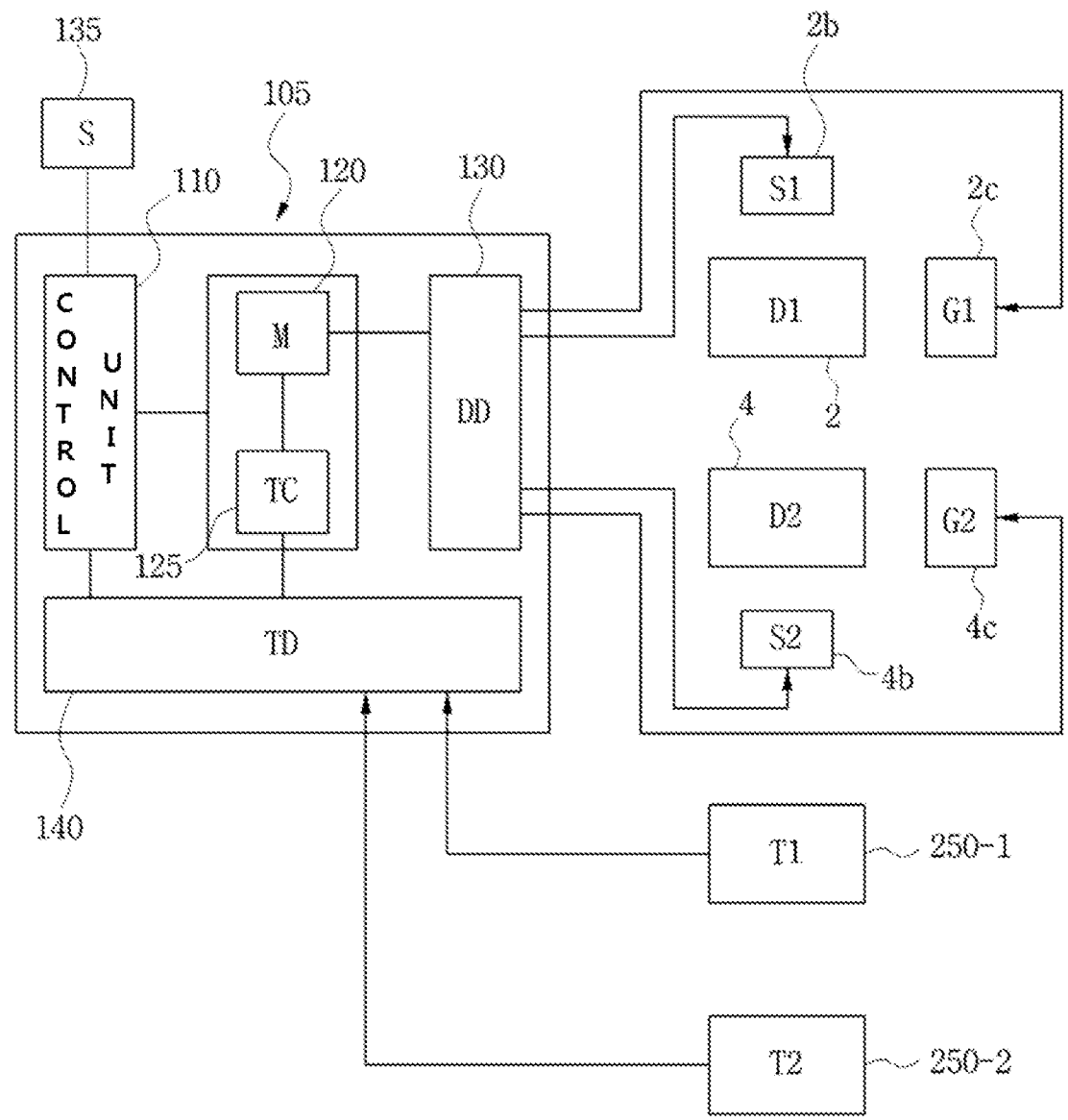
FIGS. 27 to 30 are block diagrams illustrating the constitution of the portable display device according to the invention.

As shown in FIG. 27, a main controller 105 includes a control unit 110, a memory 120, a time controller 125, a display driver 130, and an input unit driver 140.

That is, elements serving as the control unit 110, the memory 120, the time controller 125, the display driver 130, and the input unit driver 140 can be included in the main controller 105 and can be manufactured as a single module.

The display driver 130 divides the screen and supplies data to the first display 2 and the second display 4. The input unit driver 140 corrects and adjusts signals output from the first input unit 250-1 and the second input unit 250-2.

Source units 2*b* and 4*b* supplying data signals and gate units 2*c* and 4*c* supplying line selection signals are provided to display the screens of the displays 2 and 4.

A sensor 135 is a sensor sensing the coupling state of the panel housings 20 and 40. That is, the sensor senses whether the upper and lower panel housings 20 and 40 are coupled to each other in a stacked state.

Figure 28:
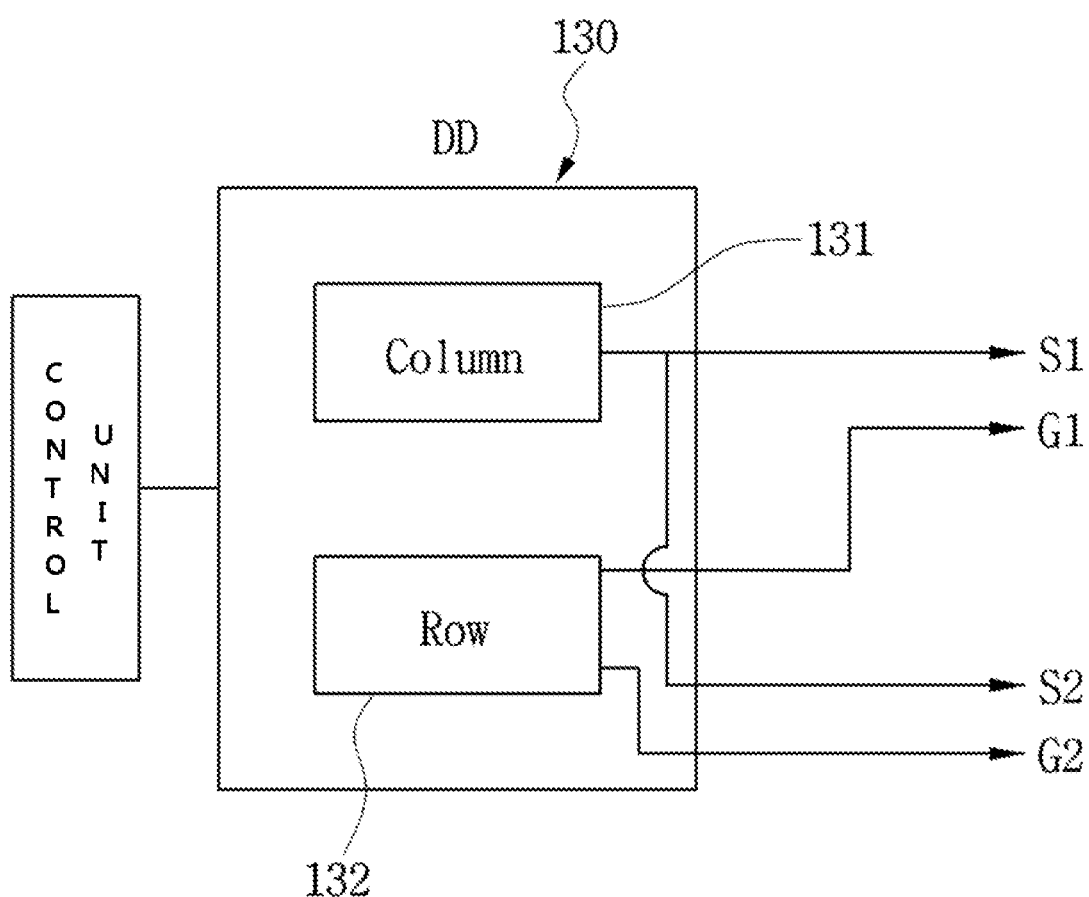
Figure 29:
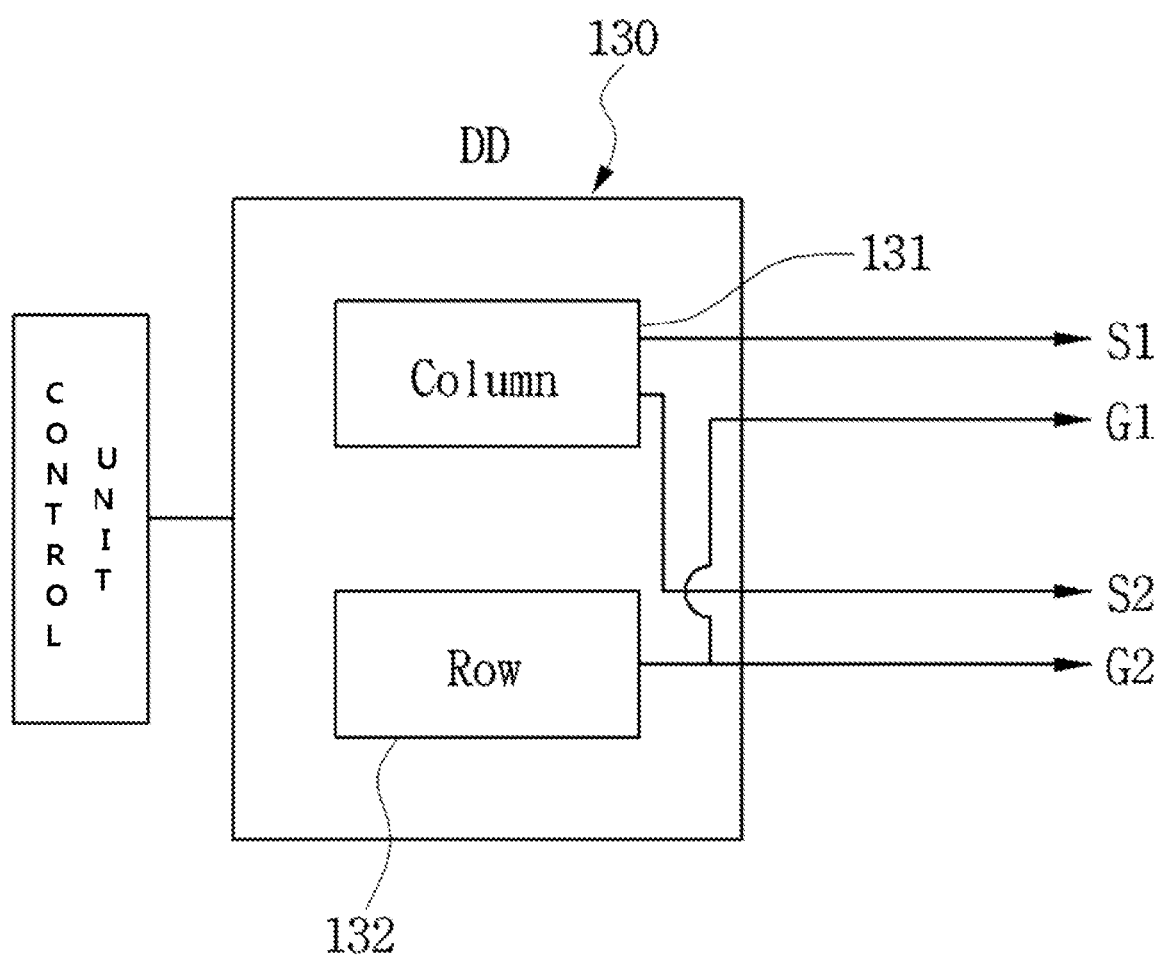

FIGS. 28 and 29 show the display driver 130. The display driver 130 includes a column data processor 131 and a row data processor 132.

A method of dividing a single display screen into two screens can be classified into a method of dividing the source data and a method of dividing the gate signals.

As shown in FIG. 28, the column data processor 131 supplying the source data (data signals of the screen) supplies the same data signals to the first display 2 and the second display 4, and the row data processor 132 divides signals (gate signals) and supplies the divided signals to the first display 2 and the second display 4.

The ratio of division is normally 1:1 (that is, 240 lines of the whole screen are divided into 120 lines and 120 lines for the first and second displays) and the ratio can be adjusted depending on the design of the display device. For example, the ratio of division may be adjusted so that the first display includes 140 lines and the second display includes 100 lines.

As shown in the block diagram of FIG. 29, the row data processor 132 (gate signals) supplies the same data signals to the first display 2 and the second display 4, and the column data processor 131 supplying the source data (data signals of the screens) divides the signals and supplies the divided signals to the first display 2 and the second display 4, respectively.

Figure 30:
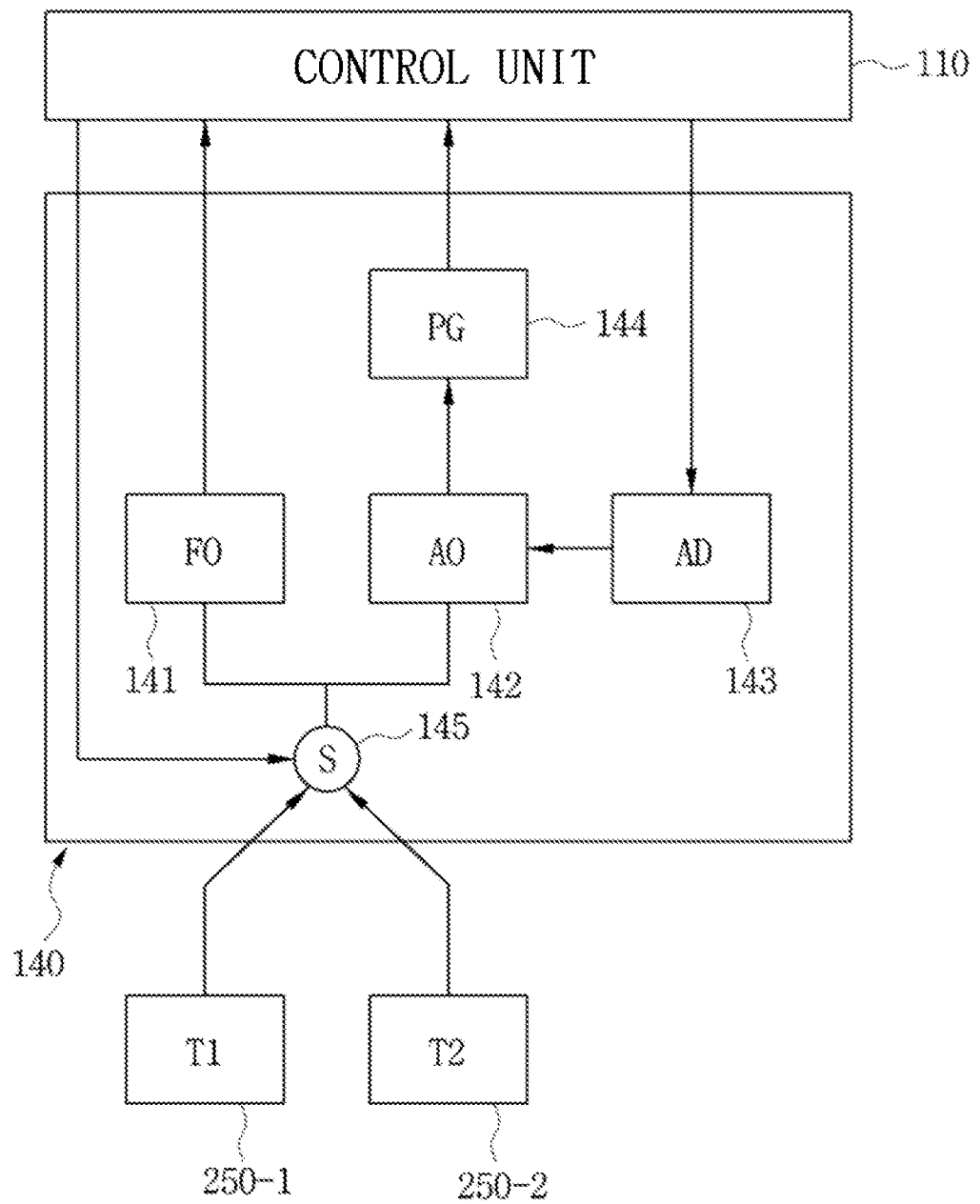

FIG. 30 is a diagram specifically illustrating the input unit driver 140.

A calibration function executing unit 141 executes a function of calibrating the input units 250 at the time of starting up the system. A panel (part of the input unit to which information is directly input) signal corresponding to a correct coordinate value in the input units 250 is selected by the calibration function executed by the calibration function executing unit 141.

That is, the signal of the input unit 250 corresponding to the coordinate value is selected depending on the resolution (the numbers of source and gate lines) of the displays 2 and 4, and the selected signal is supplied to the control unit 110. Accordingly, the control unit 110 stores and manages the coordinate value corresponding to the panel signal.

An average detection number adjusting unit 143 adjusts the number of times of detecting an average value for the panel signal output from the input unit 250 on the basis of the screen resolution information of the displays 2 and 4 supplied from the control unit 110. When the screen resolution is changed to a higher resolution, the number of times of detecting an average value is adjusted to be greater than the previously-set value. On the contrary, when the screen resolution is changed to a lower resolution, the number of times of detecting an average value is adjusted to be smaller than the previously-set value.

An average value detector 142 detects the average value of the panel signals transmitted from the input units 250 on the basis of the number of times of detecting an average value, which is adjusted by the average detection number adjusting unit 143. The detected average value is transmitted to a panel signal generator 144.

The panel signal generator 144 generates an adjusted panel signal on the basis of the changed screen resolution of the displays 2 and 4 supplied from the control unit 110 or the position information of the display screen changed by a virtual scroll and the average value of the presently-input panel signal.

Since there are the first input unit 250-1 and the second input unit 250-2 in the invention, the input unit driver 140 performs the signal control on the first input unit 250-1 and the signal control on the second input unit 250-2.

That is, under the control of the time controller 125 and the control unit 110, a switching element 145 alternately connects the first input unit 250-1 and the second input unit 250-2 to the input unit driver 140.

The alternate connection means that the signal generated from the first input unit 250-1 is first processed and the signal generated from the second input unit is then processed, that is, that the signals from the input units 250-1 and 250-2 are alternately processed in a time division manner.

In this case, the time is divided into very small time pieces such as one over ten seconds, one over ten hundred seconds, and one over million seconds, and thus it is possible to sufficiently cope with the case where information is manually input.

Although the signals from the input units can be alternately processed in the embodiment of the invention, controllers may be provided to the input units 250-1 and 250-2, respectively and may control and process the signals from the input units.

Figure 31:
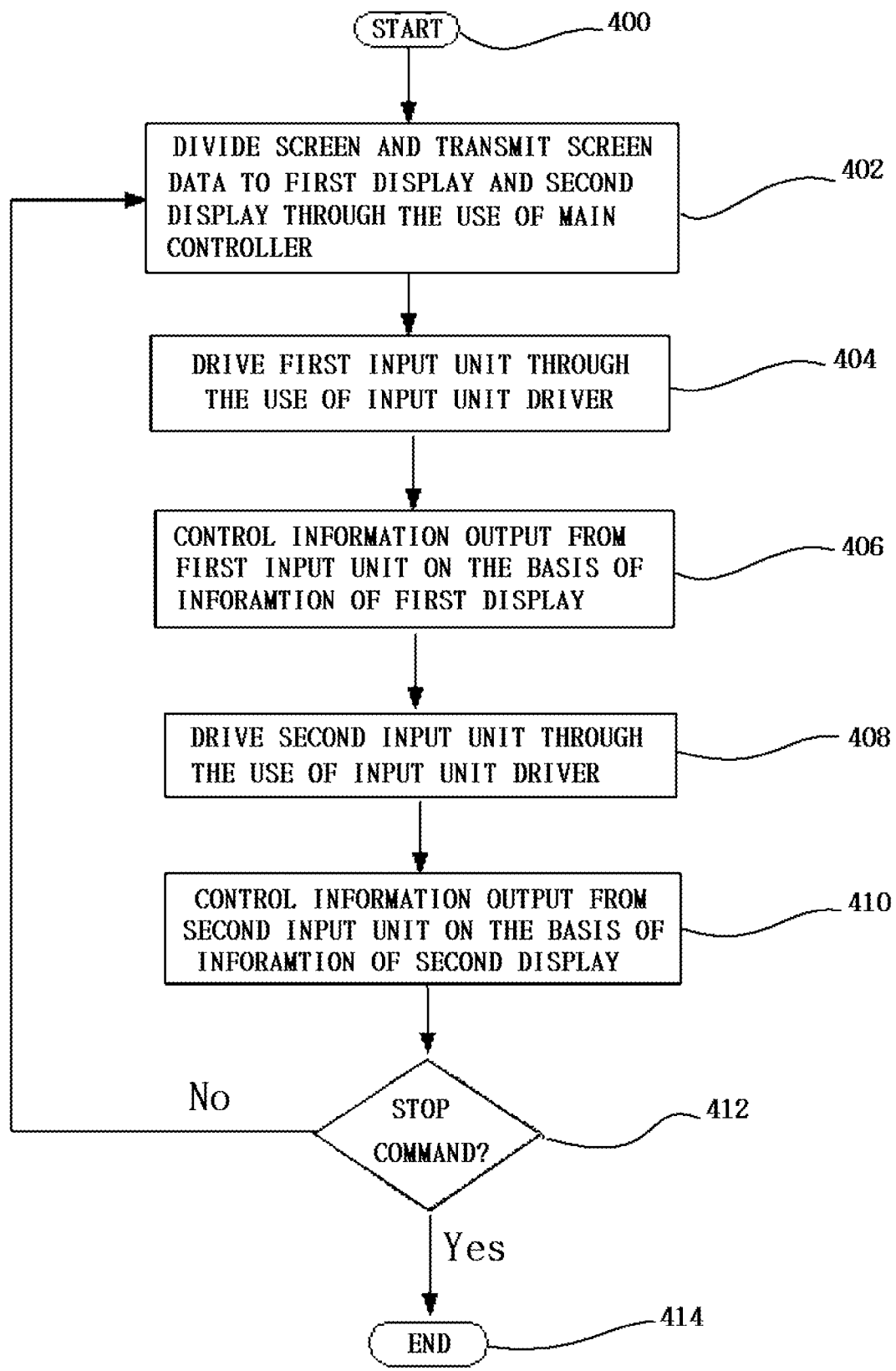
FIG. 31 is a flowchart illustrating a driving method according to the invention.

FIG. 31 is a flowchart illustrating the flow of processes in the invention.

When the portable display device according to the invention is started up, the main controller 105 is started up to control the units thereof (step 400).

The control unit 110 in the main controller 105 divides the screen display data stored in the memory 120 or the received screen display data. This function is performed by the display driver 130 and the time controller 125 under the control of the control unit 105 (see FIGS. 28 and 29).

Accordingly, the main controller 105 divides the screen and transmits the corresponding screen data information to the first display and the second display (step 302).

Then, the input unit driver 140 drives the first input unit 250-1 through the use of the switching element 145 shown in FIG. 30. That is, information output from the first input unit is controlled (step 404). The information output from the first input unit is controlled on the basis of the screen display information of the first display 2 (step 406). The method of controlling the input unit on the basis of the display information is the same as described with reference to FIG. 30.

Similarly, the input unit driver controls the output signal of the second input unit through the use of the switching element 145 (step 408), and controls the output signal of the second input unit on the basis of the screen display information of the second display (step 410). This step is the same as described with reference to FIG. 30.

When a stop command is not given, the main controller divides the screen and drives the respective input units. When a stop command is given, such functions are ended (steps 412 and 414).

That is, the input unit driver in the invention controls the information output from the first input unit on the basis of the screen information of the first display and controls the information output from the second input unit on the basis of the screen information of the second display. By causing the input unit driver to repeatedly perform such control, two input units can be controlled as if they are a single input unit.

Embodiment 2

FIGS. 32 to 37 are diagrams illustrating another sliding structure.

Figure 32:
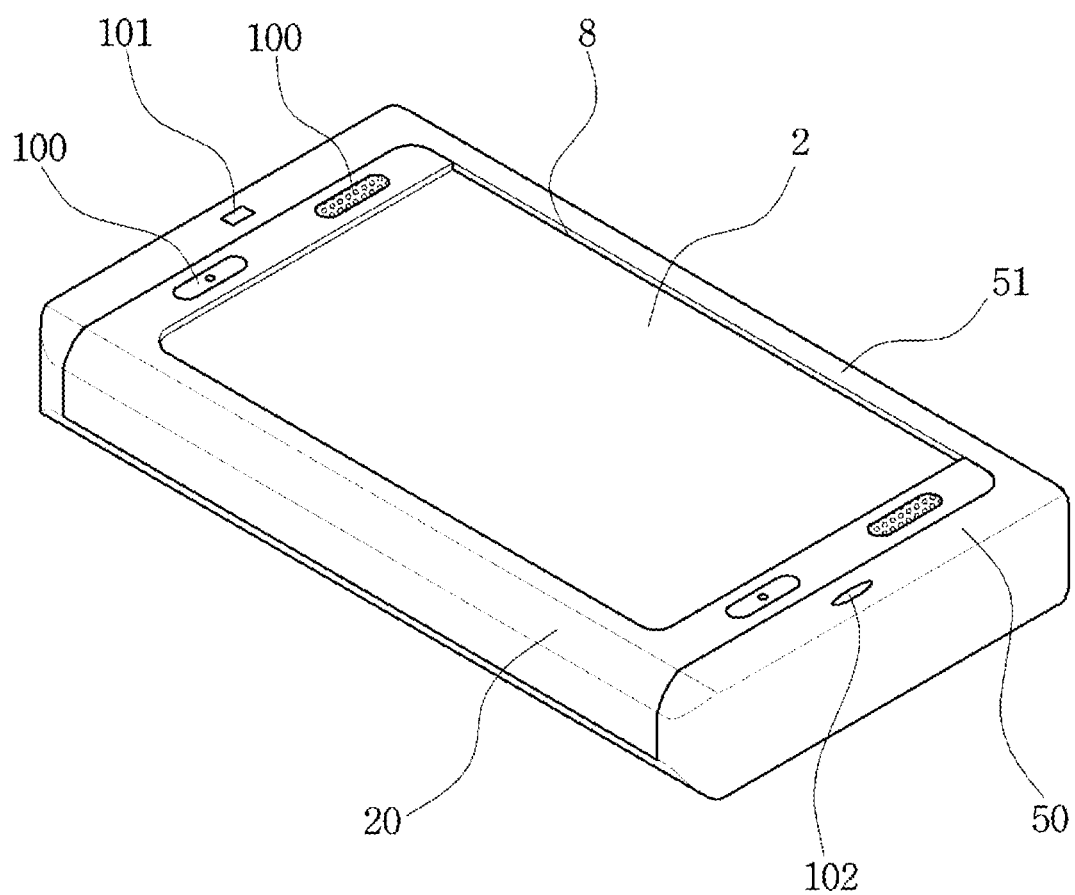
FIGS. 32 to 37 are diagrams illustrating a sliding structure according to another embodiment of the invention.

FIG. 32 is a diagram illustrating a state where the screen is not enlarged by sliding.

As shown in the drawing, the display 2 mounted on the upper panel housing 20 is visible. A speaker 101 and a microphone 102 used for telephone conversation are provided to realize the function of a mobile phone in this state. A selection button 100 and the like are also provided thereto.

When it is necessary to increase a sound volume for use of the portable display device as a multimedia device, a separate speaker may be provided at a position indicated by reference numeral. A protective lid 51 serving as a lid protecting the side surface of the joint 8 of the display 2.

Figure 33:
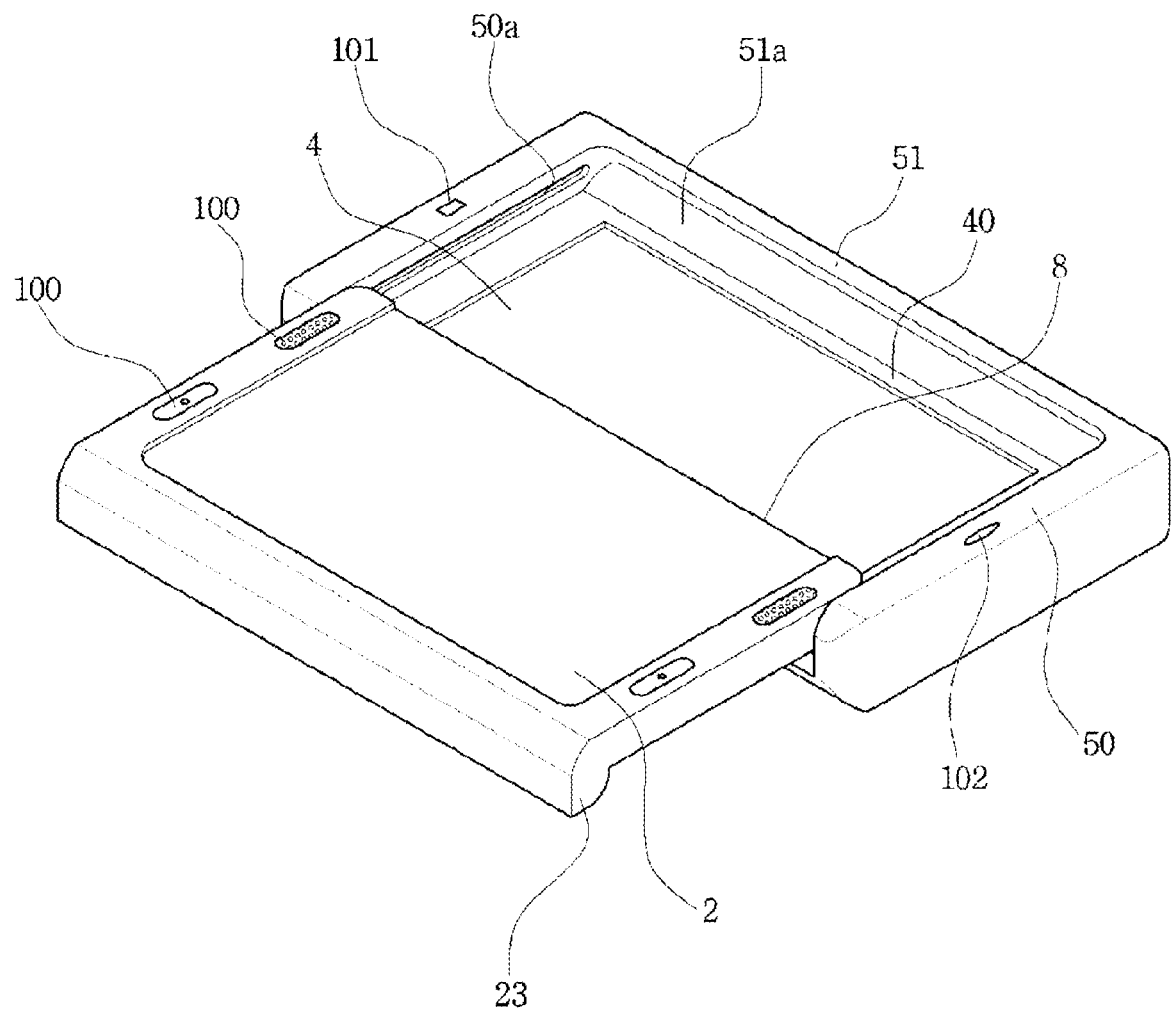

FIG. 33 is a diagram illustrating a state where the upper panel housing horizontally slides.

As shown in the drawing, when the upper panel housing 20 horizontally slides, the lower display 4 mounted on the lower panel housing 40 is visible. The sliding is carried out through the use of a sliding groove 50a formed in the inner side surface of the housing 50.

Another protective lid 23 is disposed on the opposite side of the joint 8 in the upper panel housing 20. The protective lid 23 protects the side surface of the joint 8 of the lower display 4.

That is, the protective lid 23 of an outer wall disposed in the upper panel housing 20 protects the side surface of the lower display 4 and the protective lid 51 disposed in the lower panel housing 40 protects the side surface of the joint 2 of the upper display 2.

As shown in the drawing, the inner side surface 51a of the protective lid or outer wall 51 protects the side surface of the joint of the upper display 2.

Accordingly, in the state where the upper and lower displays are stacked, the protective lids 23 and 51 protect the side surfaces of the joint of the displays 2 and 4. When the upper and lower displays slide, the protective lids do not protect the side surfaces of the joint of the displays 2 and 4.

That is, with the sliding of the displays, the protective lids 23 and 51 protecting the side surfaces of the joint of the displays 2 and 4 move.

Figure 34:
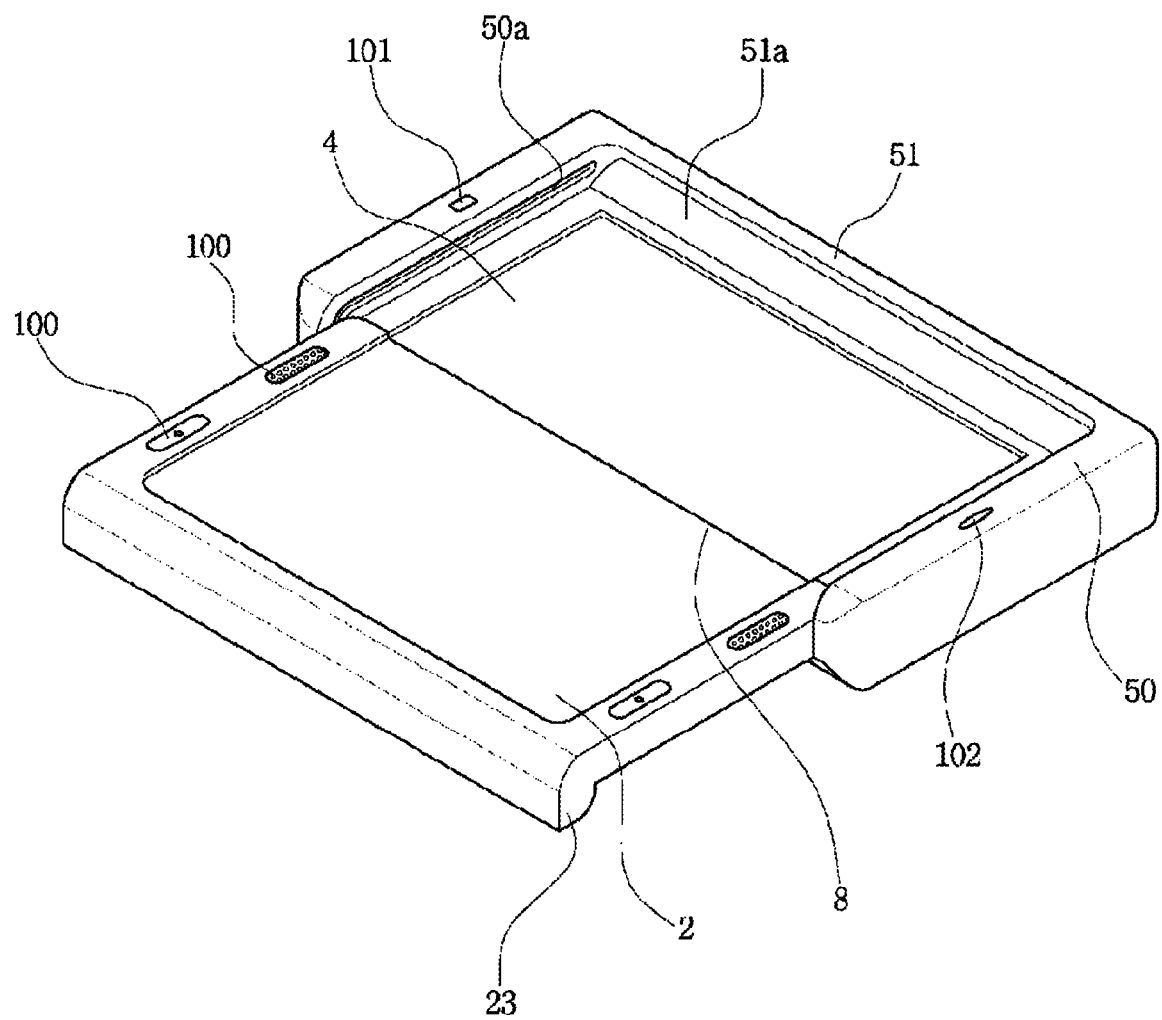

FIG. 34 is a diagram illustrating a state where the upper panel housing vertically moves.

When the upper panel housing 20 horizontally slides and then vertically moves, the upper and lower displays 2 and 4 are flush with and contiguous to each other.

Figure 35:
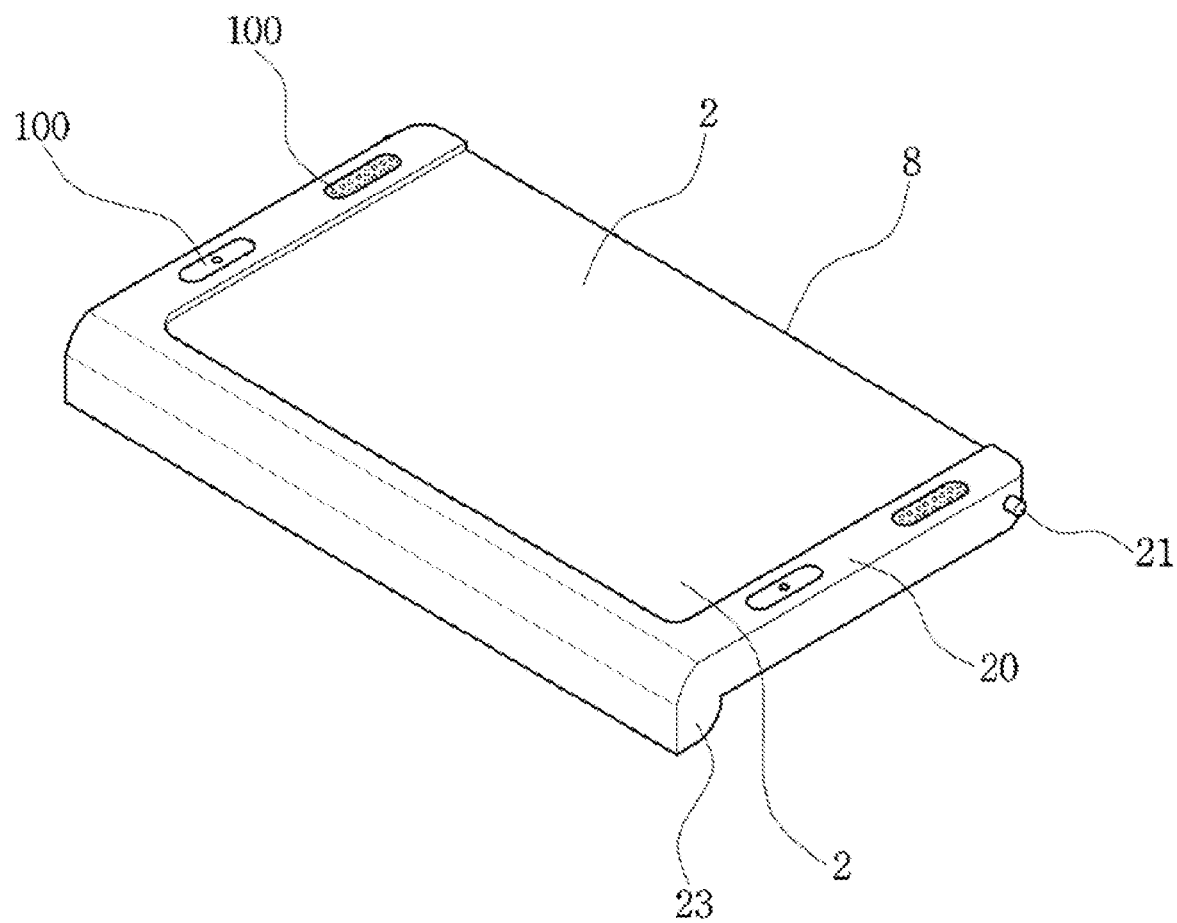
Figure 36:
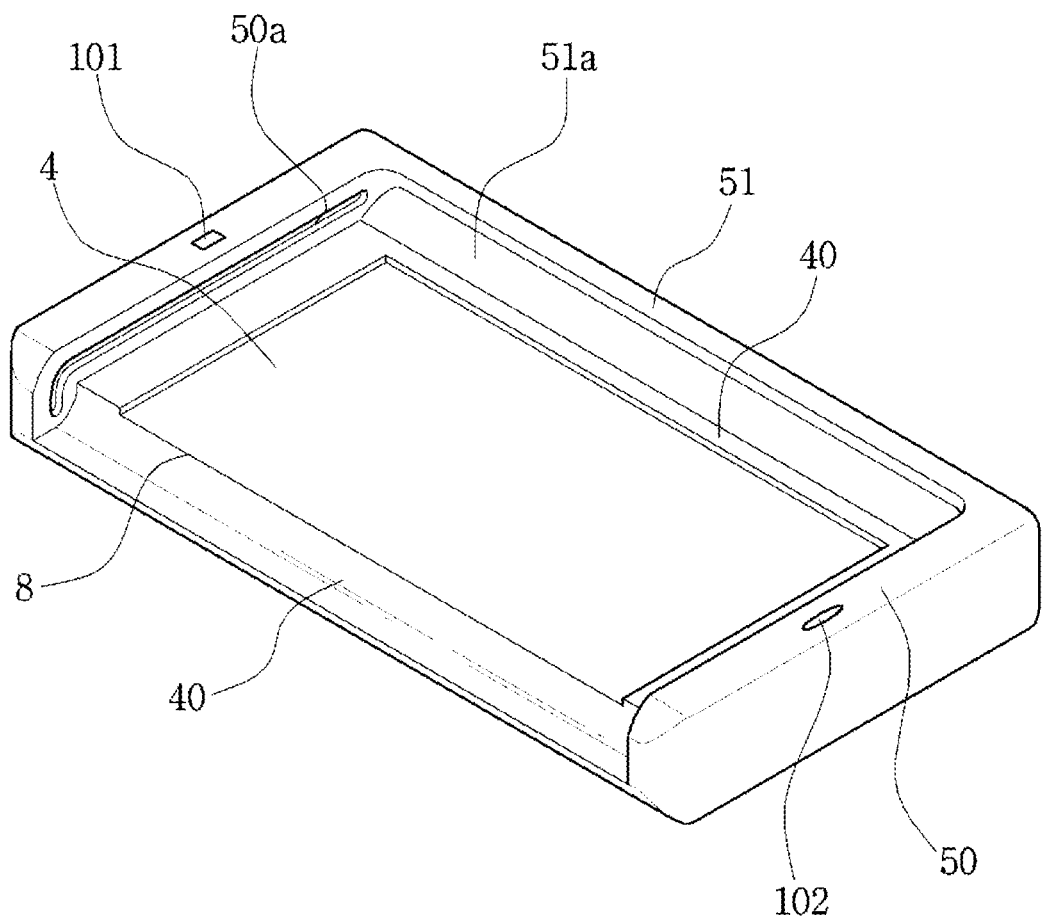

FIGS. 35 and 36 are diagrams illustrating the upper and lower panel housings which are separated from each other.

FIG. 35 shows the upper panel housing 20 and FIG. 36 shows the housing 50 and the lower panel housing 40.

As shown in the drawings, a sliding protrusion 21 disposed in the upper panel housing 20 is coupled to a sliding groove 50a to couple the upper and lower panel housings 20 and 40 to each other and to cause them to slide.

On the other hand, the grooves 50a disposed in both side surfaces of the lower panel housing 40, that is, in the inner side walls of the housing 50, are curved in the part corresponding to the joint 8. Accordingly, the upper and lower panel housings 20 and 40 move in a curved path when they vertically move.

Figure 37:
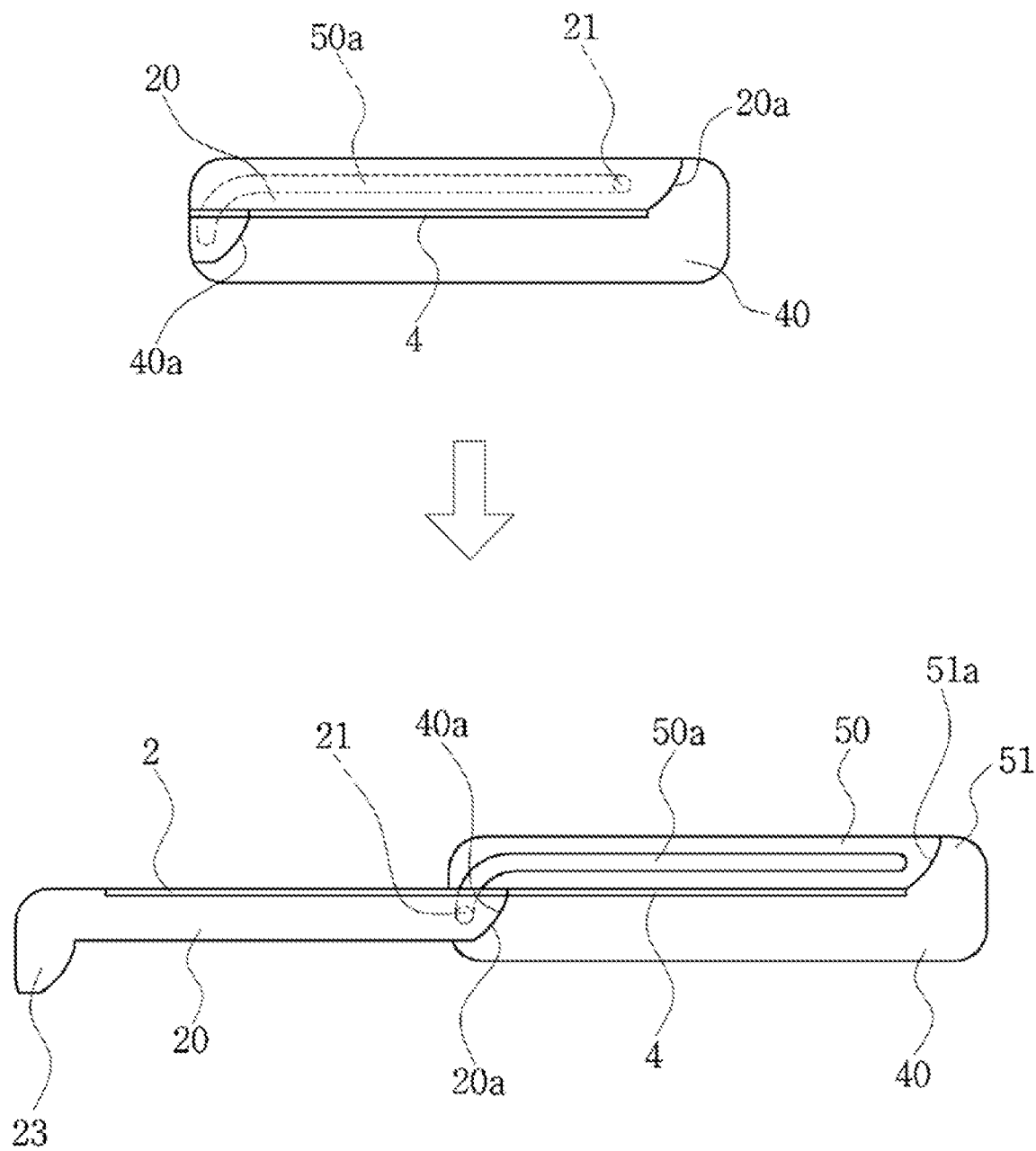

FIG. 37 is a diagram illustrating a state where the panel housing slides.

The drawing above the arrow in FIG. 37 shows a state where the upper and lower displays 2 and 4 are stacked and the drawing below the arrow shows a state where the displays are stretched.

As shown in the drawing, the sliding grooves 50a have a curved shape in the part corresponding to the joint 8. Accordingly, the panel housing 20 and 40 move in a straight path when horizontally moving, but move in a curved path when vertically moving.

The inner surface 51a of the lid 51 and the inner surface of the lid 23 disposed in the upper panel housing have a curved shape. Accordingly, the side walls 20a and 40a of the panel housings 20 and 40 coming in contact with the inner surfaces of the lids 51 and 23 have a curved shape. The side walls 20a and 40a are parts corresponding to the joint.

Figure 38:
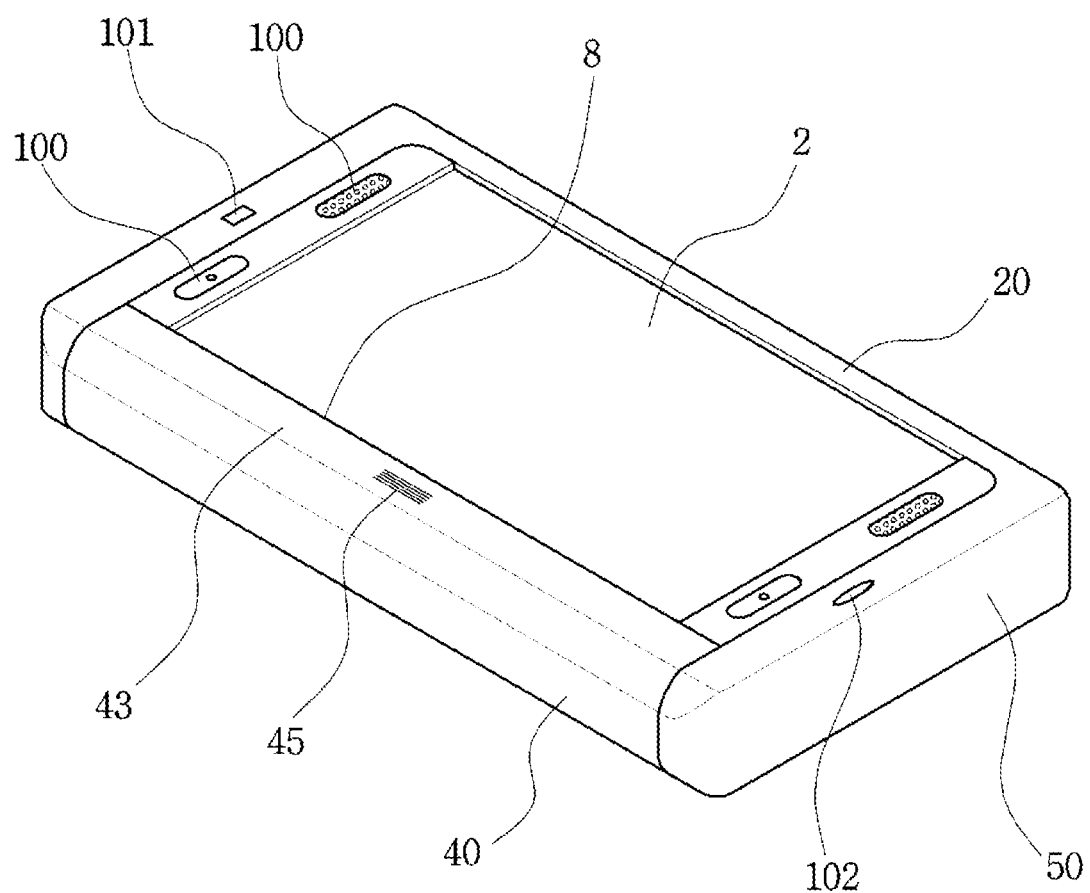
FIGS. 38 to 40 are diagrams illustrating a state where the lower panel housing slides.
Figure 39:
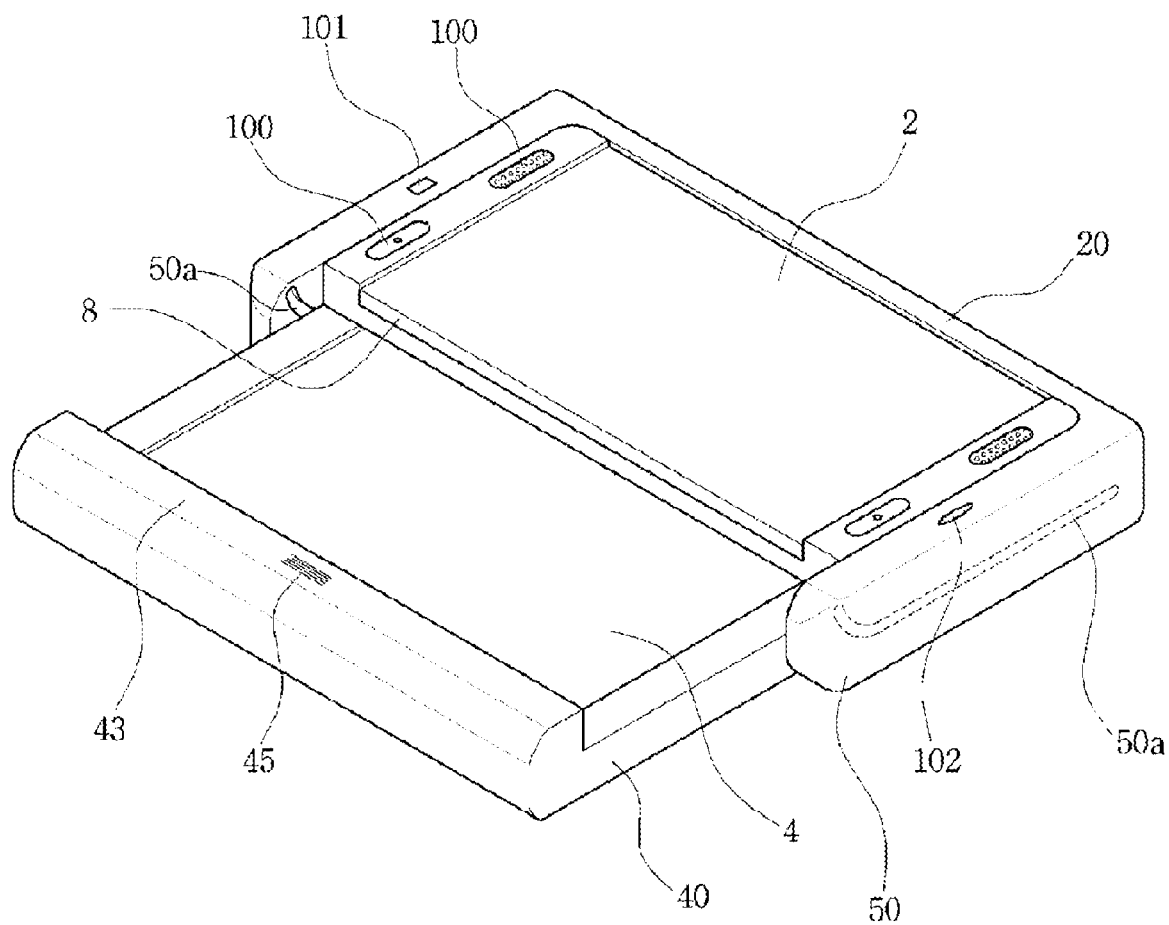
Figure 40:
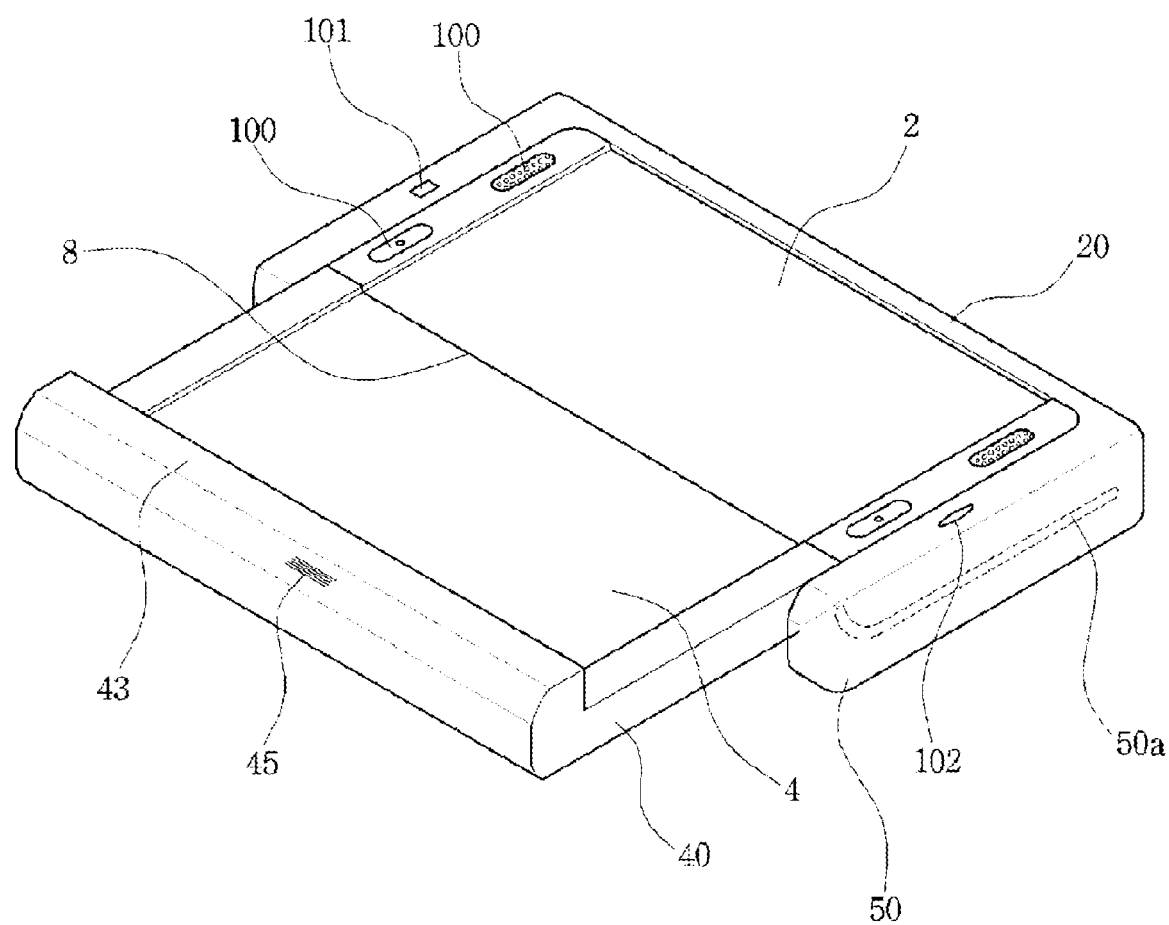

FIGS. 38 to 40 are diagrams illustrating an example where the lower panel housing slides.

FIG. 38 is a diagram illustrating a state where the upper and lower panel housings 20 and 40 are stacked. in the stacked state, a speaker 101 and a microphone 102 used for telephone conversation are provided enable the telephone conversation.

A grip 25 is disposed in the protective lid 43 protecting the side surface of the joint 8 of the upper display 2. The grip 45 is formed as a long protrusion or groove on the surface of the lid 43 and is grasped with a hand when the upper display slides with the lid 43 grasped.

The lid 43 connected to the lower panel housing 40 protects the side surface of the joint of the upper display 2.

FIG. 39 is a diagram illustrating a state where the lower panel housing 40 slides. When the lower panel housing 40 slides as shown in the drawing, the protective lid 43 does not protect the side surface of the joint 8 of the upper display.

The sliding protrusions 50a formed on the inner surfaces of the housing 50 has a curved shape. That is, the lower panel housing 40 moves along a straight path when horizontally moving, but moves along a curved path when vertically moving.

Accordingly, as shown in FIG. 37, the inner surface of the lid 43 has a curved shape and the side wall of the joint of the panel housing 20 coming in contact with the inner surface of the lid 43 also has a curved shape.

On the other hand, although not shown in the drawing, a protective lid extending from the housing 50 or the upper panel housing 20 protects the side surface of the joint of the lower display 4 when the displays 2 and 4 are vertically stacked.

FIG. 40 is a diagram illustrating a state where the displays are stretched fully. That is, the lower panel housing 40 horizontally slides (FIG. 39) in the state where the upper and lower panel housings 20 and 40 are stacked (FIG. 38), and then vertically moves along the curved path to extend two displays 2 and 4 fully. As a result, two displays 2 and 4 are flush with each other (FIG. 40).

Embodiment 3

FIGS. 41 to 52 are diagrams illustrating another embodiment of the invention.

Figure 41:
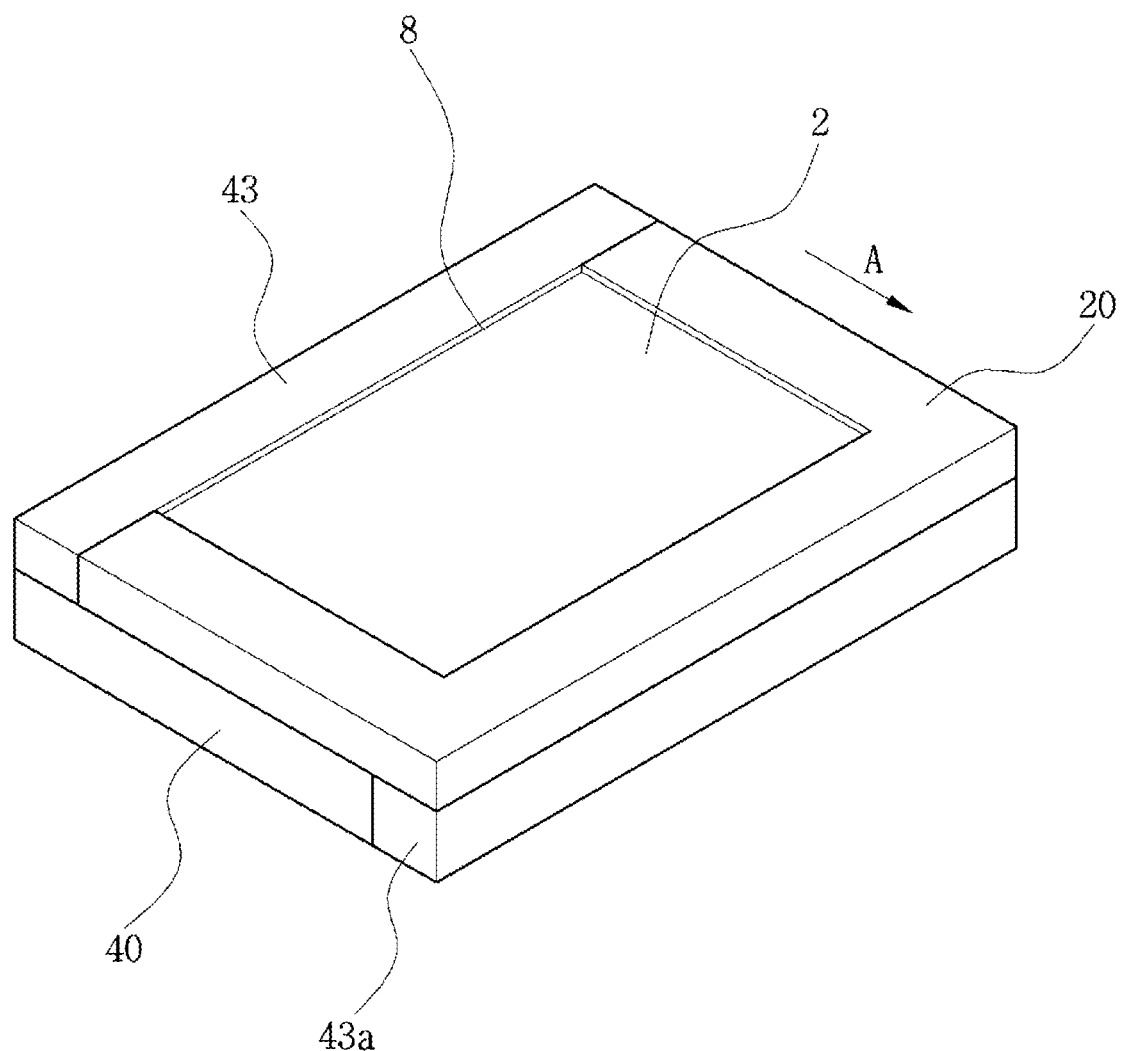
FIGS. 41 to 52 are diagrams illustrating a sliding structure according to another embodiment of the invention.

FIG. 41 is a diagram illustrating a state where the panel housings are stacked in another embodiment.

The upper panel housing slides in the direction of arrow A and the joint 8 of the upper display 2 is protected by the lid 43.

Figure 42:
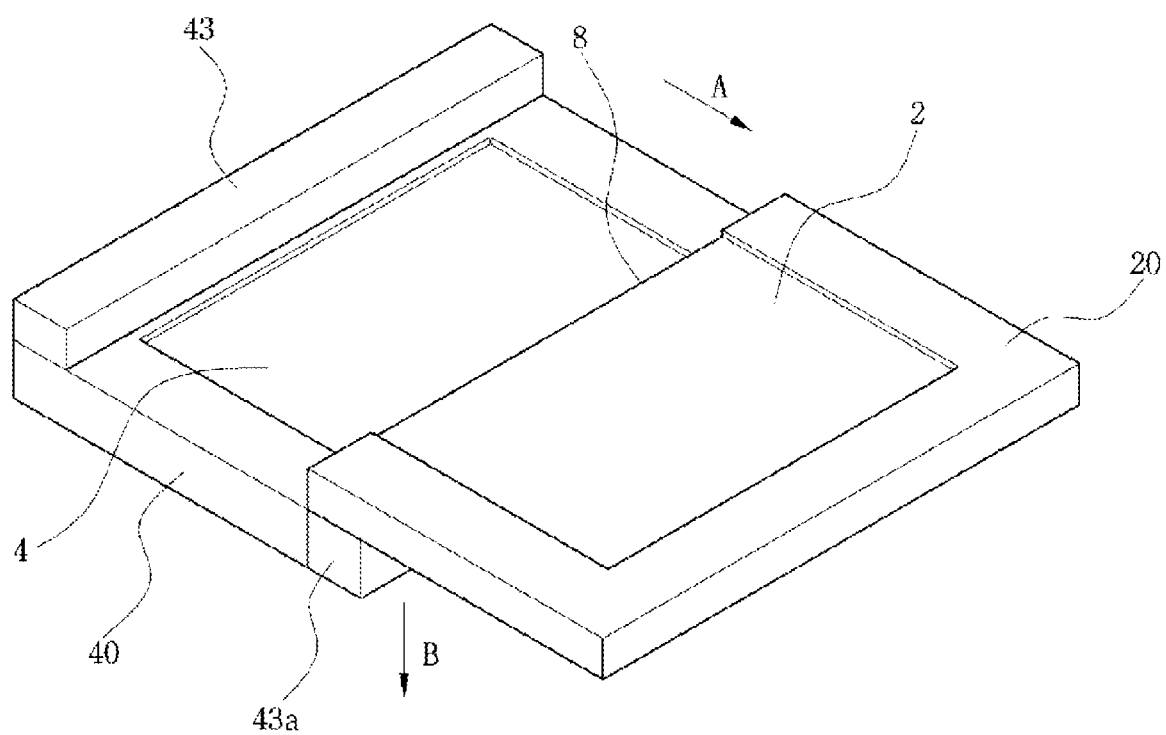

FIG. 42 is a diagram illustrating a state where the upper panel housing slides and extends.

When the panel housings 20 and 40 are stretched, the joint 8 is not covered with the lid 43 and the lower display 4 mounted on the lower panel housing 40 is visible.

Figure 43:
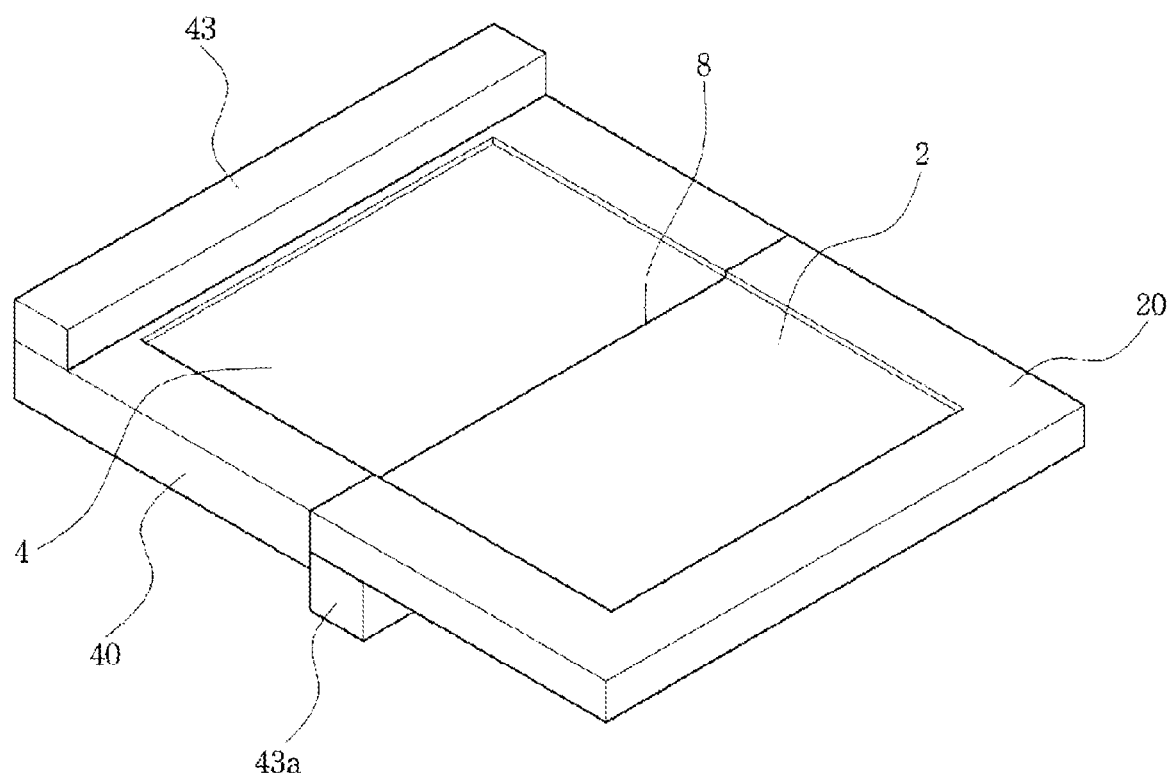

FIG. 43 is a diagram illustrating a state where two displays are stretched fully.

When the upper panel housing 20 moves in the direction of arrow B, that is, downward, in FIG. 42, the state shown in FIG. 43 is obtained.

In the invention, a lower lid 43a vertically moves on the side surface of the lower panel housing 40. That is, when the lower lid 43a slides downward, the upper panel housing 20 on the lower lid 43a moves downward.

That is, the lower lid 43a is disposed on the side surface of the lower panel housing 40 to protect the joint 8 of the lower display 4. However, when the lower lid 43a moves downward, the lower lid does not protect the joint of the lower display 4. As a result, the upper and lower displays 2 and 4 are contiguous to each other.

Figure 44:
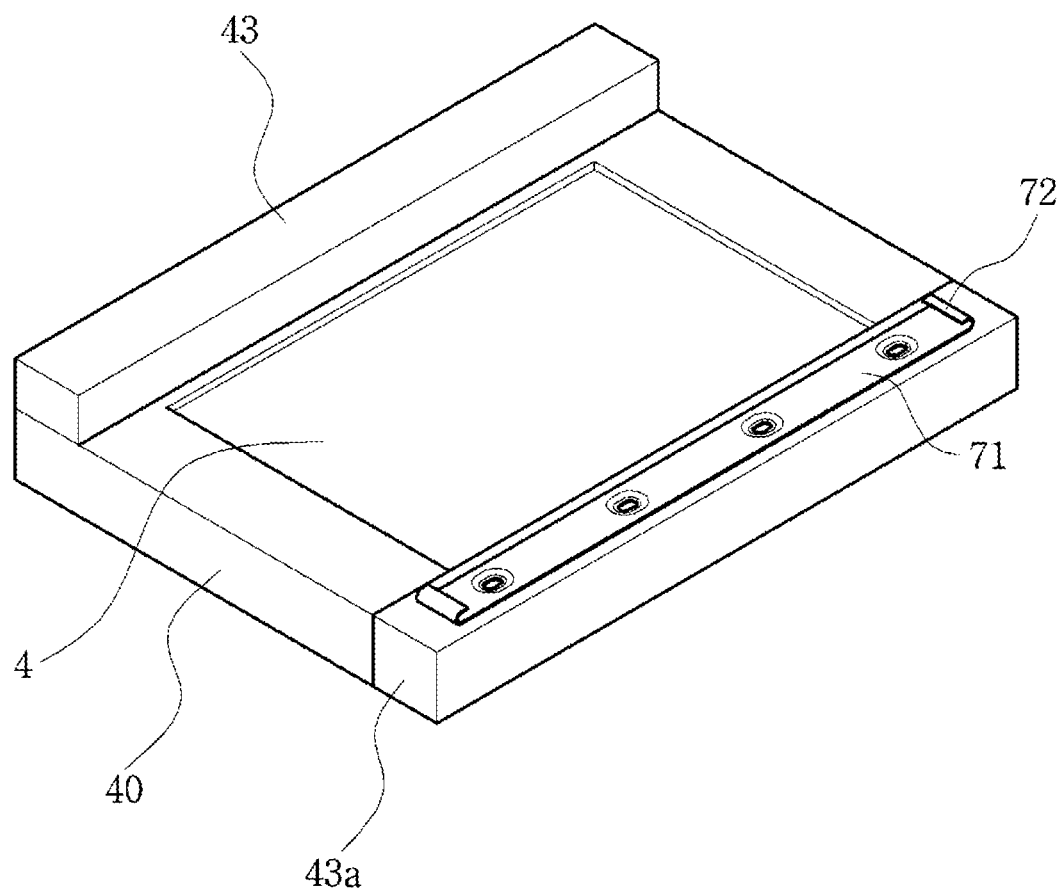
Figure 45:
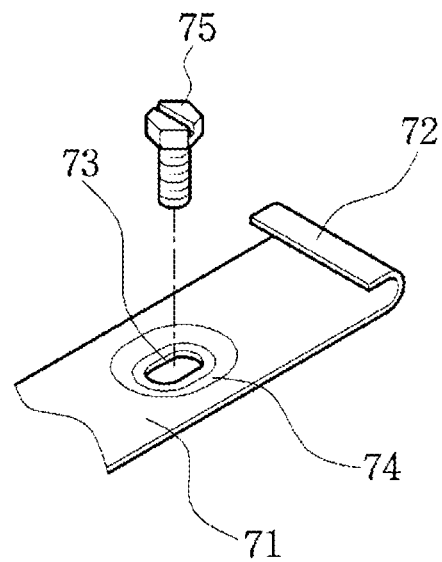

FIGS. 44 and 45 are diagrams illustrating a state where the upper panel housing is removed.

As shown in the drawing, a protrusion plate 71 as sliding means is disposed on the lower lid 43a. The protrusion plate 71 supports the upper panel housing 20 so as to enable the upper panel housing 20 to slide. Protrusions 72 contribute to the sliding.

That is, this embodiment is basically characterized in that a plate-like structure formed of metal, alloy, or reinforced plastic supports the upper panel housing to enable the upper panel housing to moved.

The protrusion plate 71 is strongly fixed to the top of the lower lid 43a by the use of a fixing portion 75. At this time, the fixing portion 75 is fixed via a protrusion plate groove 73 disposed in the protrusion plate 71 and the protrusion plate groove 73 is formed in a concave portion 74.

The concave portion 74 is formed to be lower than the surface of the protrusion plate 71 so that the fixing portion 75 fixed to the protrusion plate 71 is not higher than the surface of the protrusion plate 71.

At this time, the protrusion plate 71 and the fixing portion 75 serving as the sliding means are formed of metal or alloy so as to be durable.

Figure 46:
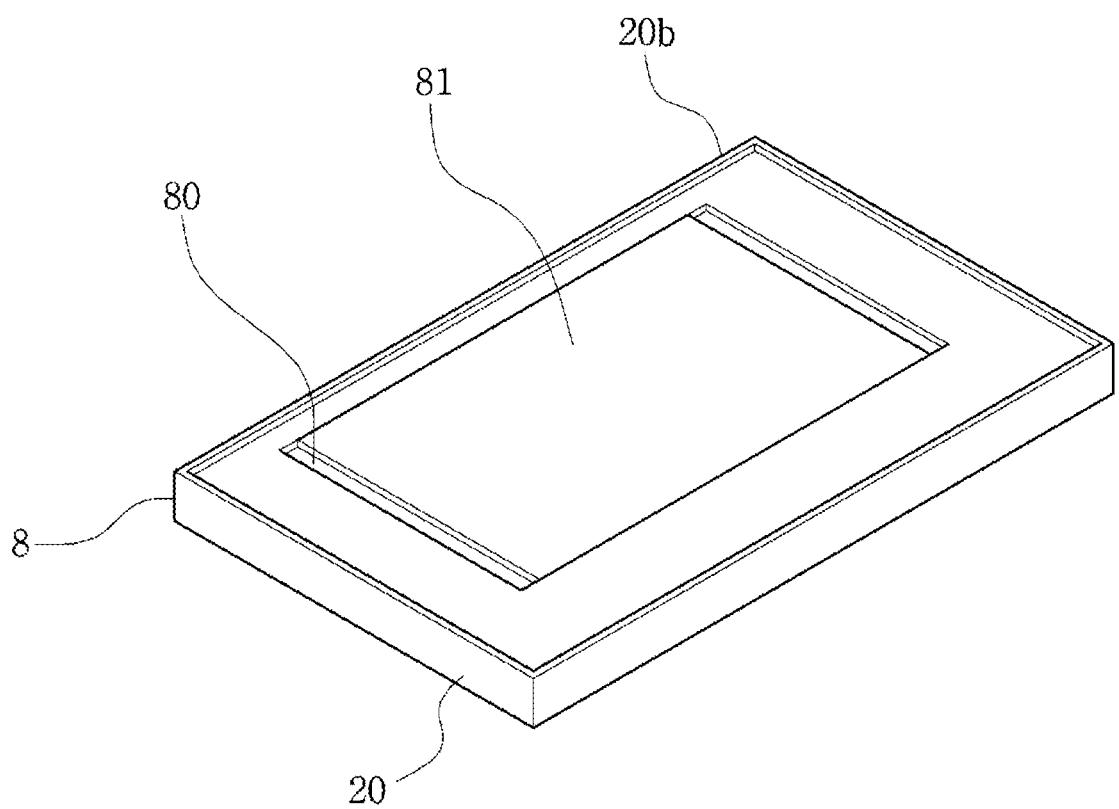

FIG. 46 is a diagram illustrating the bottom of the upper panel housing.

A leg 20b is disposed on the bottom of the upper panel housing 20 so as to protrude from the bottom surface of the upper panel housing. Accordingly, a space in which the protrusion plate 71 can slide is formed in the bottom of the upper panel housing 20.

A bottom groove 80 is formed in the bottom of the upper panel housing 20 and the protrusions 72 of the protrusion plate 71 engage with the bottom groove 80 to enable the upper panel housing to slide.

The bottom groove 80 is formed by a bottom plate 81.

Figure 47:
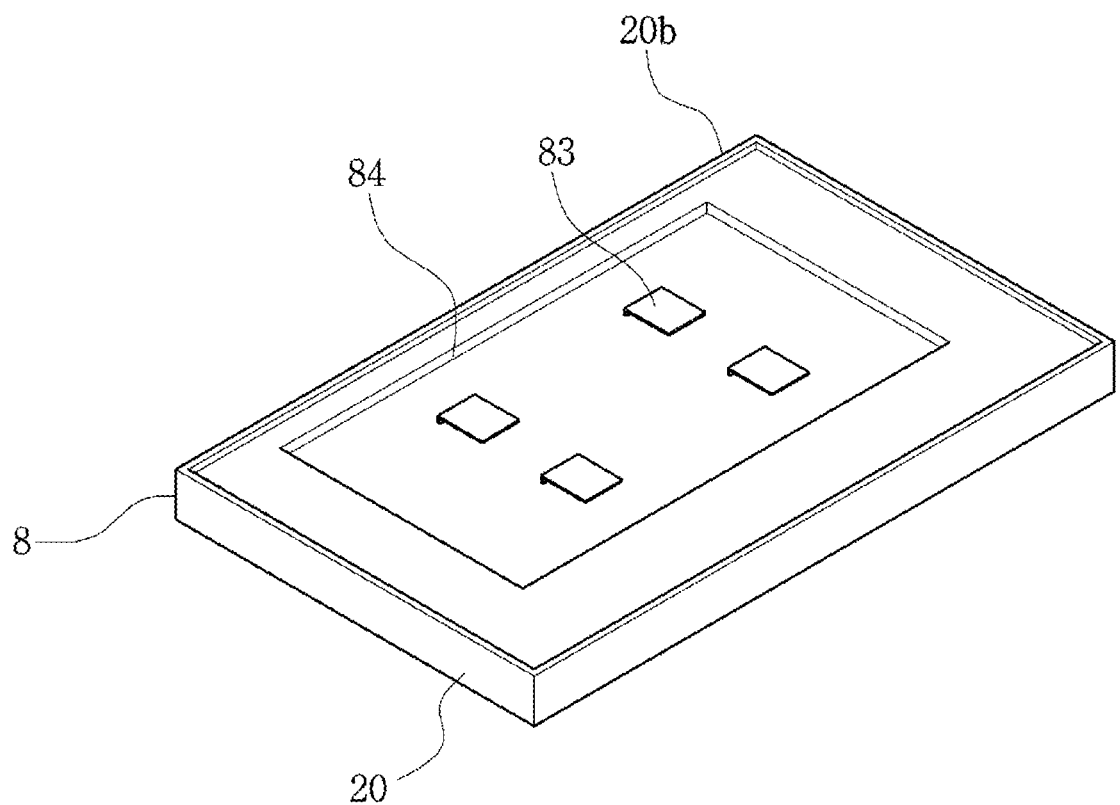
Figure 48:
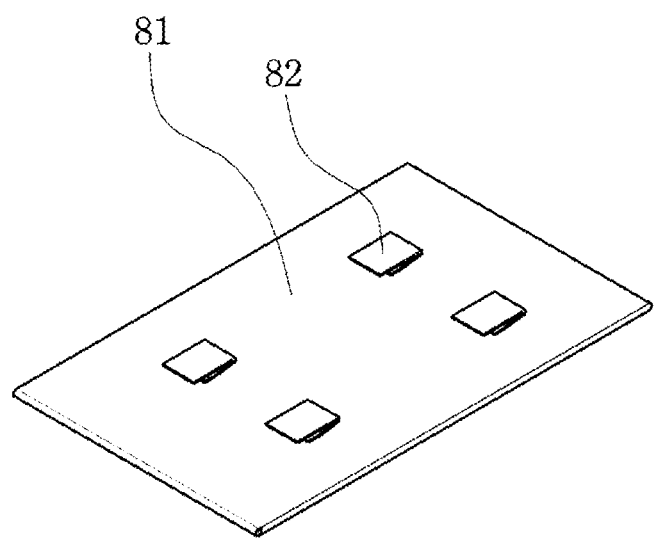

FIGS. 47 and 48 are diagrams illustrating a state where the bottom plate is removed from the upper panel housing.

A stepped portion 84 is formed in the bottom of the upper panel housing to form a space, hooks 83 are formed in the space, and hooks 82 formed on the bottom plate 81 is strongly fixed to the hook 83.

Figure 49:
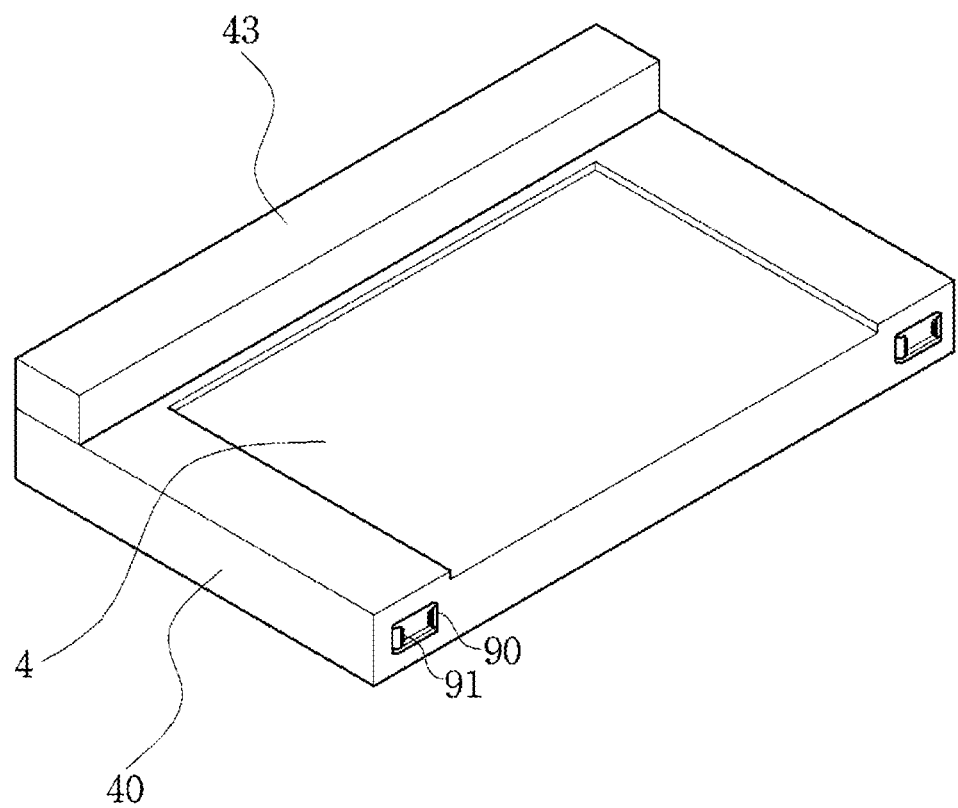
Figure 50:
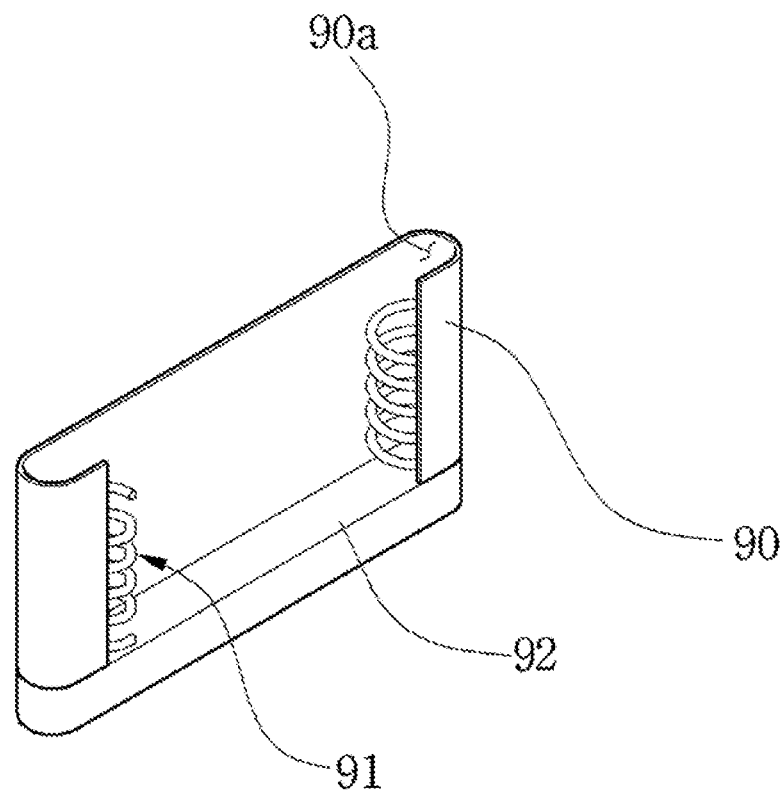

FIGS. 49 and 50 are diagrams illustrating a state where the lower lid is removed.

When the lower lid 43a is removed from the lower panel housing 40, vertical moving means disposed in the joint of the lower panel housing 40 is visible. The vertical moving means can enable the lower lid 43a to slide in the lower panel housing 40.

The vertical moving means includes a support plate 90 and springs 91 disposed on both side of the support plate 90. Internal grooves 90a are disposed on both sides of the support plate 90 and an inner bottom 92 is also provided.

Figure 51:
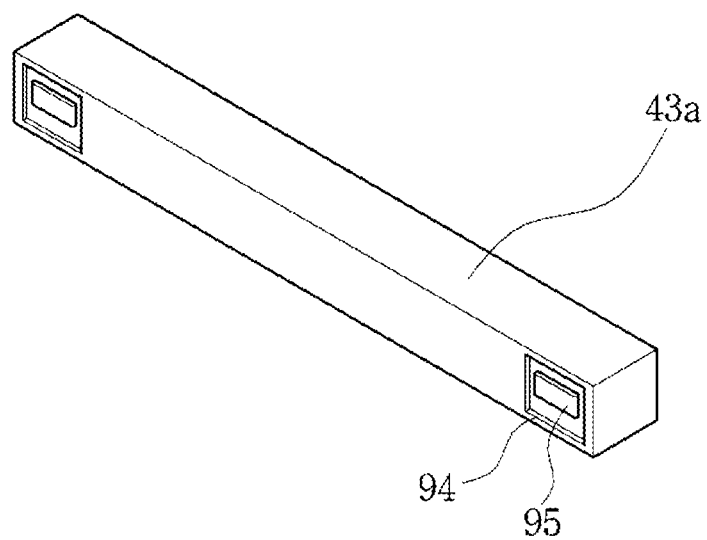
Figure 52:
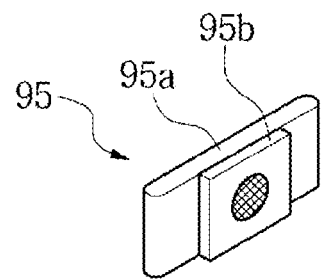

FIGS. 51 and 52 are diagrams illustrating a coupling portion of the lower lid.

As shown in the drawings, the structure coupling the side surface of the lower lid 43a to the side surface of the lower panel housing 40 is visible.

A lid space 94 is formed on both sides of the lower lid 43a and a coupling portion 95 is disposed in the lid space 94. The coupling portion 95 includes a head 95a and an attachment portion 95b and the coupling portion 95 is fixed to the internal space 94 (the coupling portion is fixed to the part marked in a circle shape with an adhesive, a screw, a coupling protrusion, or the like).

Accordingly, the coupling portions 95 engage with the internal grooves 90a on both sides of the support plate 90 to move. The movement of the coupling portion 95 is limited by the inner bottom 92. That is, the lower lid 43a is prevented from going down more than necessary. The lower lid 43a can be easily restored by the springs 91.

Embodiment 4

Figure 53:
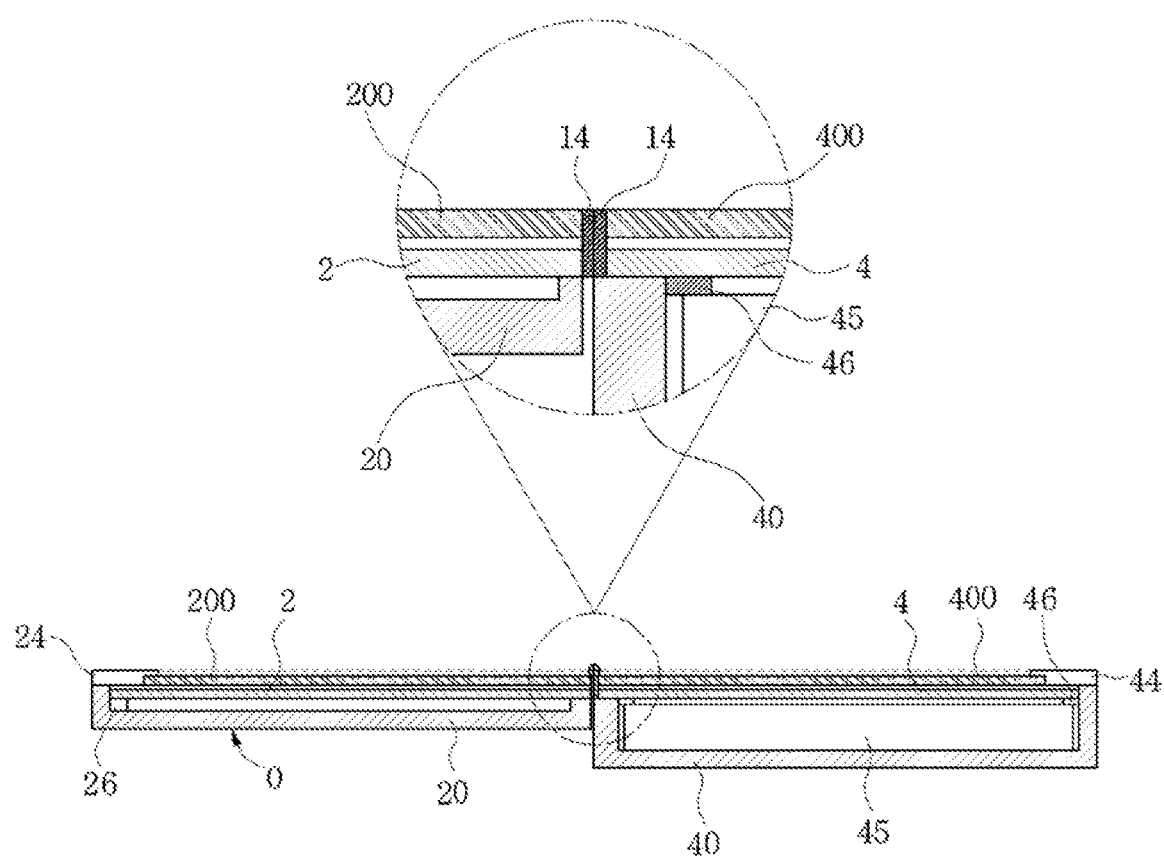
FIG. 53 is a sectional view of two panel housings.

FIG. 53 is a sectional view of two panel housings.

The thicknesses of the panel housings 20 and 40 may be different from each other as shown in the drawing. The upper panel housing 20 may be thinner in FIGS. 32 to 34. In the invention, the panel housings 20 and 40 serve as a case of the portable display device.

The display 2 and the input unit 200 are disposed just on the bottom portion (indicated by arrow "0" in the drawing) of the thinner panel housing 20.

Elements such as a battery or a main controller are received in a main element section 25 below the display of the thicker panel housing 40.

Supports 26 and 46 supporting the display 2 or the like may be provided.

Figure 54:
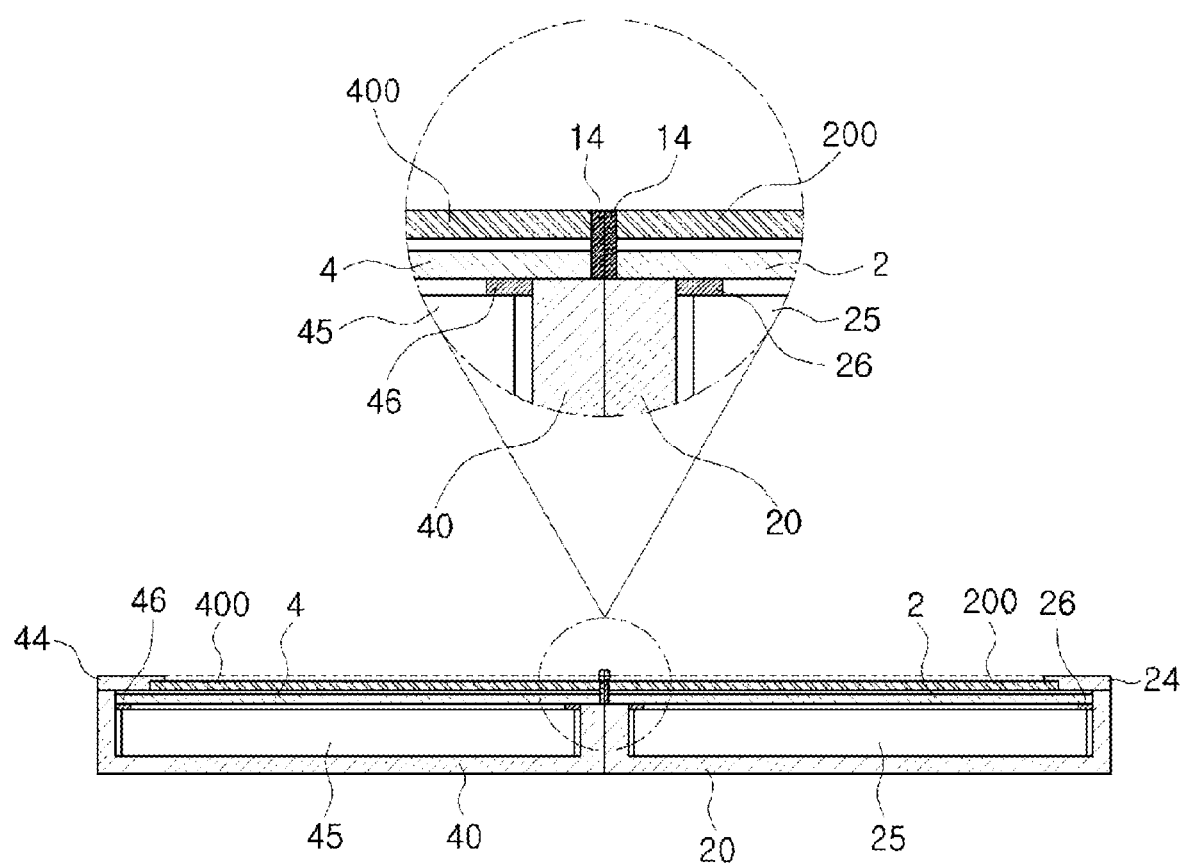
FIG. 54 is a sectional view illustrating an example where the thicknesses of two panel housings are similar to each other.

FIG. 54 is a sectional view illustrating an example where the thicknesses of two panel housings are similar to each other.

The sectional views of a single panel housing 20 are shown in FIGS. 12 to 18 for the purpose of easy drawing. This is because the other panel housing 40 has the symmetric structure.

FIG. 54 shows an example of the symmetric structure. This symmetric structure can be applied to FIGS. 12 to 18.

Even when both panel housings have the symmetric structure, the elements mounted on the panel housings are not equal to each other. That is, the display 2 or 4, the input unit 200 or 400, and elements related to the display and the input unit are all included in both panel housings 20 and 40.

The elements of the main controller 105 shown in FIG. 27 or the battery (not shown) need not be included in both two panel housings. That is, the battery may be mounted on one element section 25 of the element sections 25 and 45 and the main controller 105 may be mounted on the other element section 45.

On the other hand, a protective film 14 may be provided between two displays 2 and 4 when the panel housings are stretched as shown in FIGS. 53 and 54. The side walls 20a and 40a of the panel housings may be provided between the displays 2 and 4 as described in the previously-mentioned embodiments. In this case, it is preferable that the thickness of the side walls of the panel housings not be greater than 1.5 mm.

Figure 55:
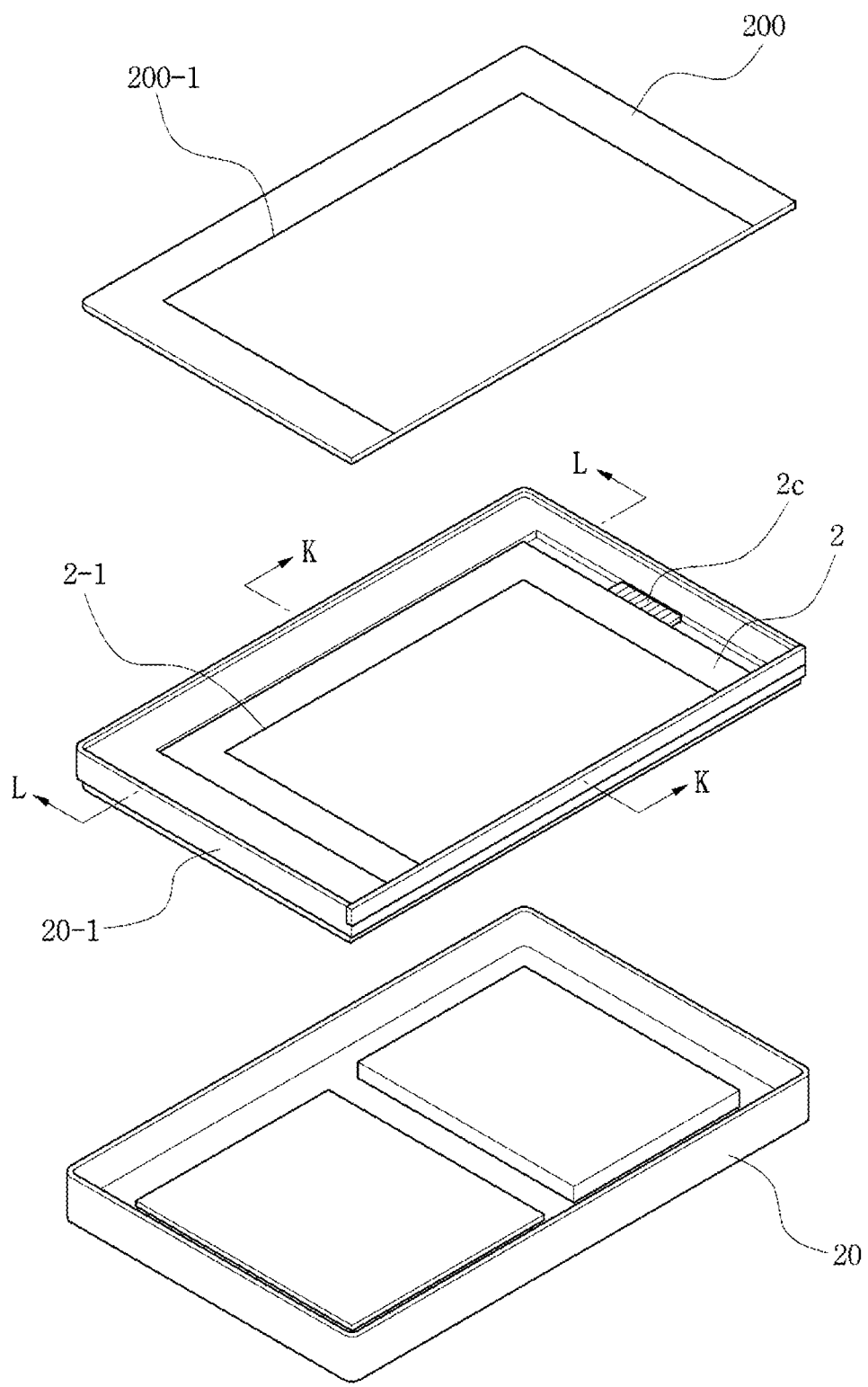
FIGS. 55 to 57 are diagrams illustrating an example where a frame housing is provided.
Figure 56:
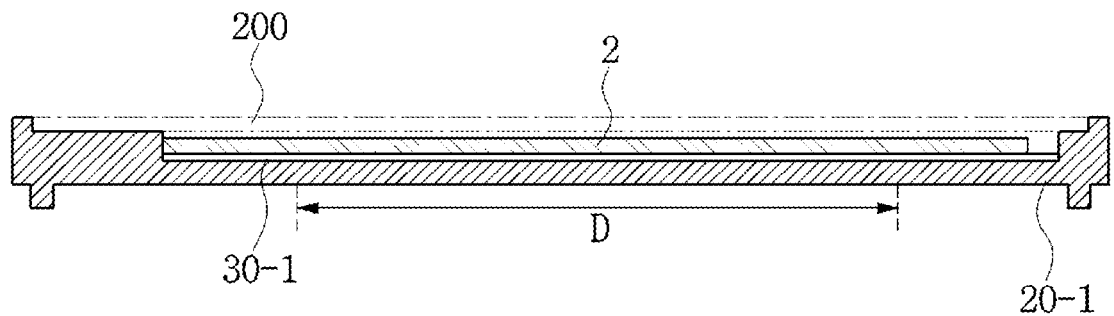
Figure 57:
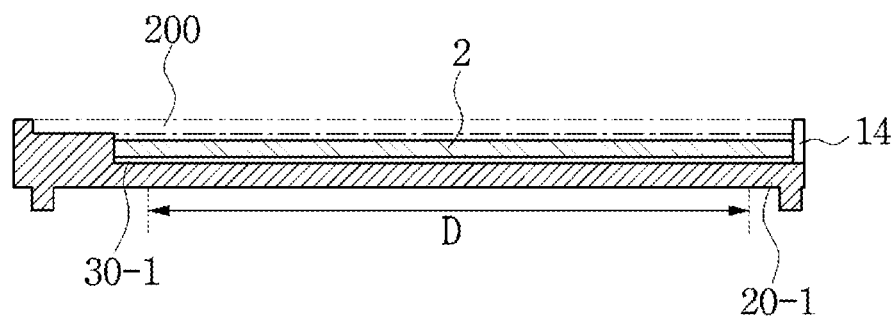

FIGS. 55 to 57 are diagrams illustrating an example where a frame housing is provided.

As shown in FIG. 55, the battery or the main circuit unit is mounted on the lower panel housing 20 and a frame housing 20-1 or a bracket 20-1 is mounted thereon. At this time, the display is mounted on the frame housing 20-1.

The display 2 is mounted on the frame housing 20-1 to be closer to the joint 8. The joint is a part in which the displays 2 and 4 are joined to each other. That is, when the area of the display 2 in which the screen is displayed is defined as an active area 2-1, the active area 2-1 is closer to the joint 8 than the opposite side of the joint.

A protective plate or the input unit 200 is mounted thereon. The area of the input unit 200 to which information can be input is defined as an active area 200-1, which is indicated by a white color in the part indicated by reference numeral 200.

The active area 200-1 of the input unit is mounted to be closer to the joint than the opposite side of the joint.

FIG. 56 is a sectional view taken along line L-L of FIG. 55 and FIG. 57 is a sectional view taken along line K-K of FIG. 55. As shown in the drawings, a protective plate or an input unit is attached to the periphery of the frame housing 20-1. A support 30-1 is disposed between the display 2 and the frame housing to support the display or absorb impact.

In the drawings, the bottom of the frame housing 20-1 may be partially cut out (the part indicated by D can be cut out from the bottom in FIGS. 56 and 57).

Figure 58:
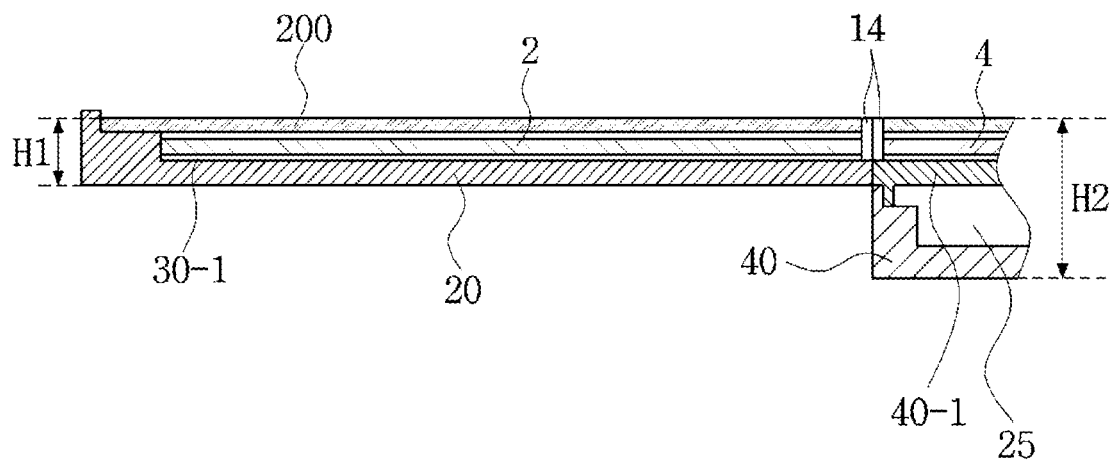
FIG. 58 is a diagram illustrating a structure making the displays be contiguous to each other.

FIG. 58 is a diagram showing a structure in which the displays are contiguous to each other.

In the drawing, when two panel housings 20 and 40 are contiguous to each other, the height of one panel housing is greater than the height of the other panel housing.

In the drawing, the display 20 is mounted directly on the bottom of the panel housing 20 having a smaller height. At this time, a support 30-1 may be interposed between the bottom of the panel housing and the display 20. The support also serves as a protective plate absorbing impact. The protective plate 30-1 may be disposed in the whole space between the bottom of the panel housing and the display or may be partially disposed between the display and the bottom of the panel housing.

The distance between the panel housing 20 and the display 2 is set to 2 mm or less. The distance H1 from the bottom of the panel housing to the protective plate or the input unit 200 is set to 10 mm or less. When the thickness decreases, the thickness of the display is set to 1.5 mm or less, the thickness of the panel housing is set to 1 mm or less, and the thickness of the input unit including the protective plate is set to 1.5 mm or less, the distance H1 can be set to the range of 4 mm to 5 mm. That is, the magnitude of H1 can vary depending on a mobile phone or a tablet PC.

On the other hand, the display may be mounted on the bottom of the panel housing 20 so as to come in direct contact with each other. In this case, the distance between the bottom of the panel housing and the display is 0 mm.

In addition, the height H2 of the panel housing having a larger height is set to the range of 8 mm to 12 mm or the range of 16 mm to 25 mm.

When H1 is in the range of 3 to 5 mm and H2 is in the range of 7 to 15 mm, the ratio H1/H2 is in the range of 0.20 (3/15) to 0.71 (5/7).

Protective means 14 is disposed in the part where the displays are joined to each other. The protective means may be a protective plate, a protective film, a side wall connected to the panel housings 20 and 40, or a side wall connected to the frame housing 40-1.

The thickness of the protective plate or the side wall and the arrangement of the displays and the input units in the part where the displays are joined to each other are the same as described in the above-mentioned embodiments.

FIGS. 59 to 62 are diagrams illustrating a method of mounting a display.

Figure 59:
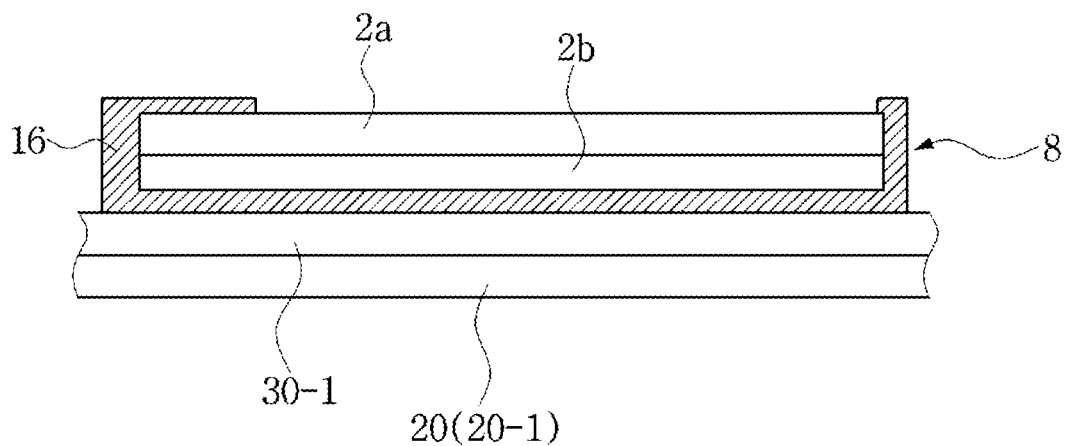
FIGS. 59 to 62 are diagrams illustrating a method of mounting a display.
Figure 60:
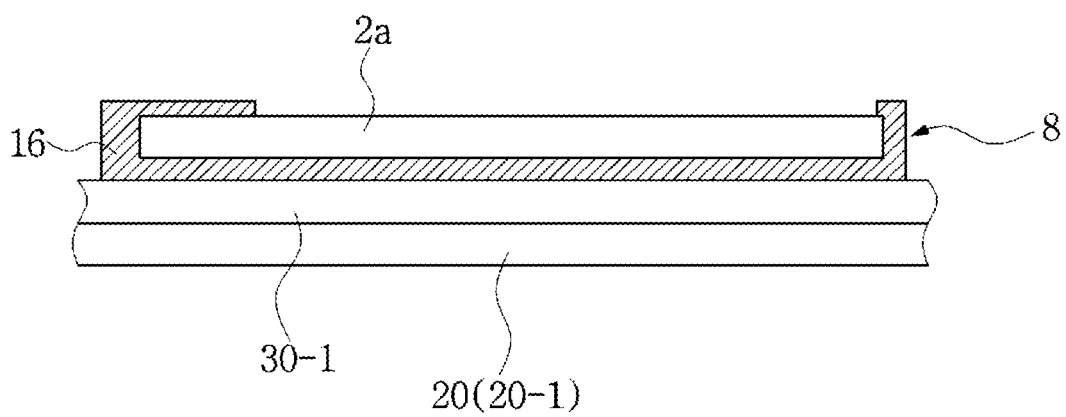

In the display 2, an element formed of glass or plastic and providing a screen is referred to as a display panel 2a and a backlight 2b is disposed on the rear side of the display panel 2a. An OLED device does not require a backlight 2b. A driver circuit is not shown in the drawing for the purpose of convenient drawing.

at this time, when the display is disposed in the panel housing 20 or the frame housing 20-1, the display can be disposed through the use of a chassis or a structure as shown in FIGS. 59 and 60. At this time, when the display is an LCD, the display includes the display panel 2a and the backlight 2b. When the display is an OLED, the display includes only the display panel 2a (the driver is common and thus is not described).

Figure 61:
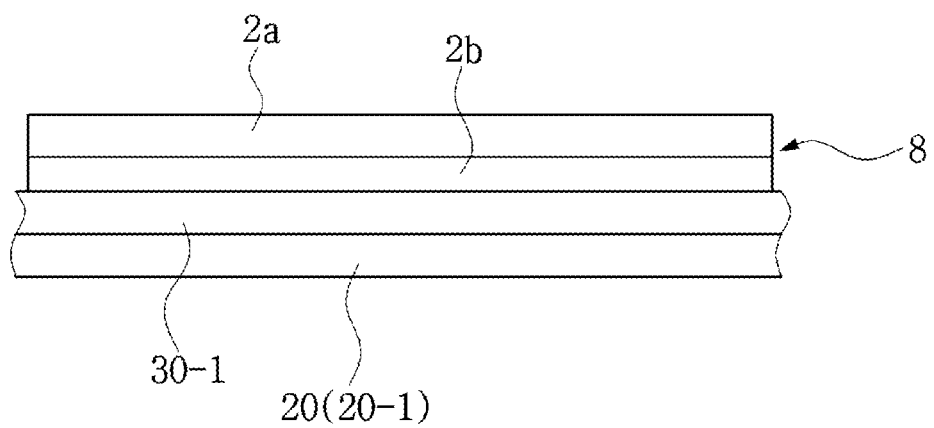
Figure 62:
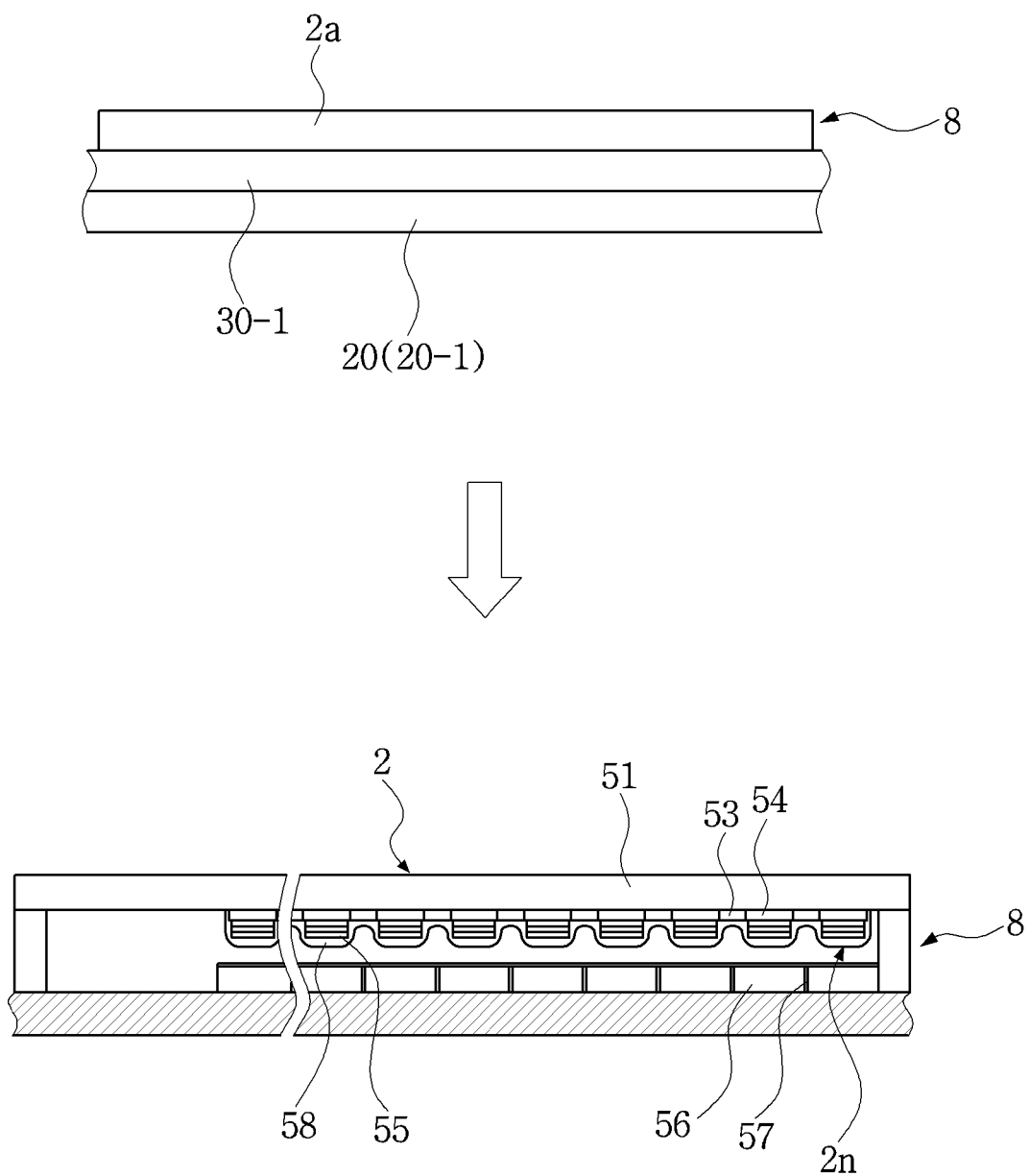

On the other hand, the display may be mounted directly on the panel housing 20 or the frame housing 20-1 as shown in FIGS. 61 and 62.

At this time, the gap between the display 2 and the panel housing 20 or the frame housing 20-1 is set to 2 mm or less and may be 0 mm in some cases. A support 30-1 is disposed therebetween.

When the display 2 is mounted directly on the panel housing 20 or the frame housing 20-1, another example of an OLED device can be considered. That is, as shown in FIG. 62, an OLED device can be mounted directly on the housing 20 or 20-1.

Another example is shown in FIG. 62. That is, the lower substrate (represented by reference numeral 52 in FIG. 9) of the OLED device can be replaced with the panel housing 20 or the frame housing 20-1. In some cases, the panel housing substrate or the frame housing substrate may be formed of metal. In this case, one substrate of the OLED device can be replaced with the panel housing 20 or the frame housing 20-1. Accordingly, it is possible to further reduce the thickness of the display device.

Embodiment 5

Figure 63:
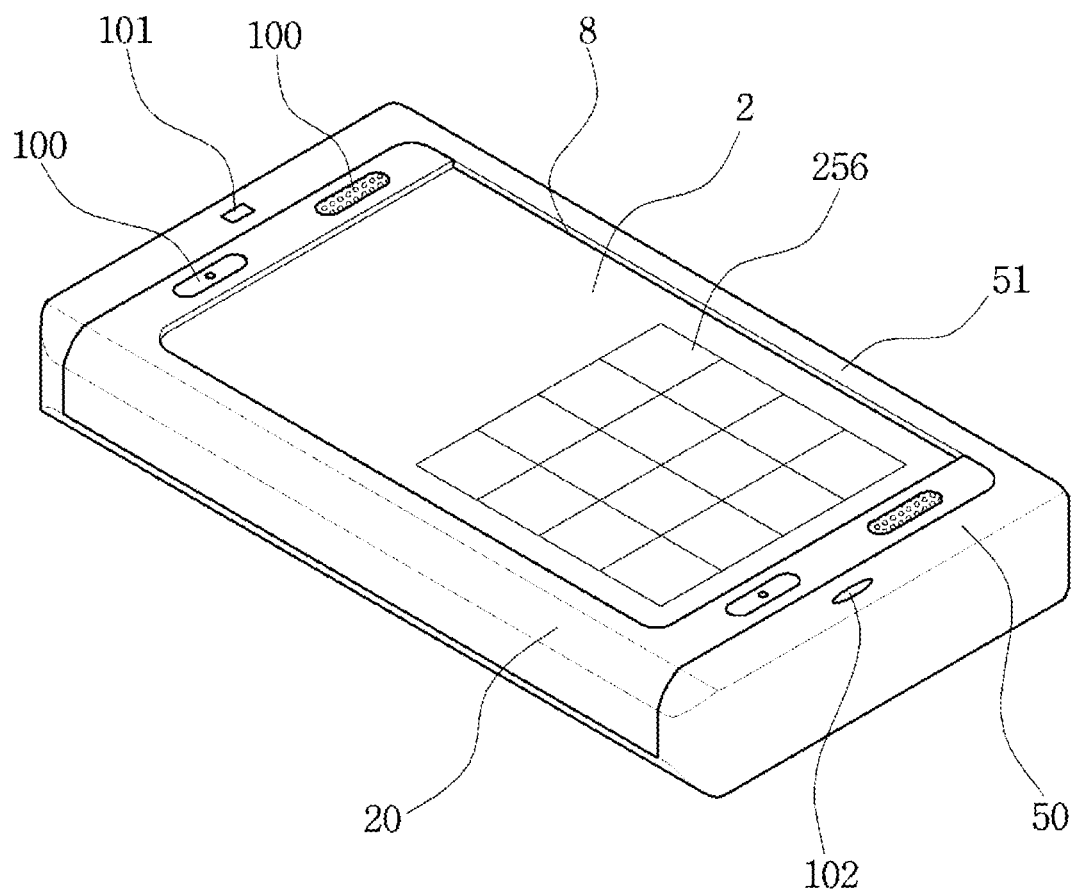
FIG. 63 is a diagram illustrating an example where the portable display device is used as a mobile phone.

FIG. 63 is a diagram illustrating an example where the portable display device is used as a mobile phone.

The speaker 101 and the microphone 102 are used for telephone conversation, and an input keyboard 256 is displayed on the screen for inputting a phone number and the like. Plural boxes are displayed on the screen and numerals, characters, signs, and the like are displayed in the boxes.

Simple buttons 100 may be further provided. A particularly speaker creating a large sound may be disposed at the position of the button 100.

Figure 64:
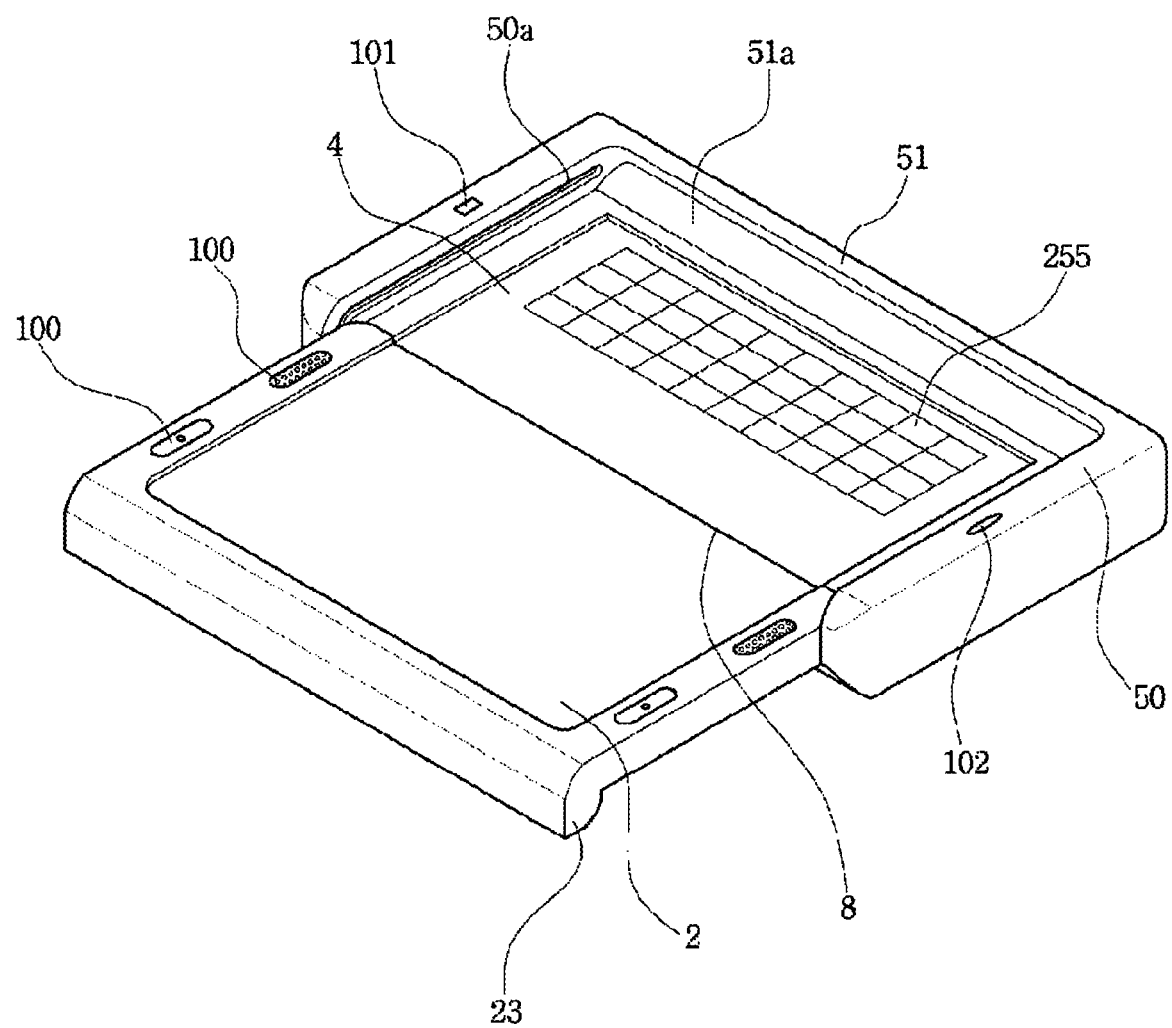

FIG. 64 is a diagram illustrating an example where the portable display device is used for inputting characters or the like.

When two displays 2 and 4 are stretched and various contents for data communication and information acquisition are used, an input keyboard 255 may be displayed on one screen. In this case, a keyboard-like figure performing a keyboard input function and including Korean or English alphabets is displayed on the screen as the input keyboard 255. When a user touches a part displaying a desired letter, the input units 200 and 400 can recognize the corresponding information.

On the other hand, a capacitive type input unit and a resistive type input unit are exemplified in the invention, and the principle of the invention can be applied to the input unit for inputting information on a flat panel.

Figure 65:
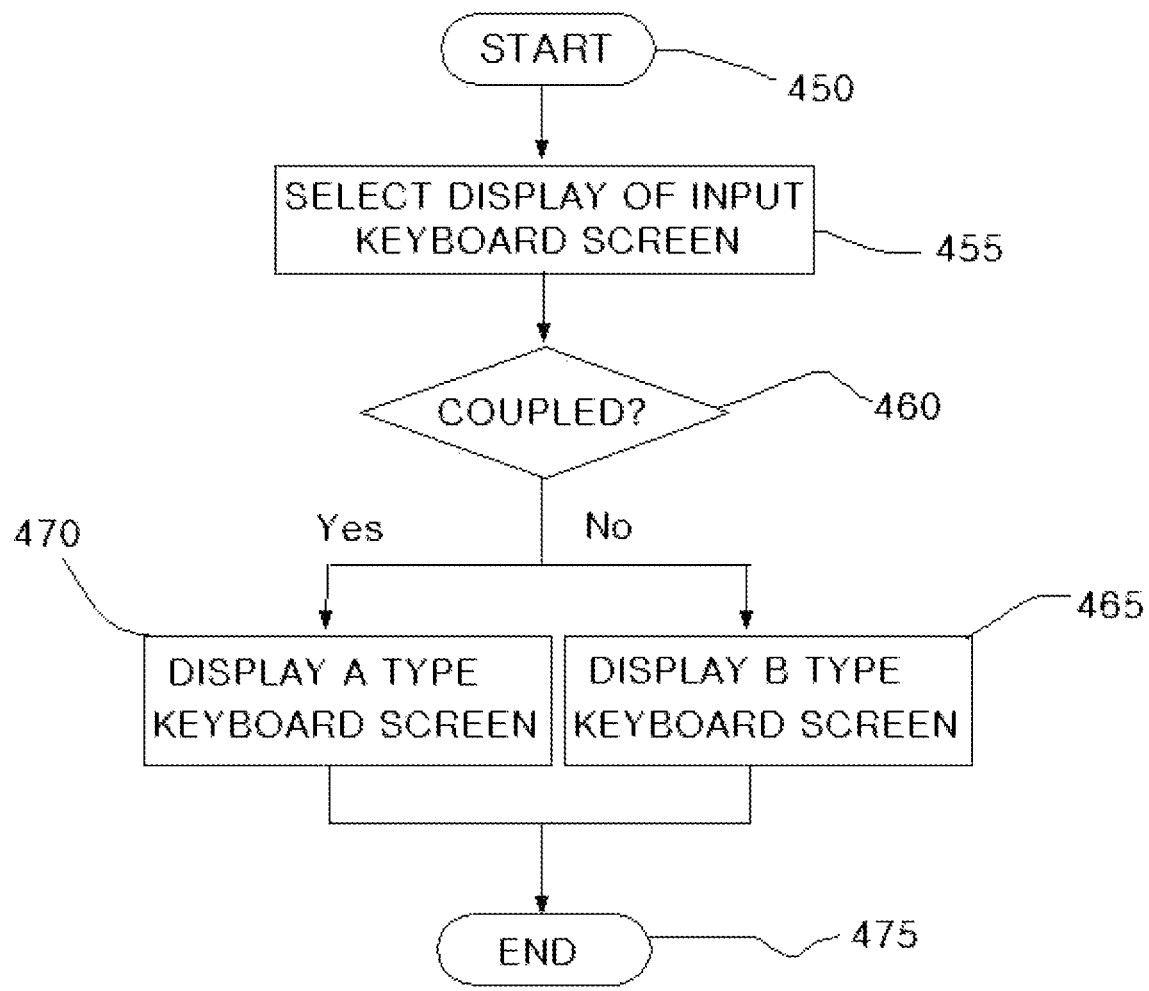
FIG. 65 is a flowchart illustrating an input keyboard mode based on a coupling sensor.

FIG. 65 is a flowchart illustrating the flow of processes in an input keyboard mode based on a coupling sensor.

When the portable display device according to the invention is started up, the sensor 135 shown in FIG. 27 senses whether the panel housings 20 and 40 are in a coupled state. The coupled state means a state where the upper panel housing 20 and the lower panel housing 40 are stacked.

When a mark displaying an input keyboard is selected on the screen (step 455), it is determined whether the panel housings are in the coupled state through the use of the sensor 135 (step 460).

When it is determined that the panel housings are in the coupled state, an A type keyboard is displayed on the screen (step 470). Here, the A type keyboard is shown in FIG. 63. When it is determined that the panel housings are not in the coupled state, a B type keyboard is displayed on the screen (step 465). Here, the B type keyboard is shown in FIG. 64.

When the user selects an end button, the system is ended (step 475).

In this way, the state displayed on the screen can be automatically controlled depending on the coupled state of the upper and lower panel housings 20 and 40.

Figure 66:
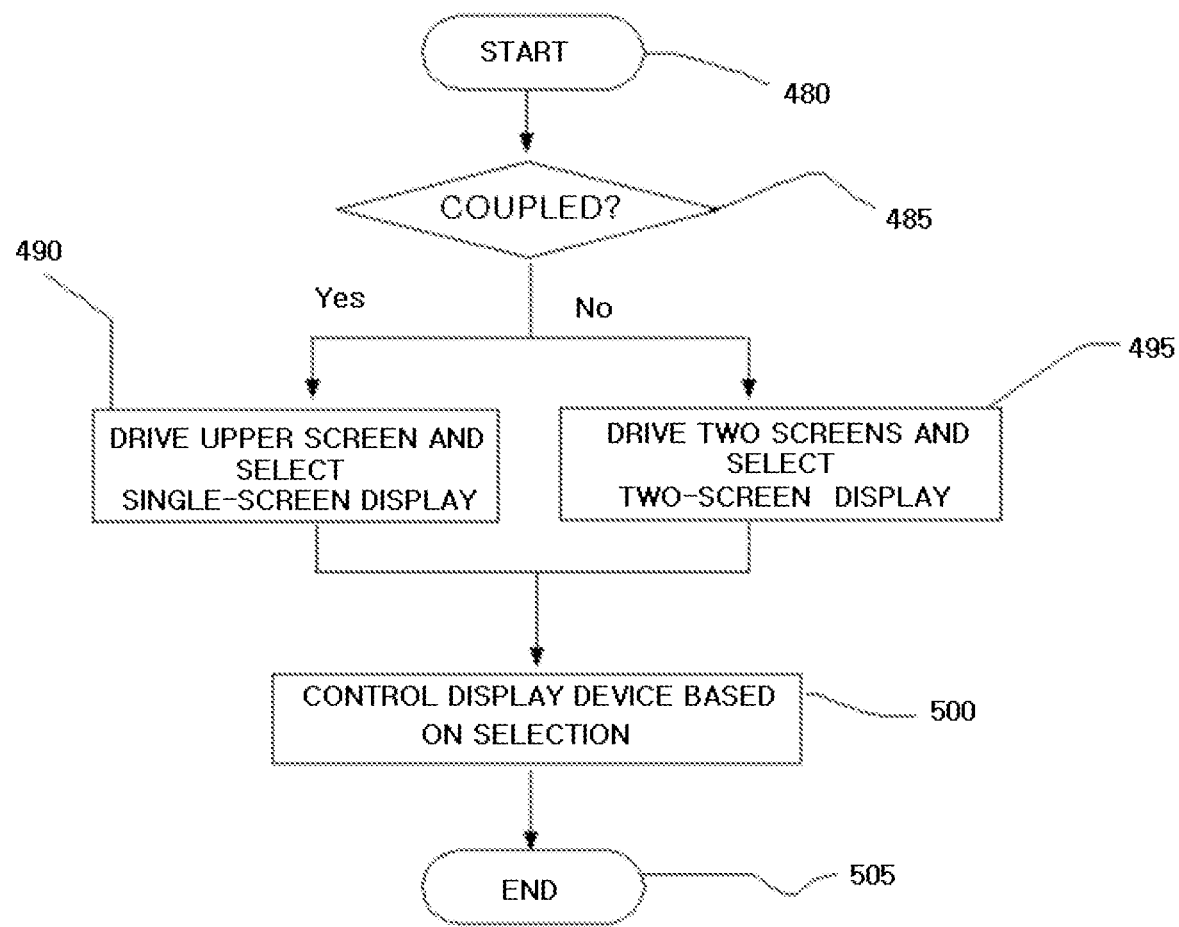
FIG. 66 is a flowchart illustrating a control method based on a coupling sensor.

FIG. 66 is a flowchart illustrating the flow of processes based on the coupling sensor.

When the portable display device according to the invention is started up, it is determined whether the panel housings 20 and 40 are in the coupled state through the use of the sensor 135 shown in the block diagram of FIG. 27 (step 485).

When it is determined that the panel housings are in the coupled state, the display mounted on the upper panel housing is activated. A screen format for driving a display is selected (step S490). When it is determined that the panel housings are not in the coupled state, two displays are activated and a screen format for driving two displays is selected (step 495).

In the portable display device according to the invention, only one screen may be used or two screens may be used. Accordingly, the screen format for displaying a single screen and the screen format for displaying two screens are stored in the memory 120 of the main controller 105 shown in FIG. 27. The control unit 110 selects a screen format corresponding to the sensing result of the sensor 135.

When a screen is selected, the control unit 110 controls a screen display on the basis of the selected screen. That is, a control mode for displaying one screen and a control mode for displaying two screens are separately provided.

Embodiment 6

FIGS. 67 to 70 are diagrams illustrating another example of FIGS. 49 and 52.

Figure 67:
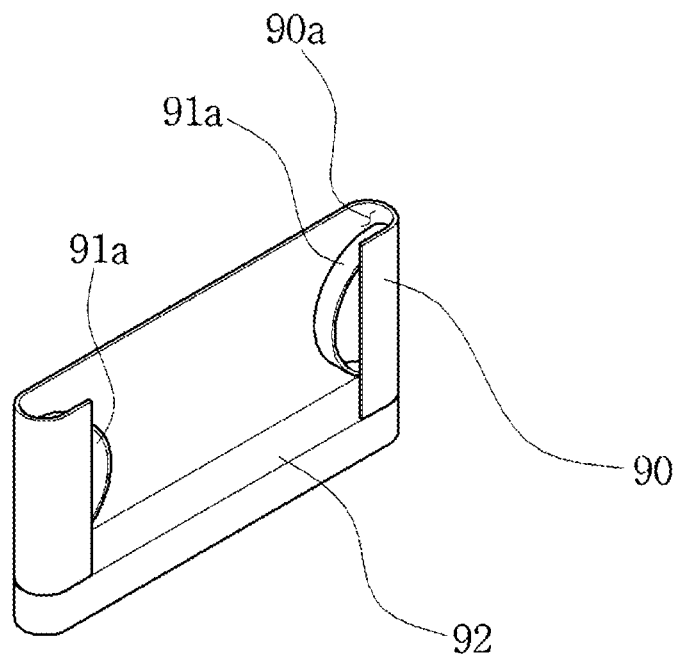
FIGS. 67 to 70 are diagrams illustrating another examples of FIGS. 49 and 52.

FIG. 67 is a diagram illustrating another example of a spring assembly. That is, as shown in the drawing, leaf spring-like elastic support plates 91a may be disposed on both sides of the support plate 90.

Figure 68:
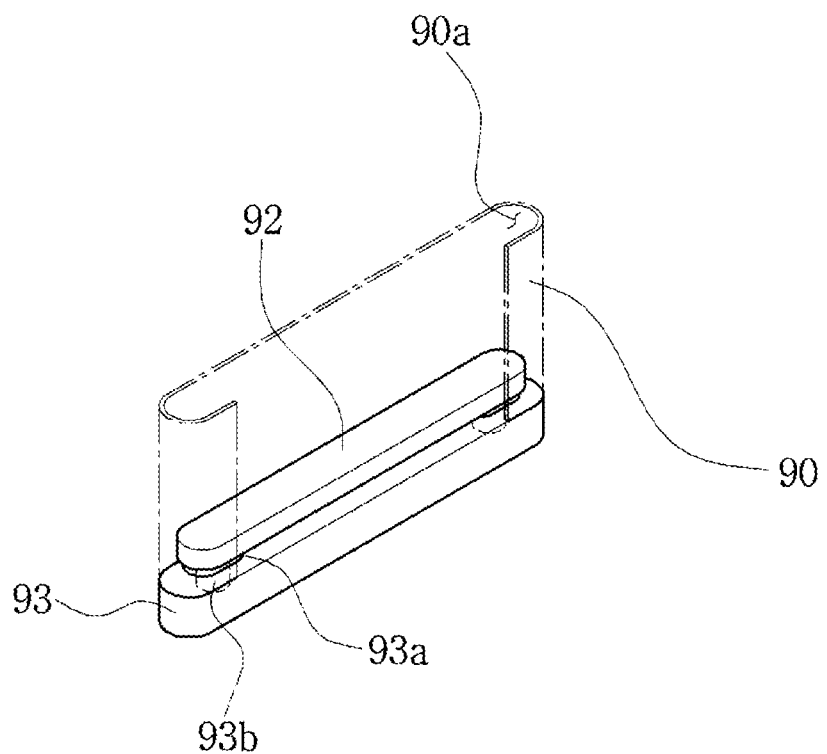

FIG. 68 is a diagram illustrating another support plate. As shown in the drawing, the inner bottom 92 disposed in the bottom of the support plate 90 can move slightly downward.

that is, a bottom support plate 93 is further disposed below the inner bottom 92 and a bottom groove 93a is disposed in the bottom support plate 93. A bottom spring 93b is disposed in the groove 93a.

Figure 70:
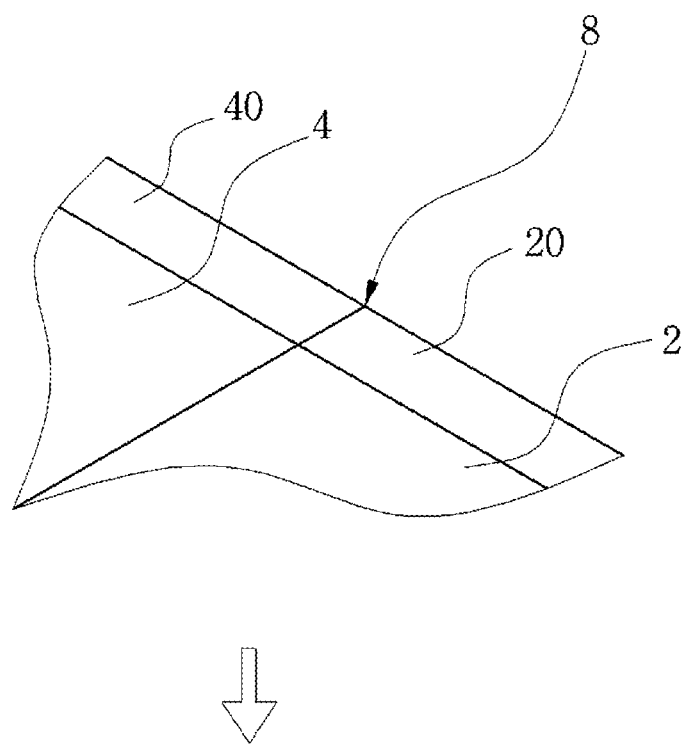
Figure 70:
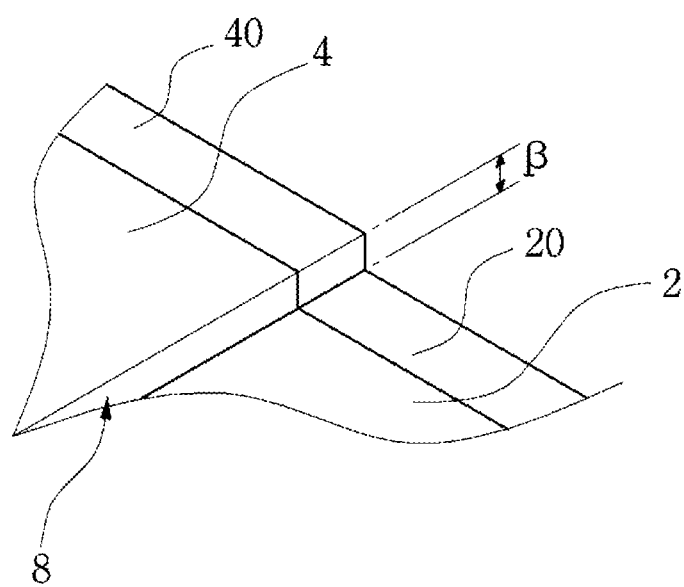

Accordingly, the inner bottom goes down by a value β shown in FIG. 70. Here, the value is preferably not greater than 1.5 mm. Therefore, the upper and lower panel housings 20 and 40 may be stretched fully so that the displays are flush with each other, but an error of about 1.5 mm may be given so as to maintain the stability from impact based on the movement of the display device or external impact.

Figure 69:
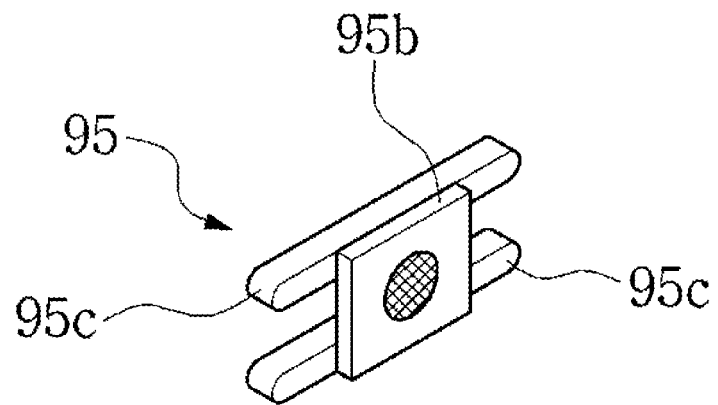

FIG. 69 is a diagram illustrating another coupling portion, where the head 95a of the coupling portion is changed into a protrusion shape. That is, the coupling protrusions 95c are formed so that the coupling protrusions 95c are coupled to the elastic support plate 91a shown in FIG. 67.

By the coupling of the coupling protrusions 95c to the elastic support plate 91a, the vertical positions of the upper and lower panel housings 20 and 40 are effective fixed. That is, the upper and lower panel housings 20 and 40 are easily fixed at the upper and lower positions but are not fixed at the intermediate positions.

FIG. 70 is a diagram illustrating the vertical error of the upper and lower panel housings. That is, an example where the bottom support plate 93 is provided as in FIG. 68 is shown. In principle, when the upper and lower panel housings 20 and 40 are stretched, the displays 2 and 4 or the panel housings 20 and 40 are flush with each other.

In this example, the heights thereof may be different from each other by the value β. The value β is preferably not greater than about 2 mm or 2.5 mm. This means that the upper and lower panel housings 20 and 40 further move upward or downward by 1.5 mm or 2 mm and then become flush with each other.

Figure 71:
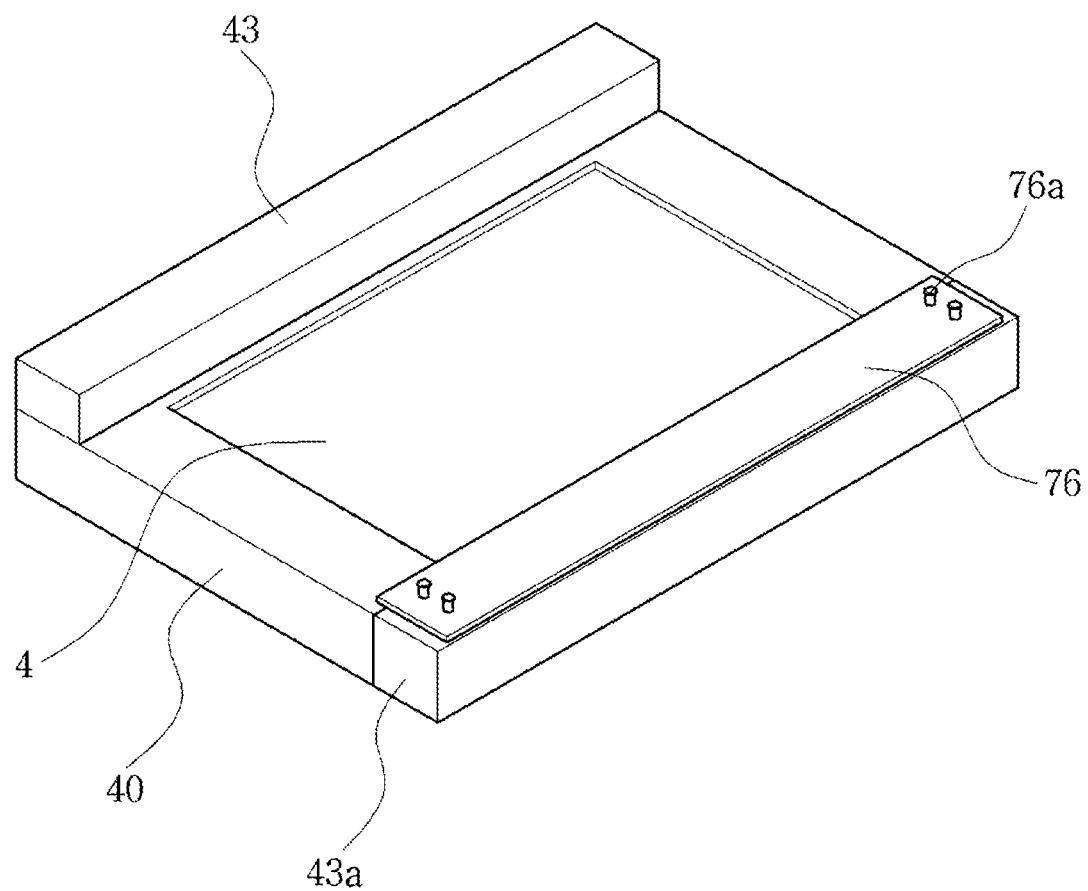
FIGS. 71 to 73 are diagrams illustrating a lower panel housing and a protruding plate according to another embodiment of the invention.
Figure 72:
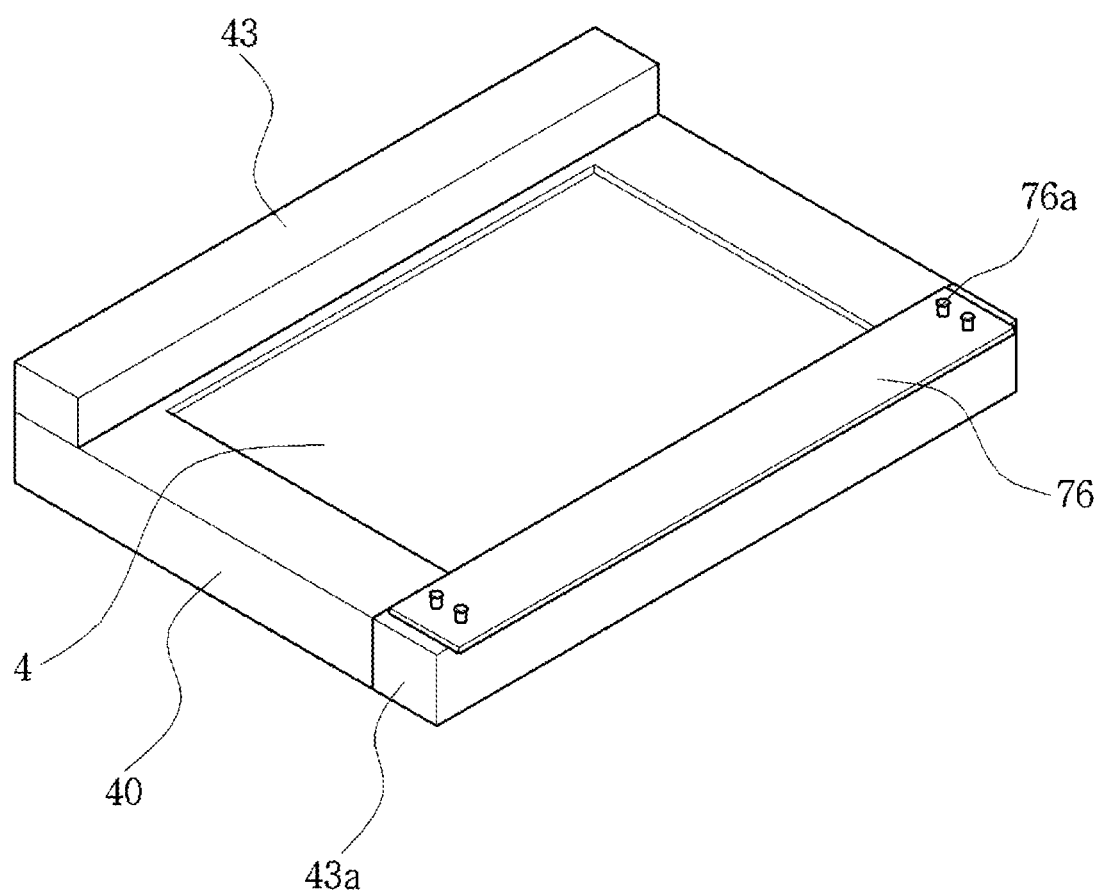

FIGS. 71 to 72 are diagrams illustrating the lower panel housing and the protrusion plate in another example.

In this example, a plate-like movable support is further provided for the purpose of strength when the lower panel housing 20 moves while supporting the upper panel housing 40.

That is, moving means which is provided to the lower panel housing 40 to support the upper panel housing 20 and which moves horizontally or vertically in the lower panel housing 20 is provided. In the invention, a protrusion plate 76 is used as the moving means. The protrusion plate is formed of a metal material such as steel, stainless steel, or alloy to enhance the strength.

As shown in the drawing, the protrusion plate 76 which is another example of the sliding means is disposed on the lower lid 43a. Accordingly, the upper panel housing 20 is mounted on the protrusion plate 76 and one or two fixing protrusions 76a are disposed on the protrusion plate 76. In some cases, three protrusions may be disposed.

The state where the protrusion plate 76 slides outward from the state shown in FIG. 71 is shown in FIG. 72. That is, the protrusion plate 76 is larger than the width of the lower lid 43a.

In the invention, the protrusion plate 76 substantially supports the upper panel housing 20. Accordingly, by setting the width of the protrusion plate 76 to be greater than the width of the lower lid 43a, it is possible to more strongly support the upper panel housing 20.

Figure 73:
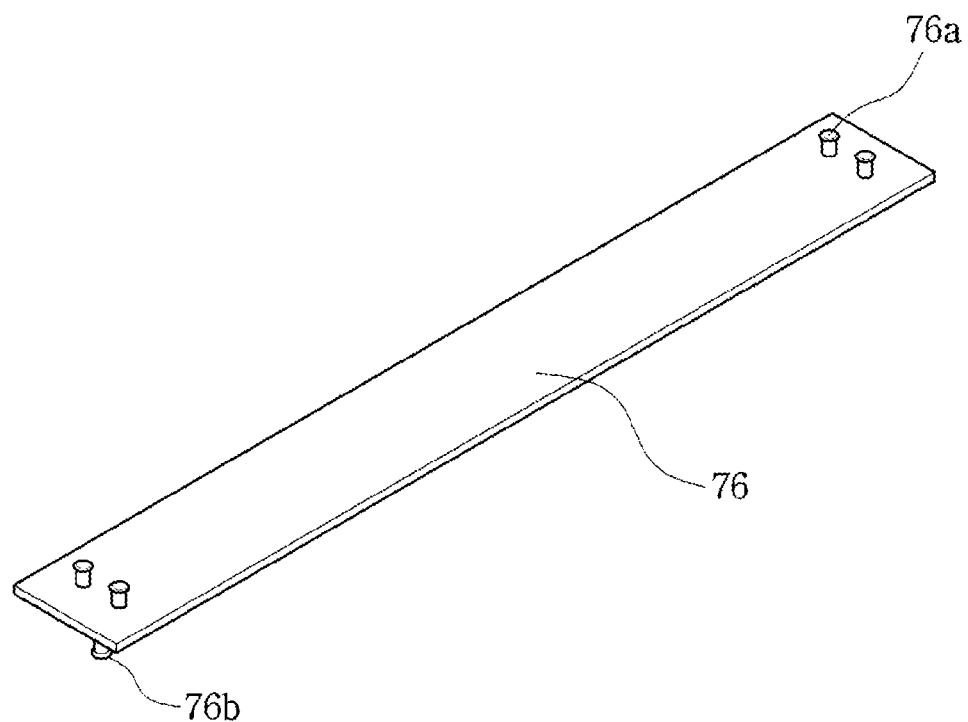

FIG. 73 is a diagram illustrating the protrusion plate 76, where a fixing protrusion 76b is further disposed on the bottom of the protrusion plate. The lower lid 43a supports the protrusion plate 76 with the fixing protrusion 76b interposed therebetween.

FIGS. 71 and 73 show an example where the panel housings slide horizontally. The vertical movement thereof is carried out through the use of the movement of the protective lid as described in the example shown in FIGS. 41 to 43.

Figure 74:
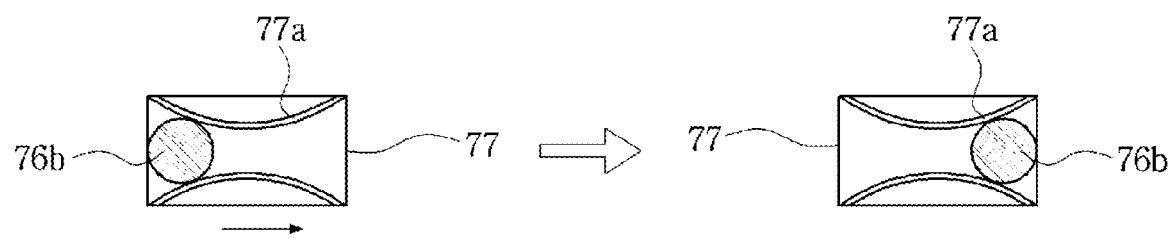
FIGS. 74 and 75 are diagrams illustrating the principle of causing the protruding plate to slide.
Figure 75:
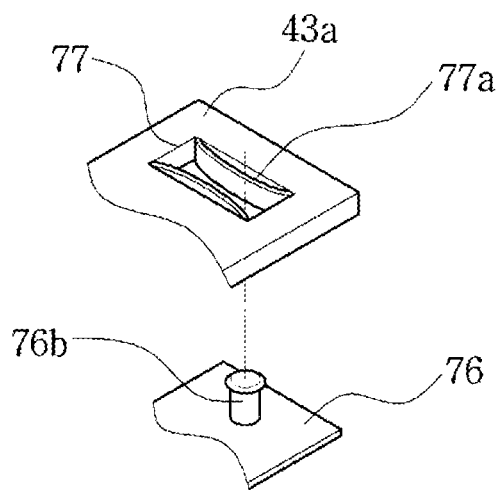

FIGS. 74 and 75 are diagrams illustrating the principle in which the protrusion plate slides.

As shown in the drawings, a rectangular groove 77 is formed in the lower lid 43a and a leaf spring 77a is disposed in the rectangular groove.

FIG. 74 shows a state where the fixing protrusion 76b slides. By providing the leaf spring 77a, the protrusion plate 76 can be located only at the initial position and the last position without being located at an intermediate position when sliding over the lower lid 43a.

FIG. 75 shows the rectangular groove 77 in detail, where the leaf spring 77a is disposed on both sides of the rectangular groove 77 formed in the lower lid 43a and the fixing protrusion 76b of the protrusion plate 76 slides therebetween. In the drawing, the bottom part of the protrusion plate 76 is shown.

the lower panel housing 40 described in the example shown in FIGS. 71 to 75 can be applied to the examples of the upper and lower panel housings 20 and 40 described with reference to FIGS. 41 to 52 and FIGS. 67 to 70 without any change.

Figure 76:
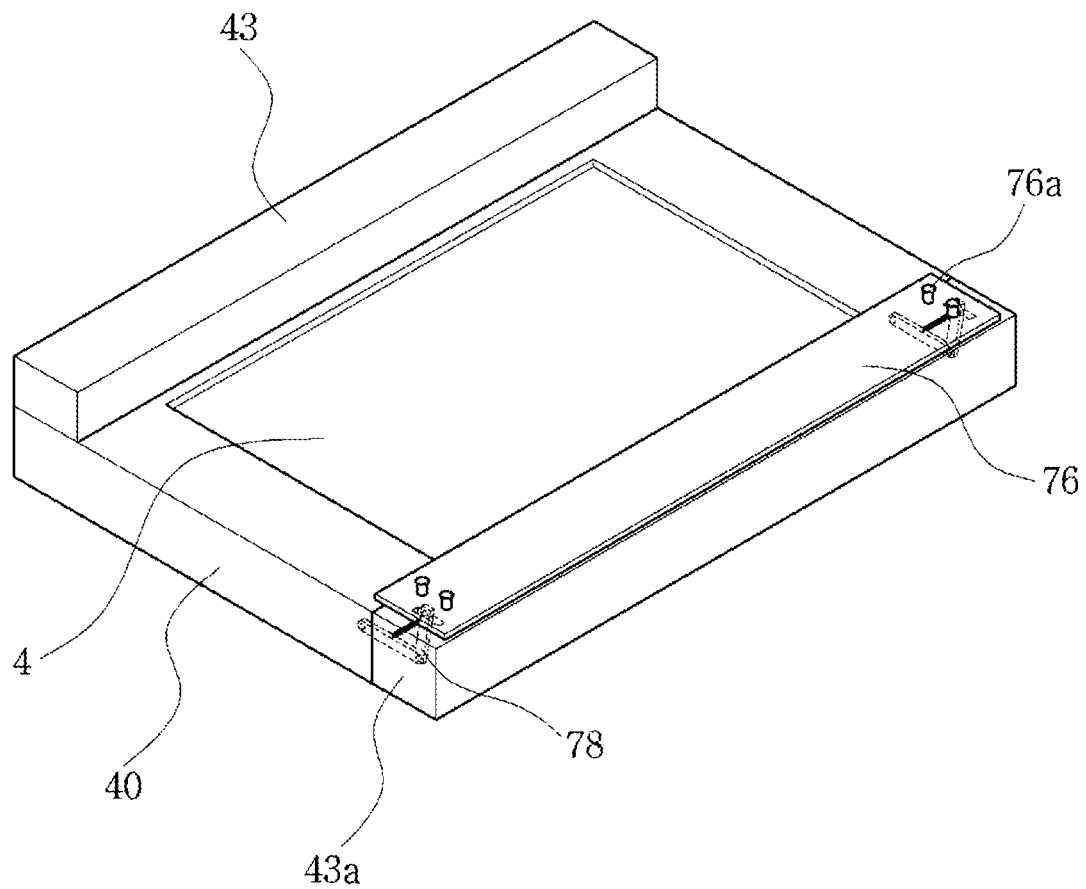
FIG. 76 is a diagram illustrating a state where the protruding plate slides according to another embodiment of the invention.

FIG. 76 is a diagram illustrating another example where the protrusion plate sides.

As shown in the drawing, a moving bar 78 and a moving shaft 78a are disposed below the protrusion plate 76. Accordingly, the protrusion plate 76 moves over the lower lid 43a through the use of the moving bar 78 and the moving shaft 78a.

Figure 77:
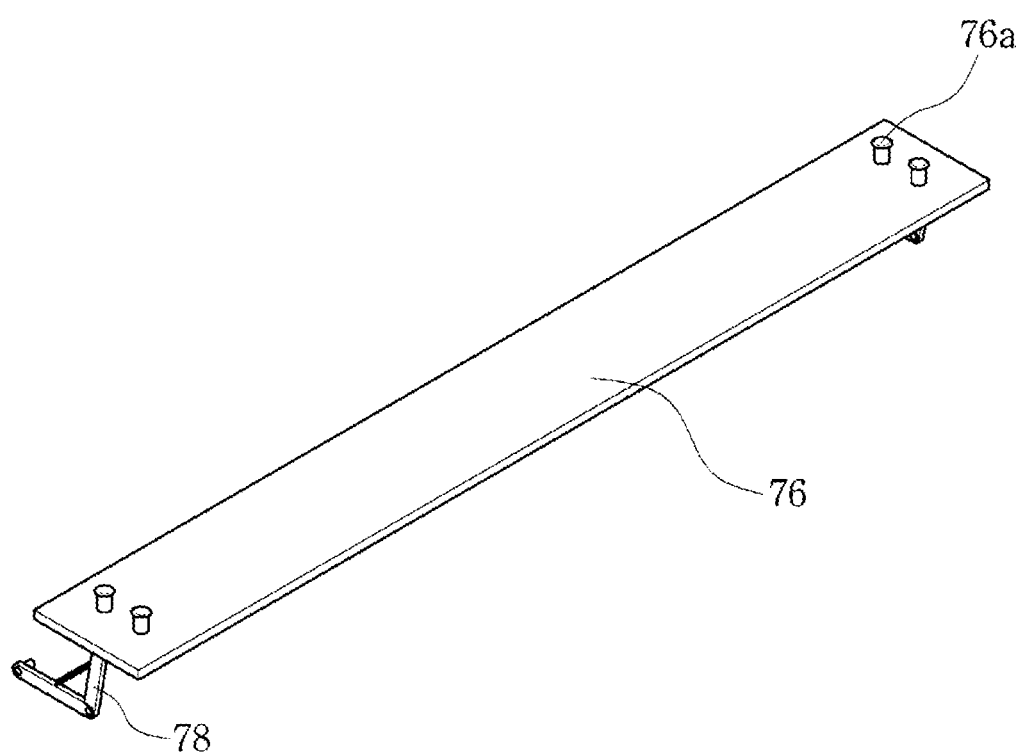
FIGS. 77 and 78 are diagrams illustrating the principle of causing a moving bar to move.
Figure 78:
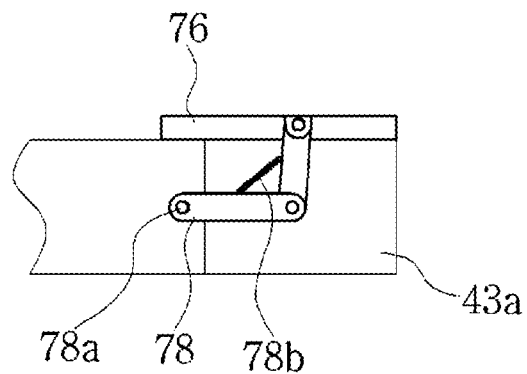
Figure 78:
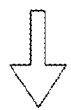
Figure 78:
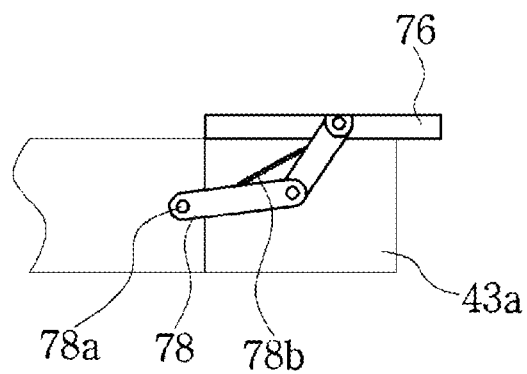
Figure 78:
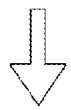
Figure 78:
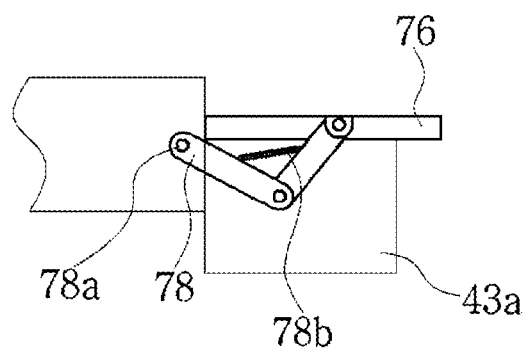

FIGS. 77 and 78 are diagrams illustrating the principle of movement using the moving bar.

FIG. 77 shows the protrusion plate 76 having the moving bar 78 and FIG. 78 shows the movement of the protrusion plate 76.

In the drawing, the horizontal movement is shown as the first step and the vertical movement is shown as the second step.

The horizontal movement is carried out through the use of the moving bar 78 and the moving shaft 78a and the movement is possible by the elastic force of a moving spring 78b.

Although not shown in the drawings, locking means for preventing the protrusion plate 76 from departing outward from the panel housing 40 is provided. The structure shown in FIGS. 74 and 75 can be used as the locking means in this example.

The vertical movement is carried out through the use of the moving bar 78 and the moving shaft 78a and the movement is possible by the elastic force of the moving spring 78b. Here, the moving shaft 78a includes a shaft coupling moving bar pieces 78 to each other, a shaft fixing the moving bar 78 to the protrusion plate 76, and a shaft fixing the moving bar 78 to the panel housing 40.

Figure 79:
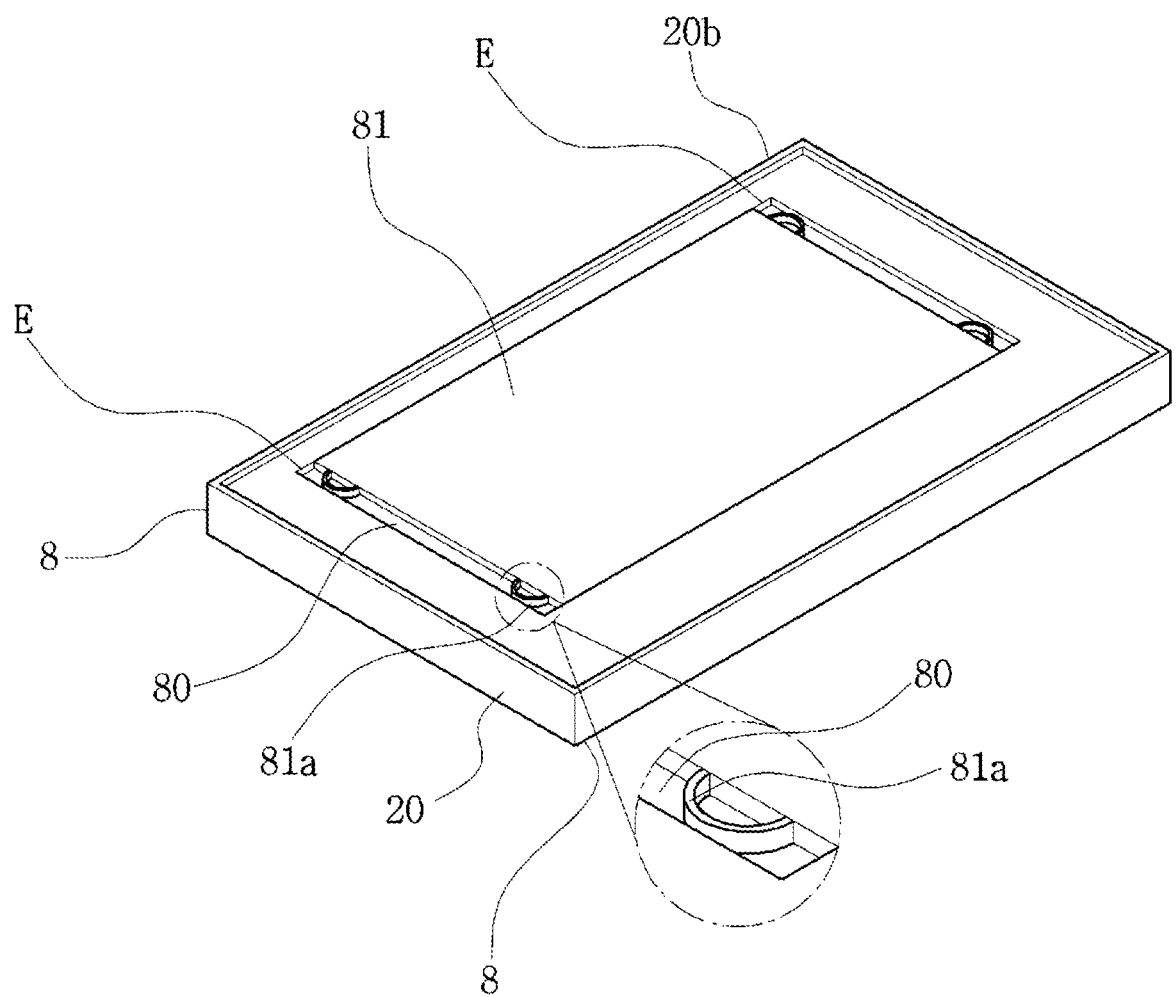
FIGS. 79 to 81 are diagrams illustrating the lower side of the upper panel housing.
Figure 80:
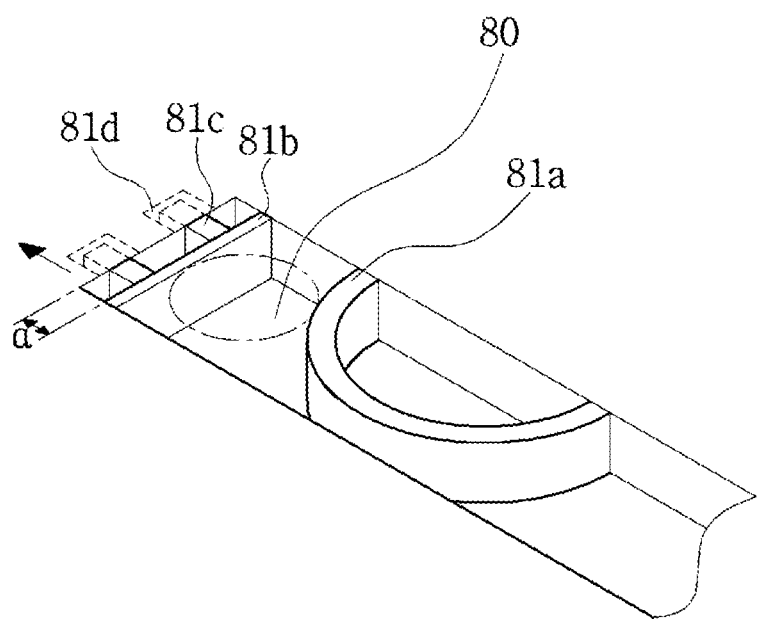
Figure 81:
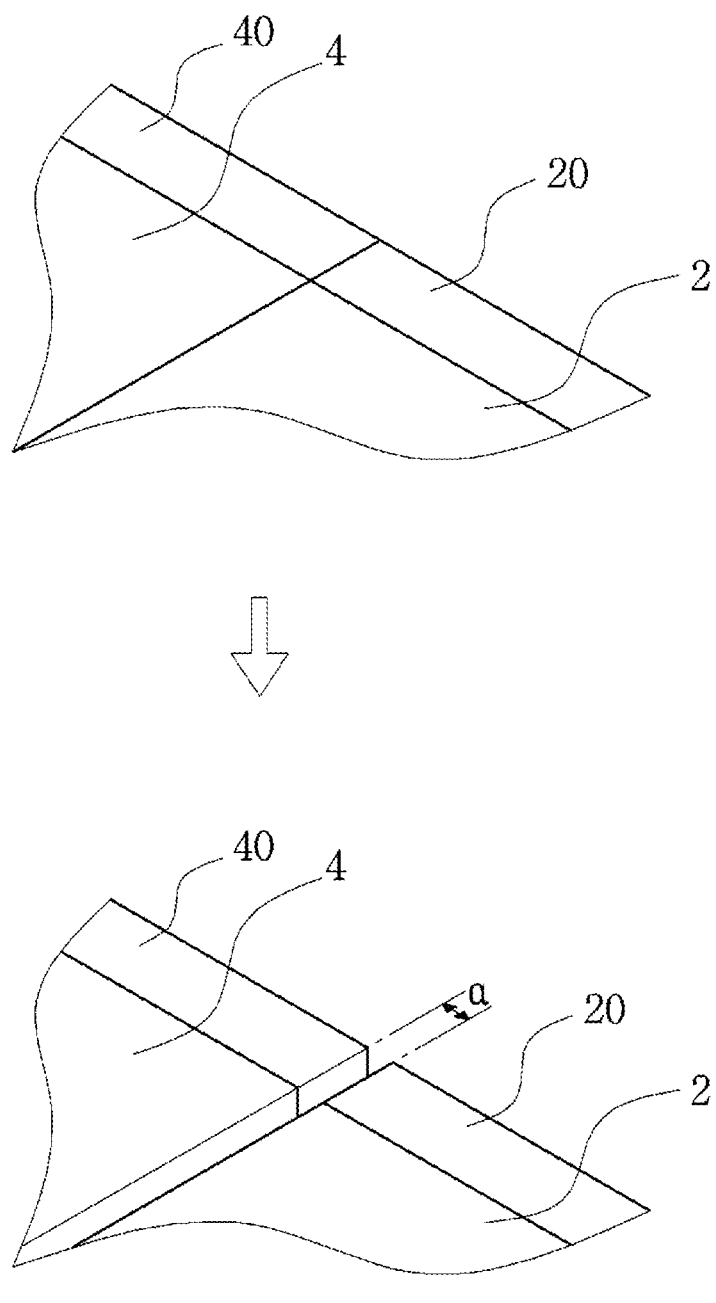

FIGS. 79 to 81 are diagrams illustrating the bottom of the upper panel housing.

As shown in the drawings, a bottom groove 80 is formed in the bottom of the upper panel housing 20 and fixing springs 81a are disposed on both sides of the bottom groove 80. A leaf spring can be used as the fixing spring. The position of the upper panel housing 20 is fixed through the use of the fixing springs 81a.

That is, when the upper panel housing 20 is located in the state shown in FIG. 41, the fixing spring close to "E" acts to fix the upper panel housing 20. When the upper panel housing is located in the state shown in FIGS. 42 and 43, the fixing spring close to the joint 8 acts to fix the upper panel housing 20.

That is, when the upper panel housing 20 moves relative to the lower panel housing 40, the upper panel housing is exactly located at a desired position through the use of the spring.

When two fixing protrusion 76a are disposed on the protrusion plate 76, the fixing spring 81a is located between the two fixing protrusions 76a to enhance the strength.

On the other hand, the part indicated by "E" is an end part of the bottom groove 80. The end part (the part indicated by "E") of the bottom groove 80 serves to push out the fixing protrusion 76a and serves to position the upper panel housing 20, the lower panel housing 40, and the protrusion plate 76 relative to each other.

Accordingly, the structure values are designed in consideration of such positions. In this case, since the values vary depending on the size and specification of the panel housings, the designed values are not shown but only the principle thereof is shown.

FIG. 80 is a diagram illustrating an example where the part indicated by "E" in FIG. 79 is replaced with a moving support plate 81b.

As shown in the drawing, a support spring 81c and a support groove 81d having the support spring 81c attached thereto are disposed in the back of the moving support plate 81b. The fixing protrusion 76a is located between the fixing spring 81a and the moving support plate 81b as shown in FIG. 55a (the circle marked by a dotted line represents the position of the fixing protrusion 76a in the drawing).

At this time, the moving support plate 81b may be pushed in the direction of the arrow. This is intended to give such a margin to adjust the degree of close contact between two panel housings 20 and 40, thereby enduring impact and the like.

That is, in the state where the two panel housings 20 and 40 are in close contact with each other in FIG. 81, the moving support plate 81b shown in FIG. 80 is not pushed in the direction of the arrow. In the state where the two panel housings 20 and 40 are separated from each other in FIG. 81, the moving support plate 81b shown in FIG. 80 is pushed in the direction of the arrow.

In addition, when the maximum distance between the two panel housings is a, the value of a is preferably set to 2.5 mm or less. That is, the value of a means the range of a distance by which the two panel housings 20 and 40 are separated from each other in the course of vertical movement.

Figure 82:
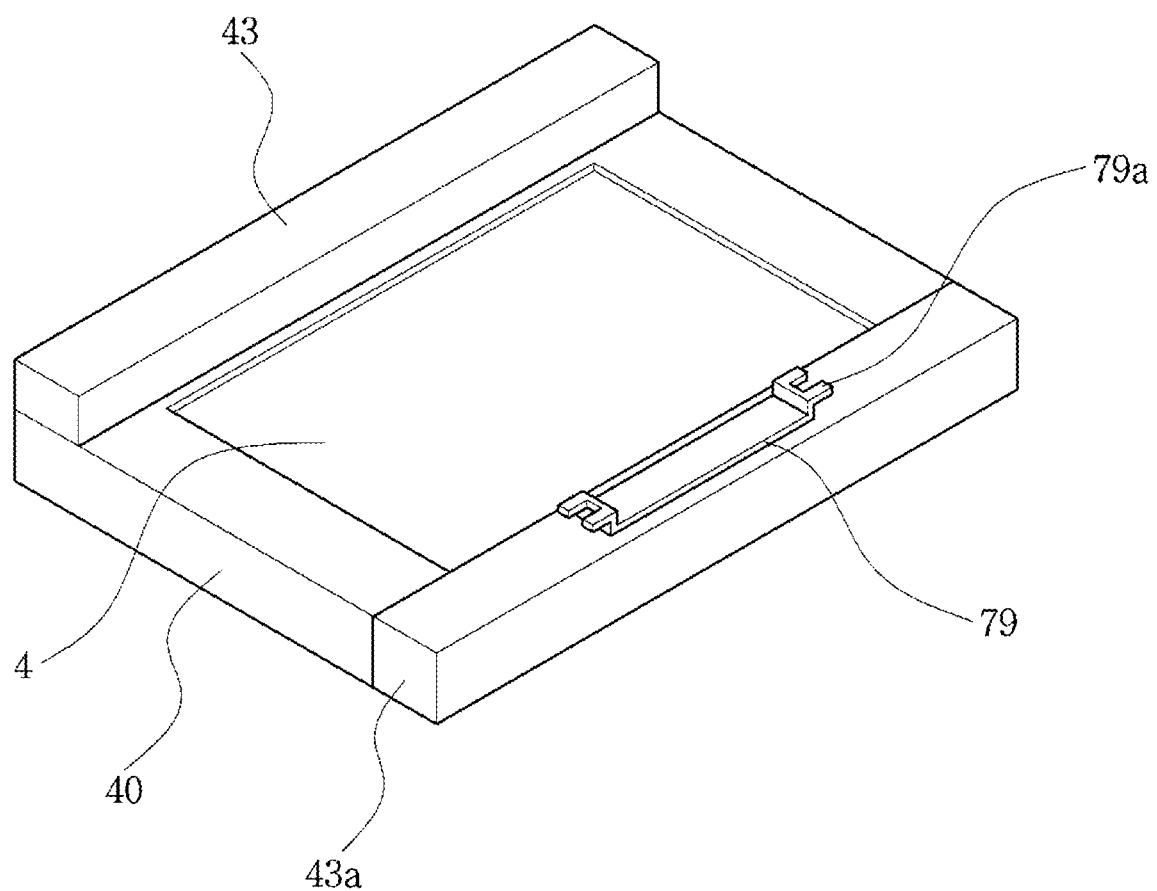
FIGS. 82 to 84 are diagrams illustrating an example where a side protruding plate is provided.
Figure 83:
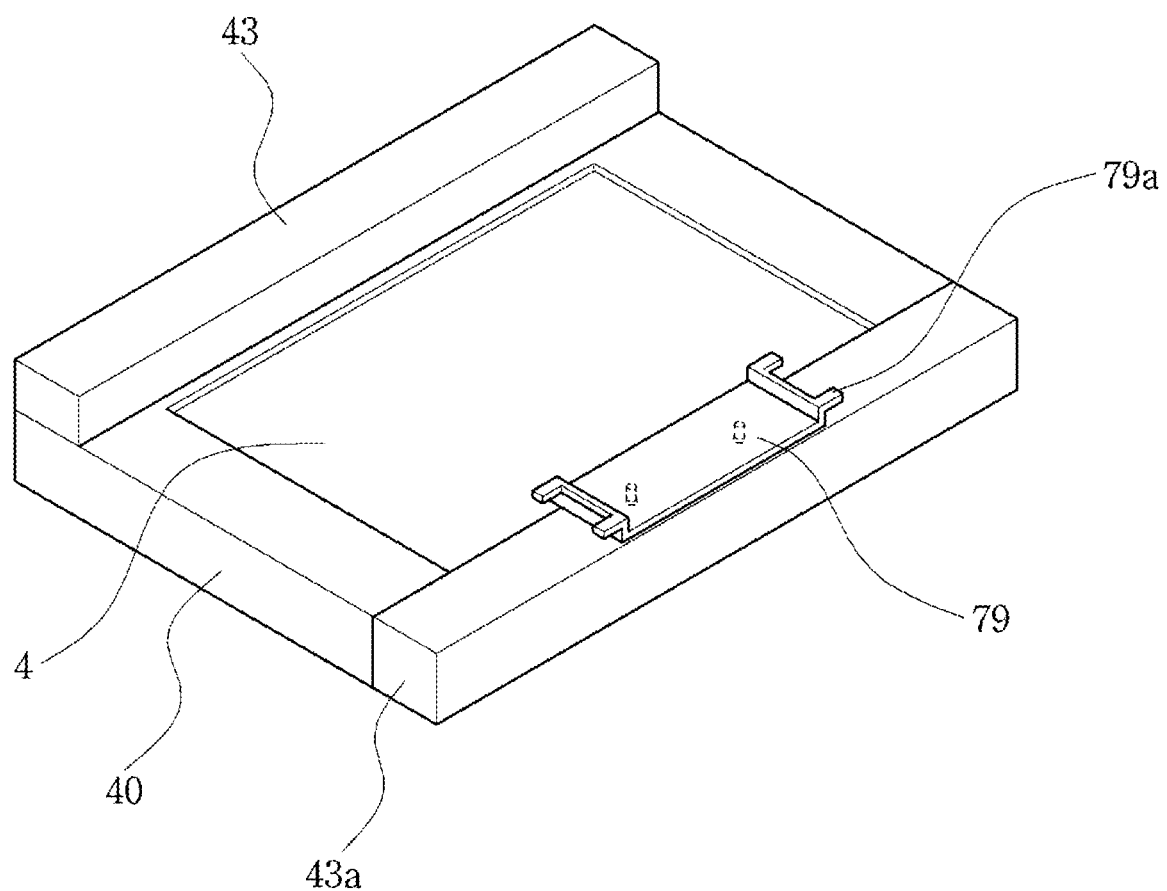
Figure 84:
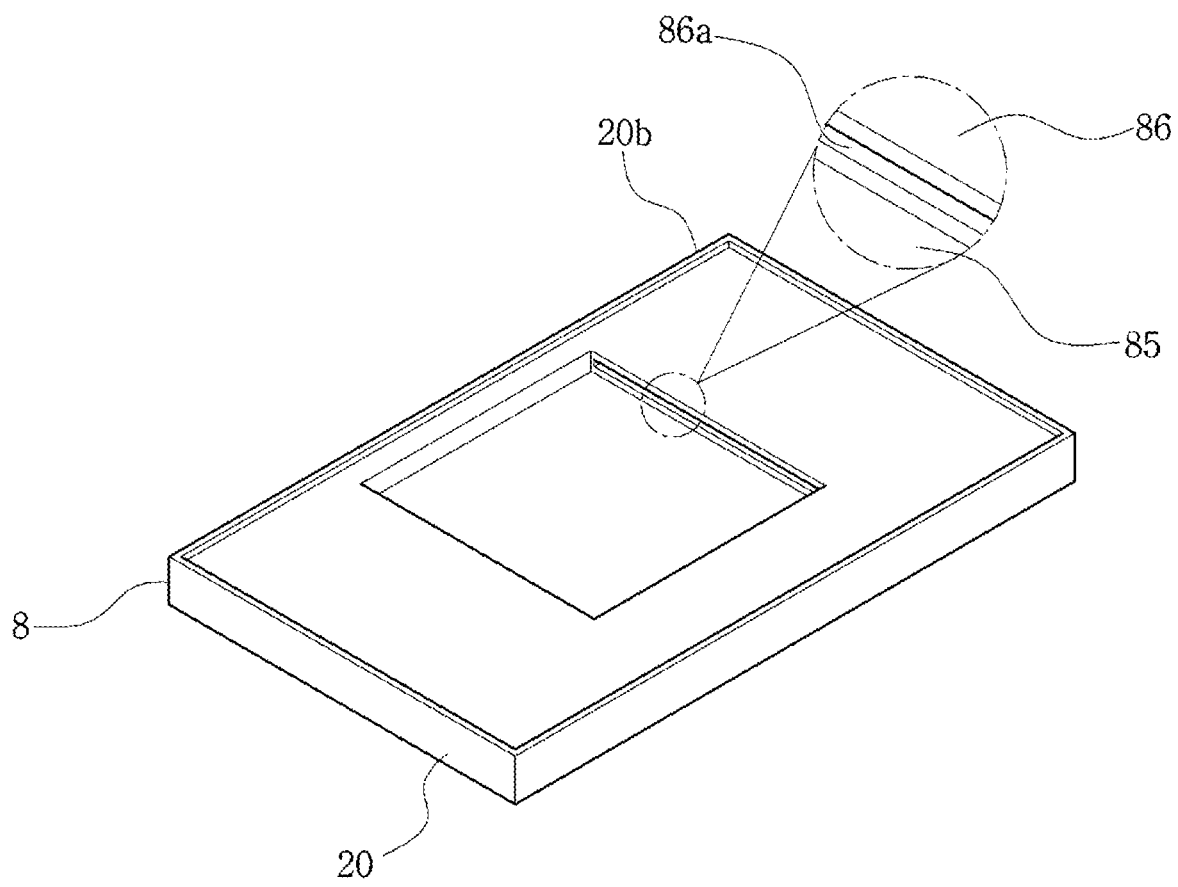

FIGS. 82 to 84 are diagrams illustrating an example where a side protrusion plate is provided.

FIG. 82 shows a side protrusion plate 79 having side protrusions 79a. That is, the side protrusion plate is disposed in the lower panel housing 40 and is another protrusion plate supporting the upper panel housing 20.

As shown in the drawing, the side protrusions 79a supporting the upper panel housing 20 are disposed in the side protrusion plate 79.

FIG. 83 shows an example where the width of the side protrusion plate 79 is greater than the width of the lower lid 43a. In this case, although not shown in the drawing, the fixing protrusion 76b is disposed on the bottom of the side protrusion plate 79 as in the example shown in FIGS. 74 and 75. The side protrusion plate 79 horizontally moves on the lower lid 43a through the use of the fixing protrusion.

The fixing protrusions 76b are not shown in FIG. 83 and only the positions thereof are indicated by dotted lines.

FIG. 84 shows the upper panel housing 20 having side grooves. The side grooves 86a are formed in the upper panel housing 20 to engage with the side protrusions 79a.

That is, as shown in the drawing, a bottom space 85 in which the side protrusion plate can move is formed in the bottom of the upper panel housing 20 and the side grooves 86a are formed in the bottom side surfaces 86 on both sides of the bottom space 85.

A spring such as a leaf spring is further provided to the side grooves 86a, so that the upper panel housing and the lower panel housing can be accurately positioned relative to each other.

Embodiment 7

Figure 85:
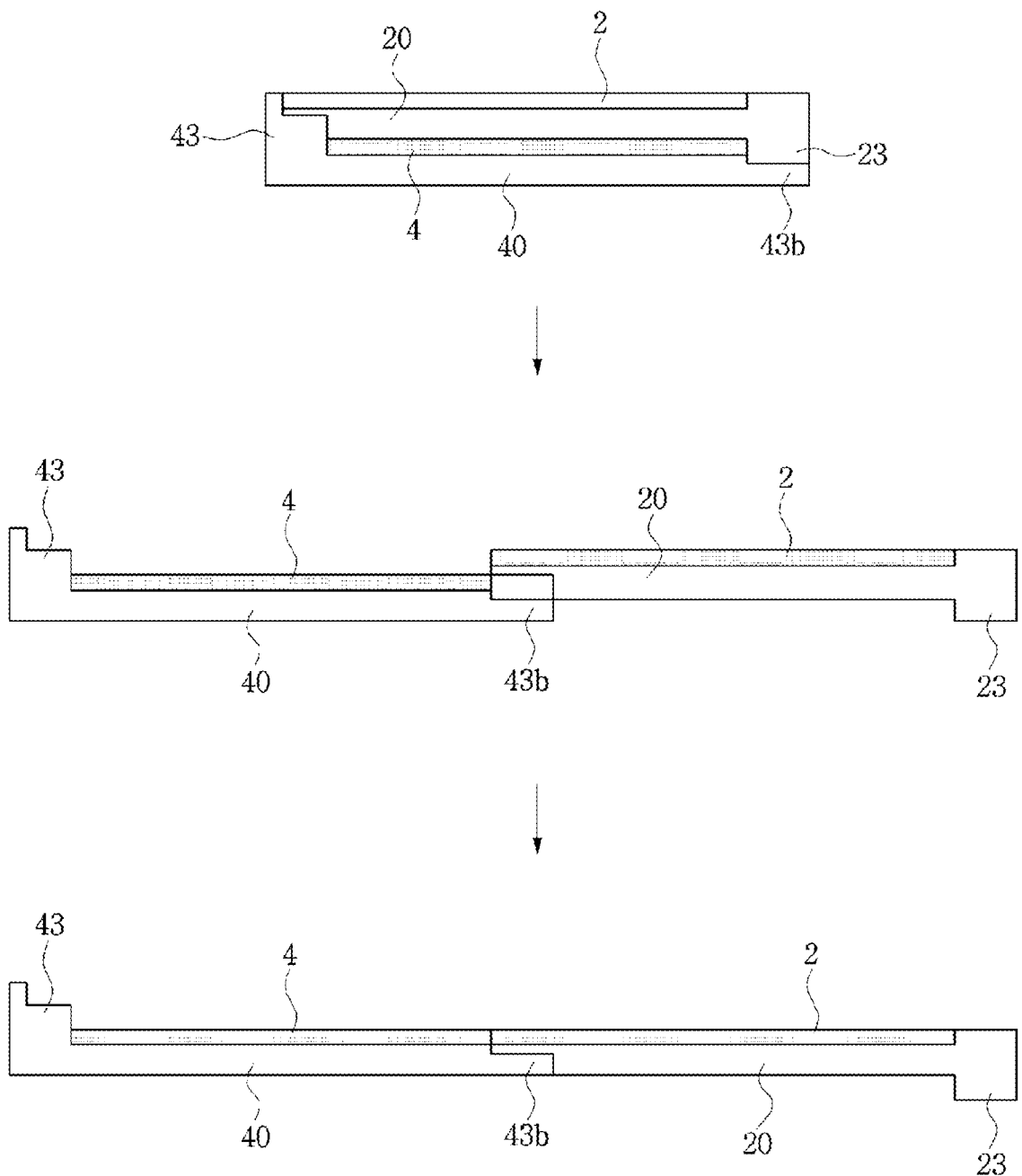
FIG. 85 is a diagram illustrating an example where the height of a protective lid is reduced.

FIG. 85 is a diagram illustrating an example where the height of the protective lid is reduced.

As shown in the drawing, the heights of the protective lids 23 and 43 are reduced to match with the height of the part engaging with the protective lids 23 and 43.

In the drawing, the principle of sliding is conceptually shown. That is, the upper panel housing 20 horizontally slides in the stacked state and then vertically moves.

When two panel housings are stacked, the protective lids 23 and 43 cover the side surfaces and support each other.

Accordingly, the appearance can be made to be better by reducing the height of the protective lids 23 and 43. When two panel housings 20 and 40 are stretched, the upper panel housing 20 can be more strongly supported.

Figure 86:
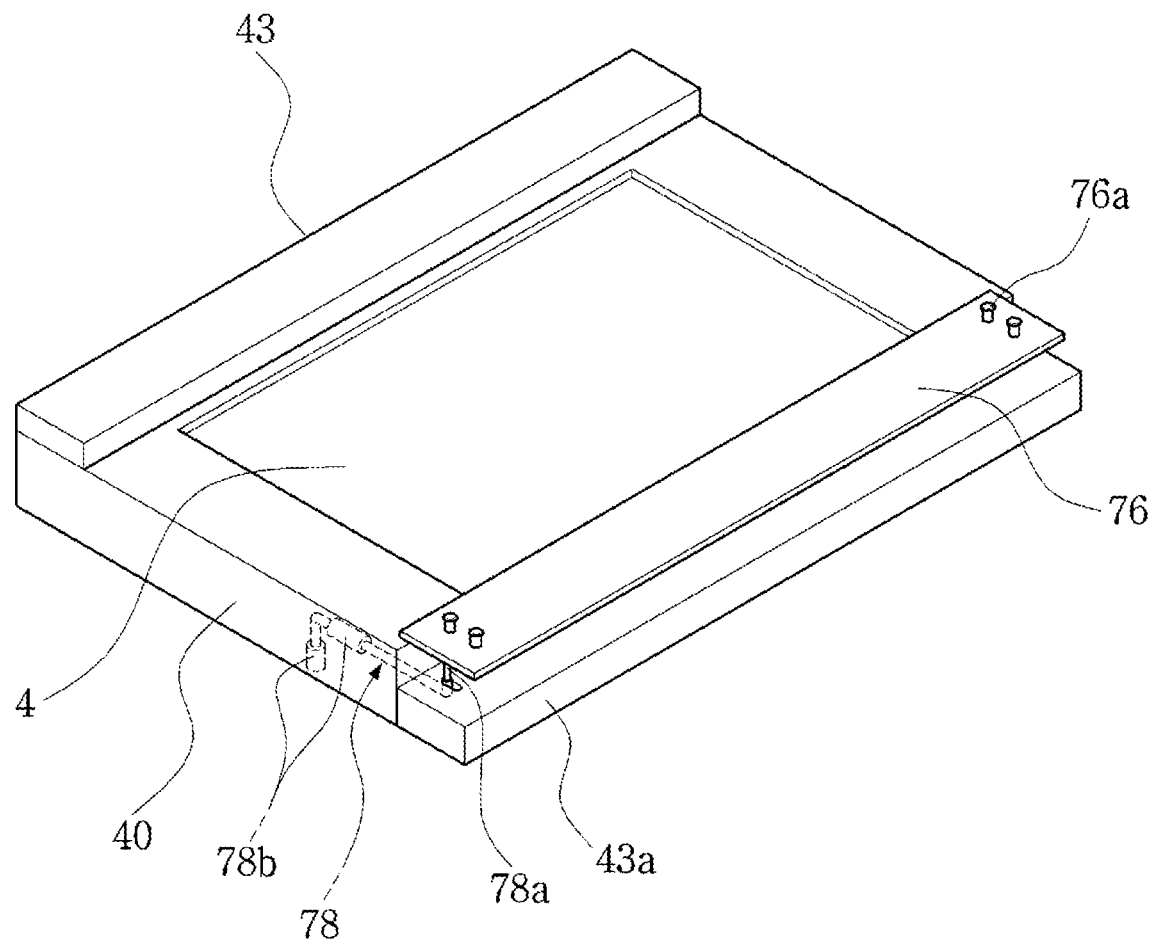
FIGS. 86 to 88 are diagrams illustrating the principle of causing the protruding plate to move in the example shown in FIG. 85.
Figure 87:
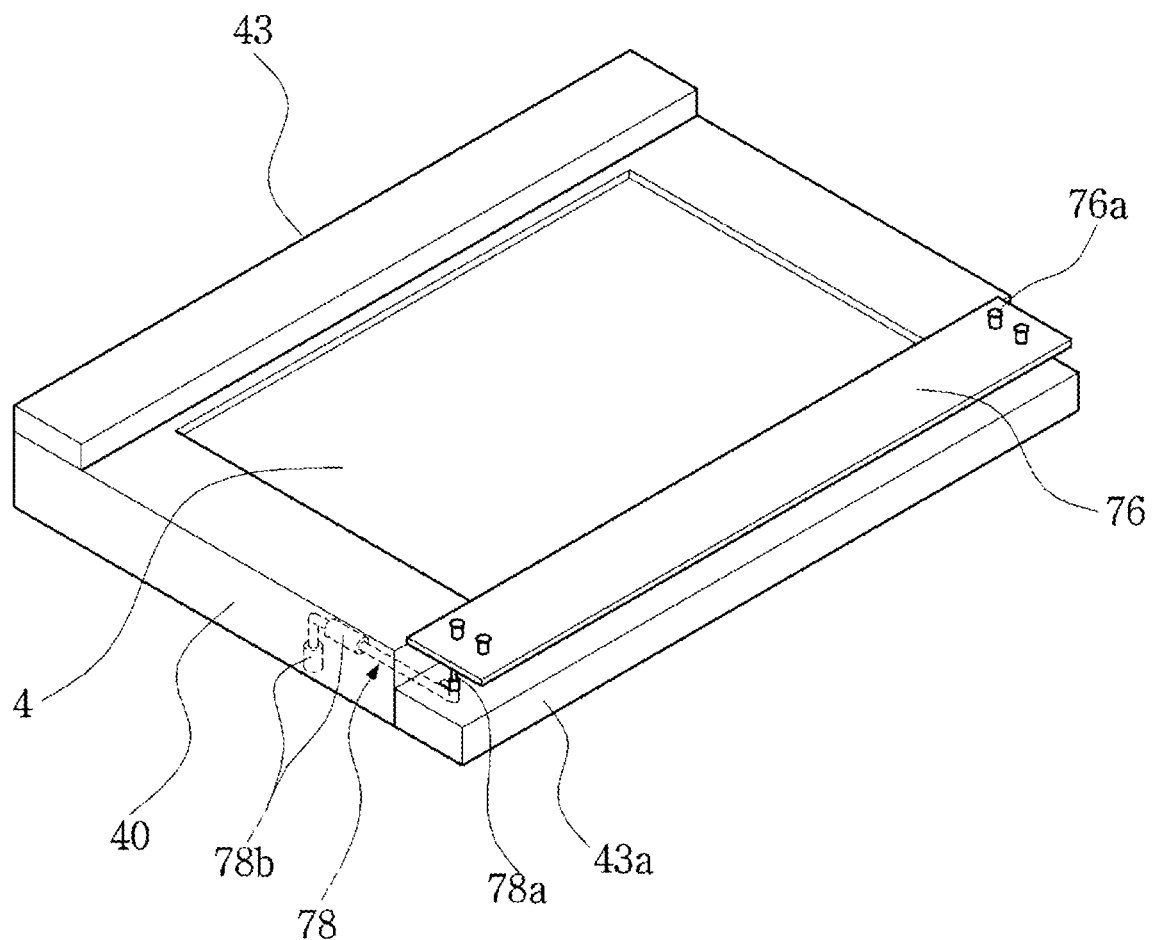
Figure 88:
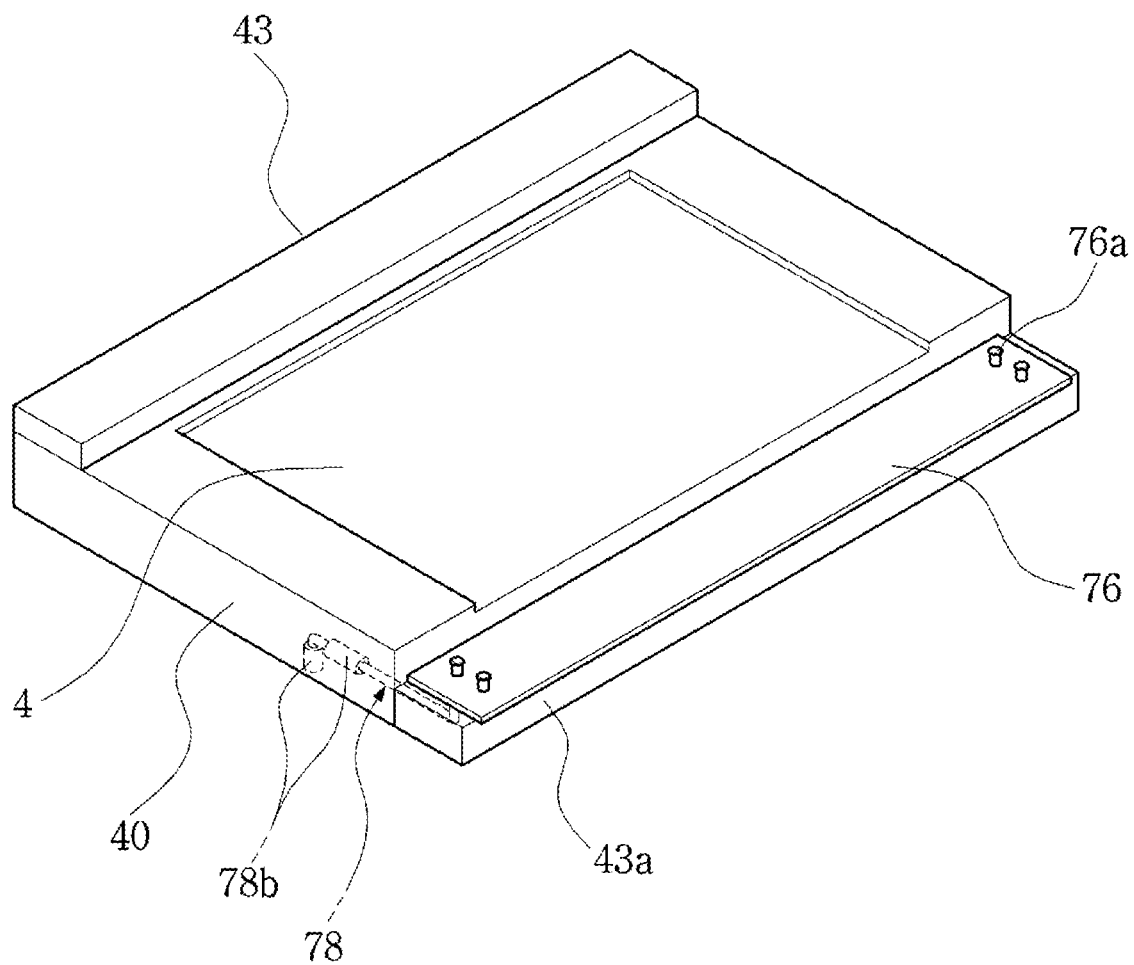

FIGS. 86 to 88 are diagrams illustrating the principle in which the protrusion plate in the example shown in FIG. 85 moves.

As shown in the drawings, the protrusion plate 76 moves horizontally and vertically through the use of the moving bar 78 and the moving shaft 78a.

When the state where the moving bar 78 is bended as shown in FIG. 86 is changed to the state where the moving bar is stretched as shown in FIG. 87, the protrusion plate 76 moves outward. When the moving bar 78 goes down as shown in FIG. 88, the protrusion plate 76 moves down. The movement of the moving bar 78 is adjusted through the sue of a cylinder 78b.

As described in the previous example, the reason that the width of the protrusion plate 76 is greater than the width of the protective lid 43a or the lid support 43b is that the protrusion plate 76 more effectively supports the upper panel housing 20.

The protrusion plate 76, the moving bar 78, and elements incorporated into it, which are hitherto shown in the invention, are all formed of metal alloy to enhance the strength.

Hitherto, the structure is described in which a plate-like moving support is further provided to enhance the strength when the lower panel housing 20 moves while supporting the upper panel housing 40.

Embodiment 8

Figure 89:
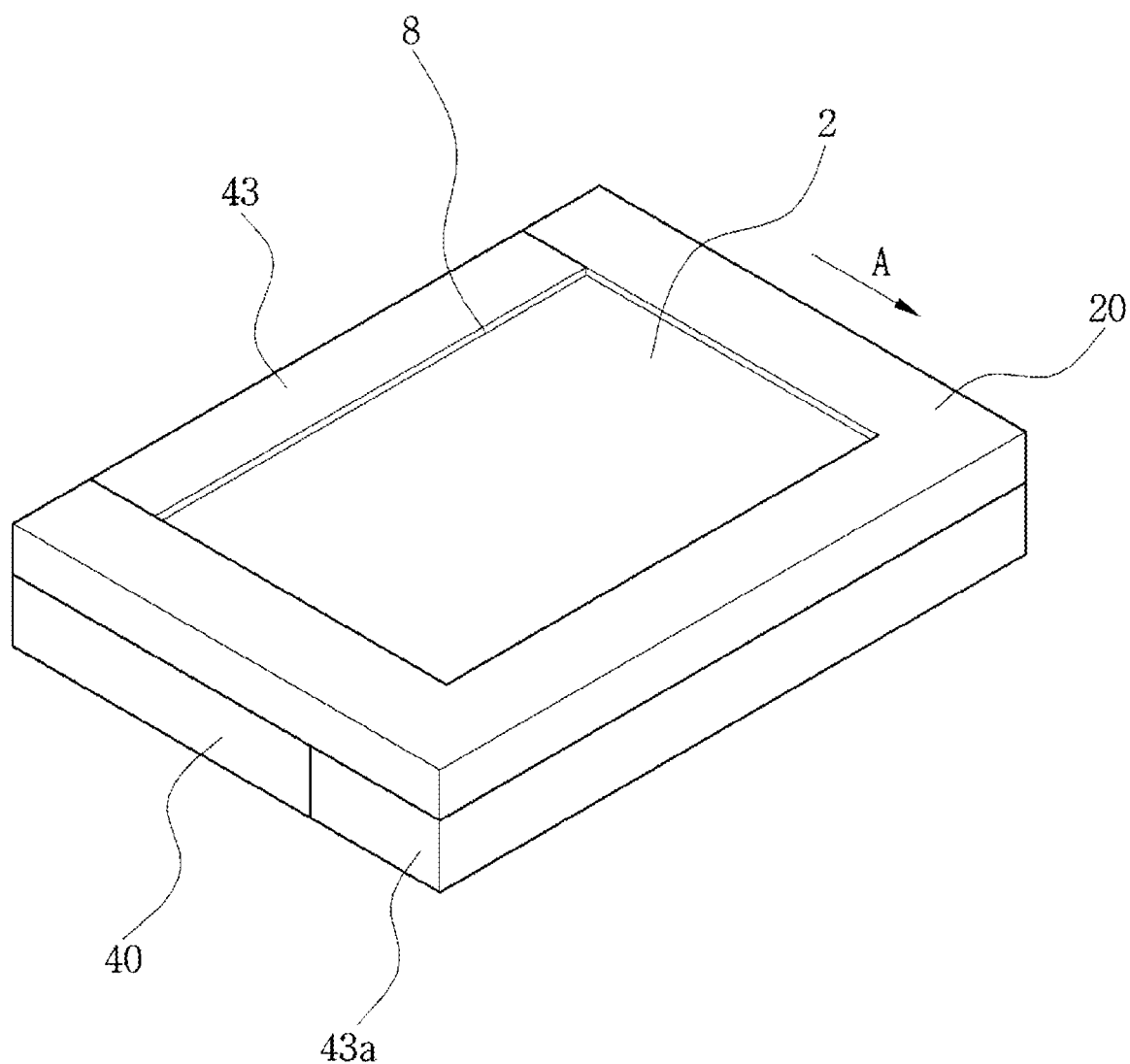
FIGS. 89 to 91 are diagrams illustrating examples where the shape of the protective lid is changed in several forms.
Figure 90:
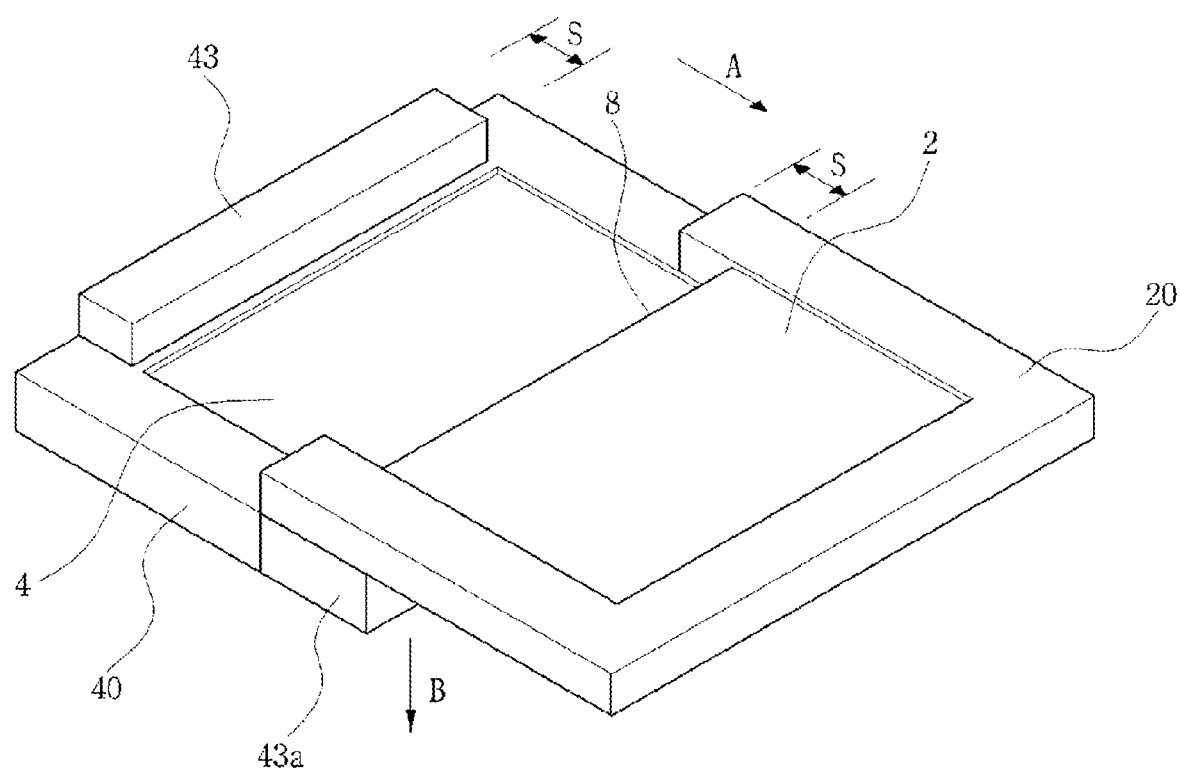
Figure 91:
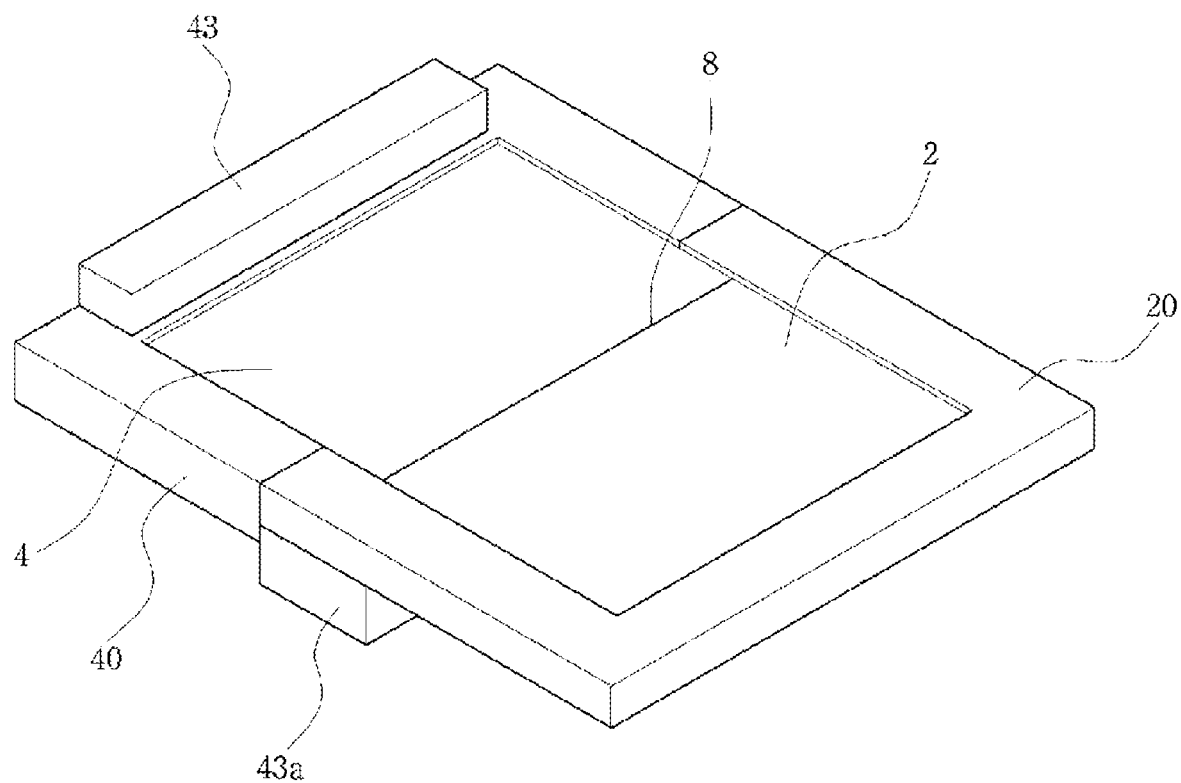

FIGS. 89 to 91 are diagrams illustrating an example where the shape of the protective lid is modified.

As shown in the drawing, both sides of the upper panel housing 20 are elongated. Accordingly, the length of the protective lid 43 disposed in the lower panel housing 40 is reduced.

FIG. 89 shows the state where the upper and lower panel housings 20 and 40 are stacked and FIG. 90 shows the state where the upper panel housing 20 moves in the direction of arrow A.

The degree of elongation of both sides of the upper panel housing 20 is shown in FIG. 90. That is, when the degree of elongation is defined as "S", the value of "S" is equal to the width of the protective lid 43.

The value of "S" may be smaller than the width of the protective lid. In this case, the shape of the protective lid is designed to match therewith. Various changes in design are not shown in the drawing.

FIG. 91 shows the state where the upper panel housing moves down from the state shown in FIG. 90 and where two panel housings are stretched fully.

Figure 92:
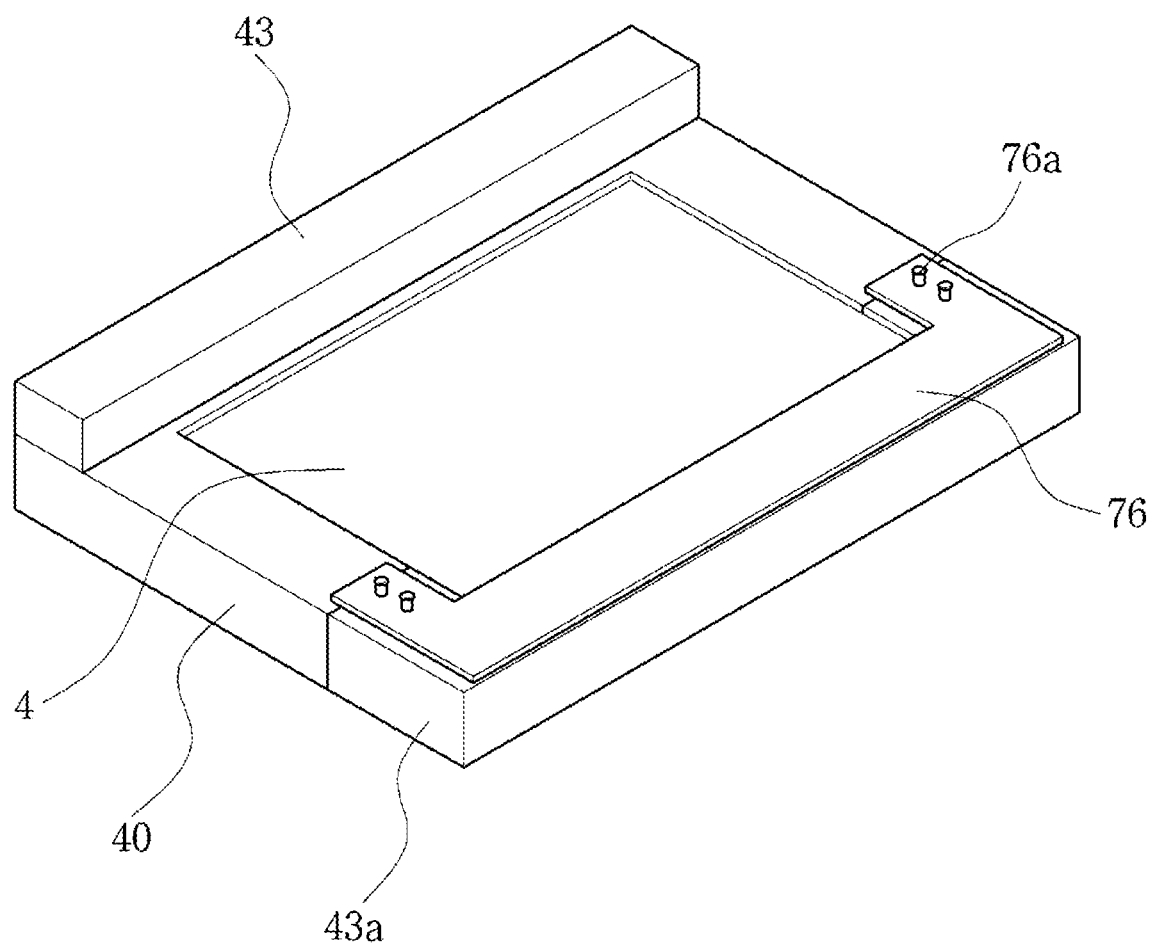
FIGS. 92 and 93 are diagrams illustrating the lower panel housing.
Figure 93:
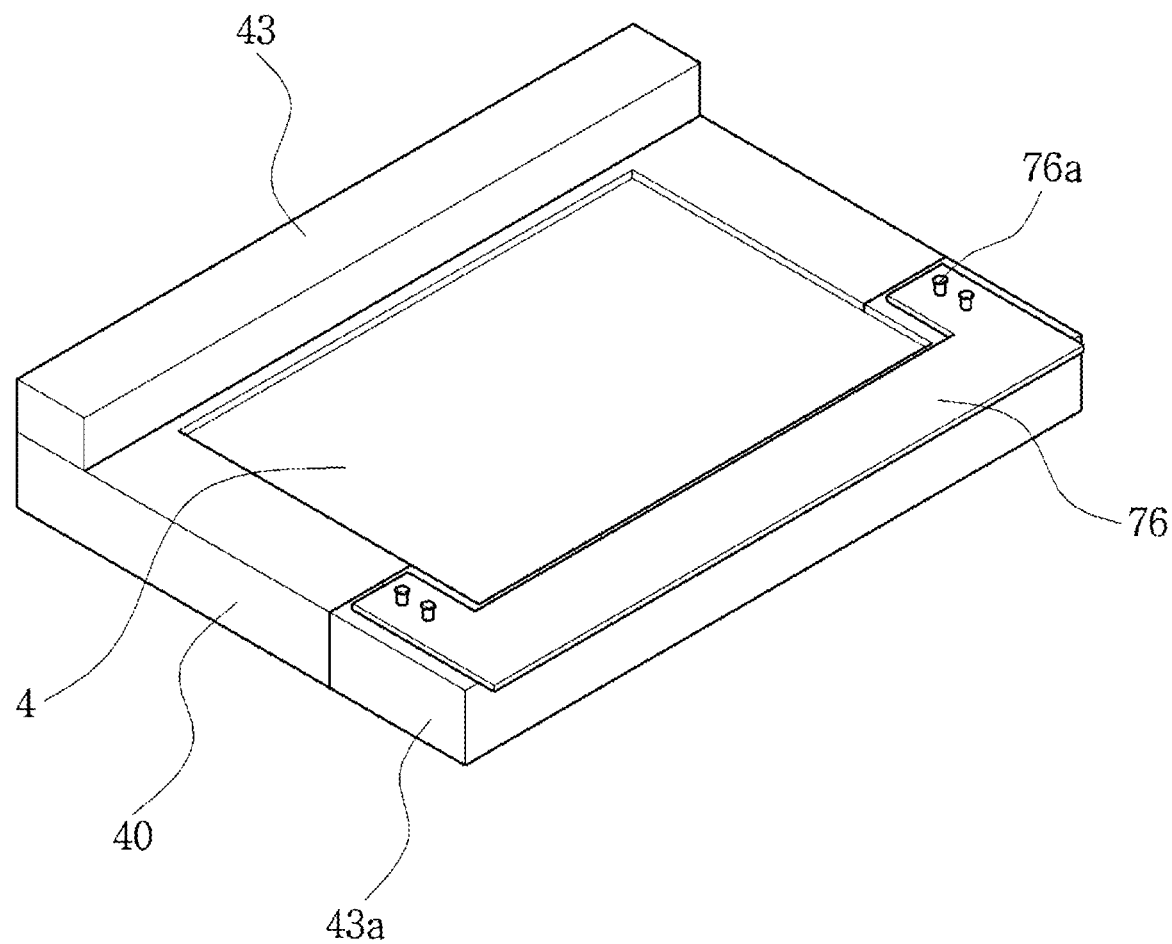

FIGS. 92 and 93 are diagrams illustrating the lower panel housing.

That is, FIGS. 92 and 93 show the structure of the lower panel housing matching with the example shown in FIGS. 89 to 91. The protrusion plate 76 has a "⊂" shape and further extends along both sides. The fixing protrusions 76a are shifted inward.

The lower lid 43a further extends in the direction of both sides and thus has a "⊂" shape.

The state shown in FIG. 92 corresponds to the state shown in FIG. 89. When the protrusion plate 76 moves outward in this state, the state shown in FIG. 93 corresponding to FIG. 90 is achieved. That is, similarly to the previous example, the fixing protrusions 76a of the protrusion plate 76 move while supporting the upper panel housing 20.

Embodiment 9

Figure 94:
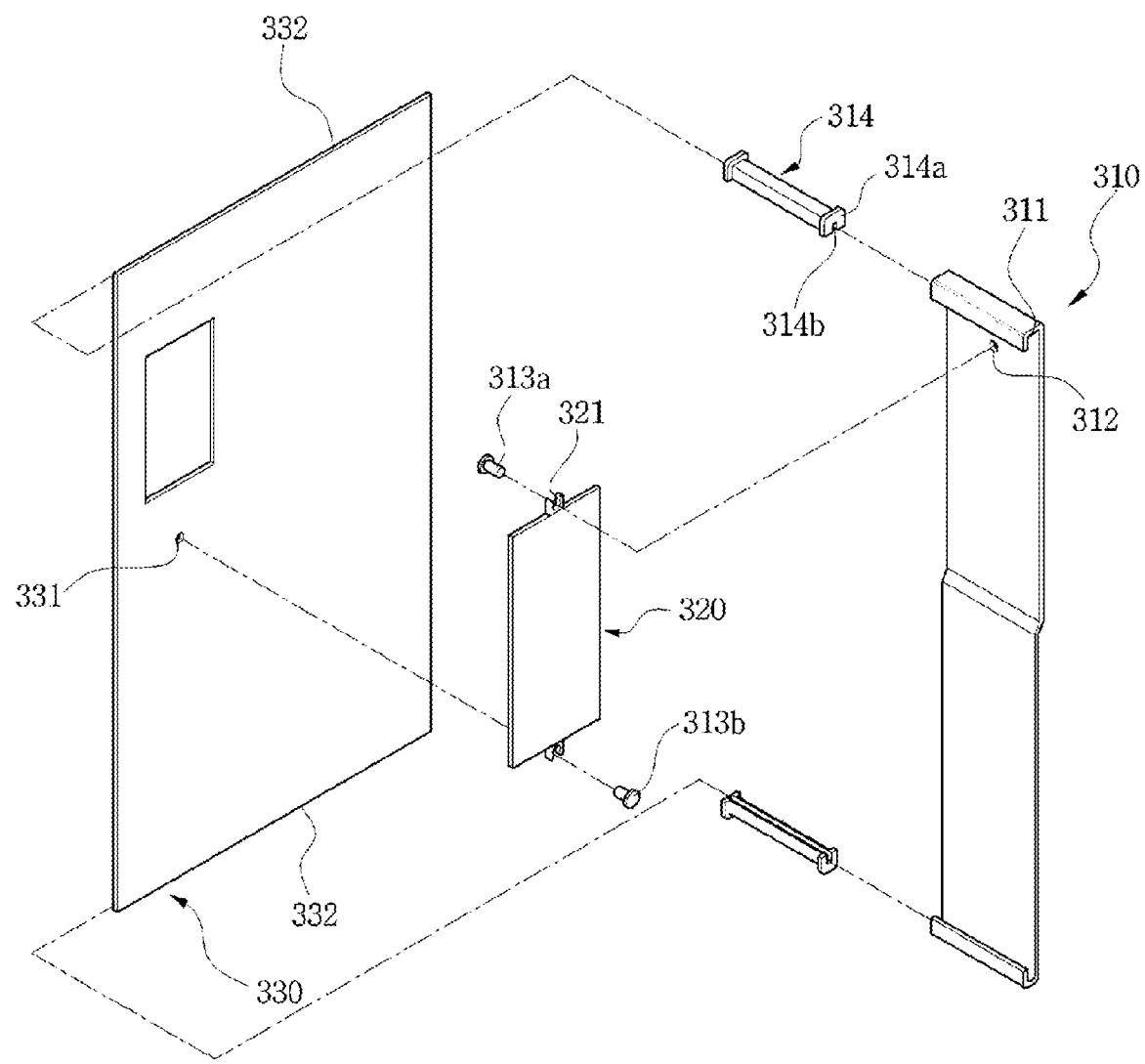
FIG. 94 is a diagram illustrating an example where a spring assembly is coupled to the bottom plate shown in FIG. 46.

FIG. 94 is a diagram illustrating another example where a spring assembly is coupled to the bottom plate shown in FIG. 46.

As shown in the drawing, a bottom plate 330 (corresponding to reference numeral 81 in FIG. 46) is provided and the bottom plate 330 includes a sliding protrusion 332 and a hinge hole 331. The bottom plate further includes a plate 310. The plate 310 is coupled to the bottom plate 330 through the use of a spring assembly 320.

A fixing groove 311 is formed on both sides of the plate 310 and a guide frame 314 is inserted into the fixing grooves 311. The guide frame 314 includes a guide groove 314b and a guide stepped portion 314a. The guide stepped portion 314a prevents the guide frame 314 from falling out of the fixing groove 311.

In addition, the spring assembly 320 is an elastic member which can be compressed and restored. That is, the spring assembly can be compressed with an application of a force and can be restored with a release of the force. In some cases, the spring assembly may employ a structure which can be expanded and restored. That is, the spring assembly is expanded with an application of a force and is restored with a release of the force. Various spring assemblies typically used for a sliding type mobile phone can be used as the spring assembly in the invention.

The spring assembly is coupled to the hinge hole 312 of the plate 310 through the use of a hinge 313a and is coupled to the hinge hole 331 of the bottom plate 330 through the use of another hinge 313b. At this time, hinge locks 321 of the spring assembly 320 are coupled to the hinges 313a and 313b.

On the other hand, the sliding protrusion 332 of the bottom plate 330 is inserted into the guide groove 314b of the guide frame 314 inserted into the fixing groove 311 of the plate 310.

Figure 95:
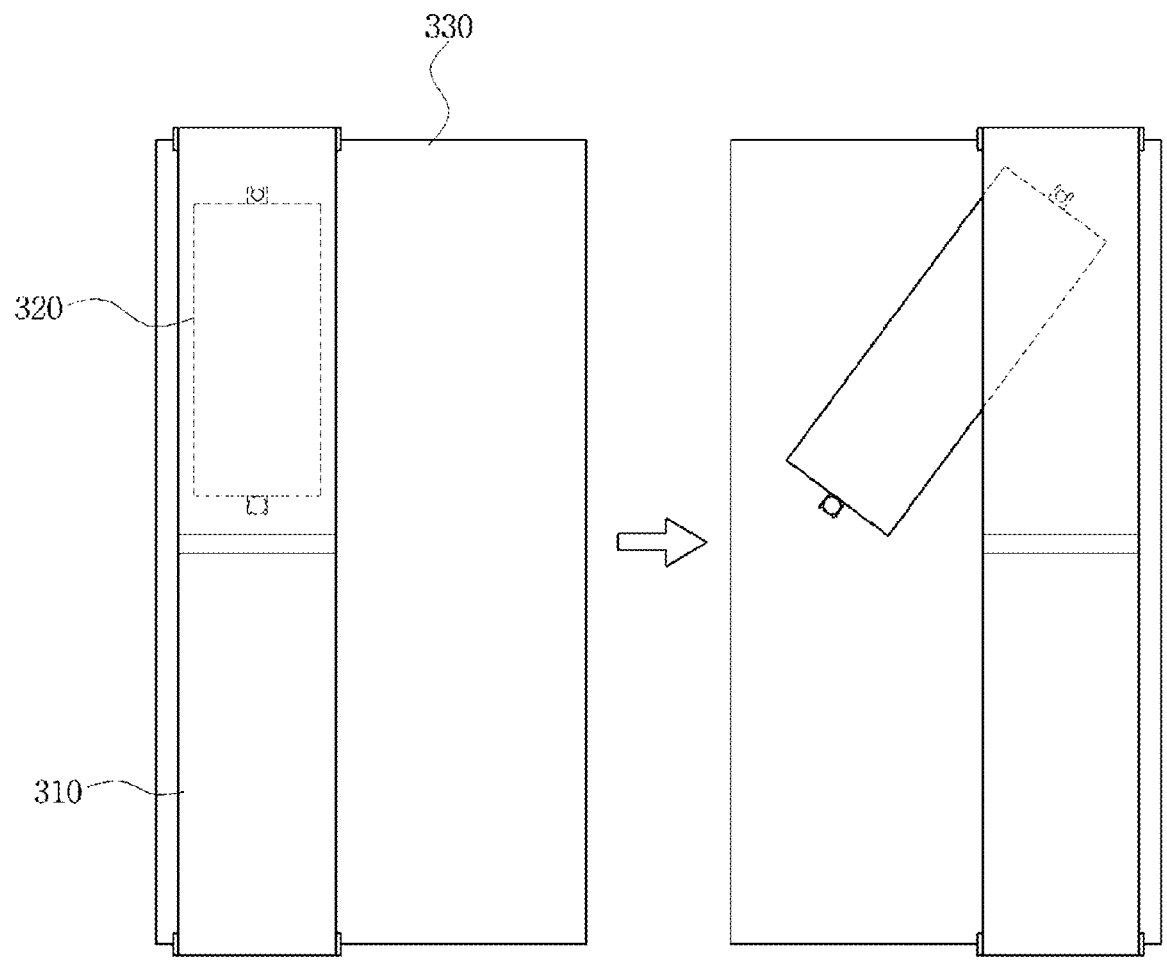
FIG. 95 is a structural diagram illustrating the sliding principle.

FIG. 95 is a structural diagram illustrating the sliding principle in FIG. 94.

As shown in the drawing, the plate 310 slides and moves over both side surfaces of the sliding plate 330 (corresponding to reference numeral 81 in FIG. 46 and referred to as a bottom plate). At this time, the spring assembly 320 relays the sliding.

The left side of FIG. 95 shows the state where the spring assembly 320 is compressed and the right side shows the state where the spring assembly is expanded (restored). That is, the plate 310 moves with an application of a force while the spring assembly 320 is compressed, and is located at one end of the bottom plate 330. With the release of the force, the spring assembly 320 is expanded and the plate 310 is located at the other end of the bottom plate 330.

Figure 96:
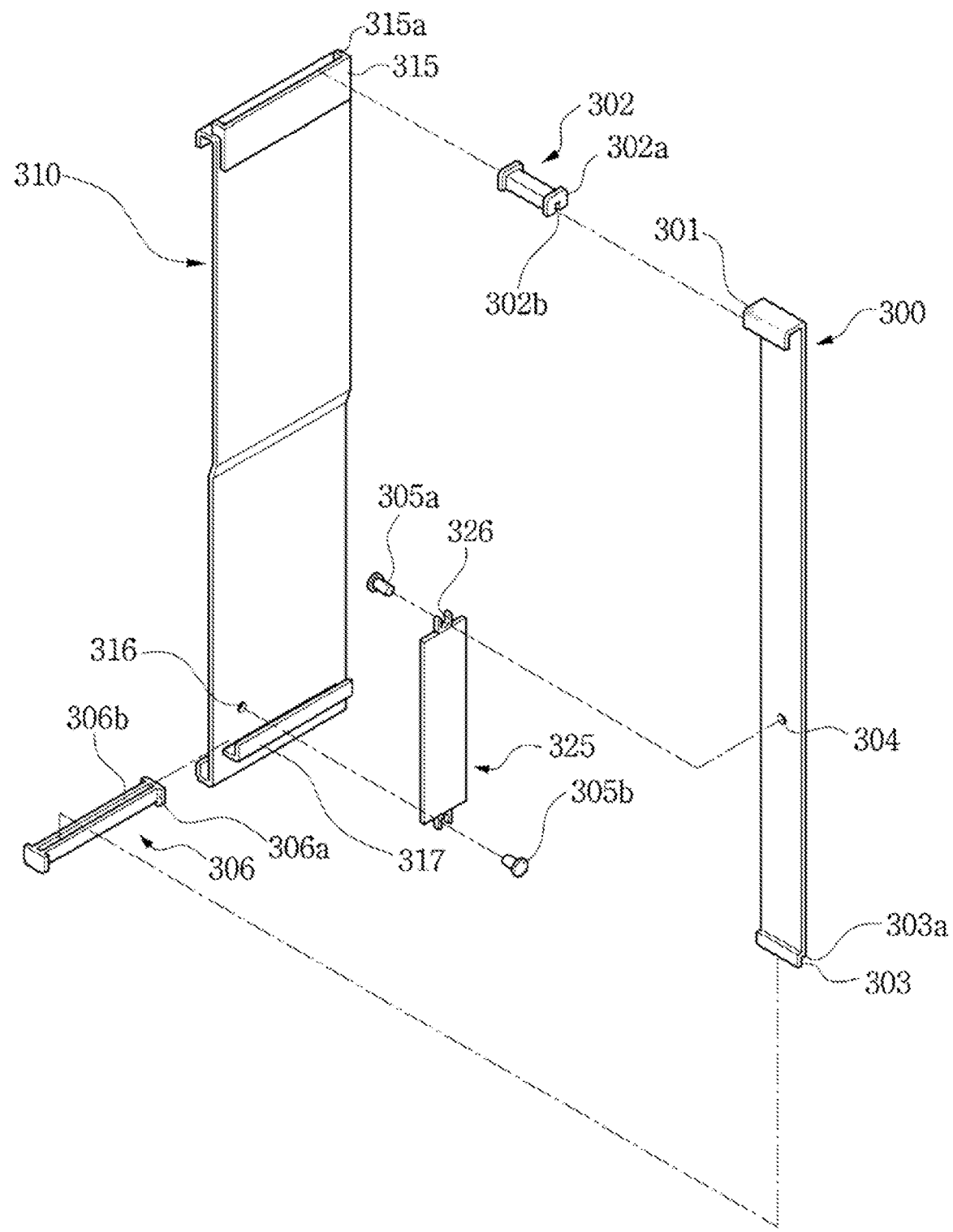
FIG. 96 is a diagram illustrating a plate and a support plate.

FIG. 96 is a diagram illustrating a plate and a support plate.

The support plate 300 in the drawing is located on the support 43a shown in FIGS. 41, 82, 83, and 89.

The support plate 300 is coupled to the plate 310 through the use of another spring assembly 325 and slides relative thereto. The sliding principle is similar to that shown in FIGS. 94 and 95. Accordingly, the spring assembly 325 is coupled to the plate 310 and the support plate 300 through the use of hinges 305a and 305b and hinge holes 304 and 316. At this time, hinge locks 326 are used.

As shown in the drawing, a sliding support 315 and a groove support 317 are disposed on both sides of the plate 310. A protrusion 315a is formed on the sliding support 315. A guide frame 306 is mounted on the inside of the groove support 317. The guide frame 306 includes a protrusion 306a and a guide groove 306b.

A fixing groove 301 is formed on one side of the support plate 300 and the guide frame 302 is mounted on the fixing groove 301. The guide frame 302 includes a guide groove 302b and a protrusion 302a. The protrusion 302a serves to prevent the guide frame 302 from falling out of the fixing groove 301.

On the other hand, a sliding protrusion 303 is disposed on the other side of the support plate 300. The protrusion 303 is bent in a bended portion 303a.

Accordingly, the protrusion 315a of the plate 310 is inserted into the guide groove 302b of the support plate 300 and slides therein, and the protrusion 303 of the support plate 300 is inserted into the guide groove 306b of the plate 310 and slides therein.

Figure 97:
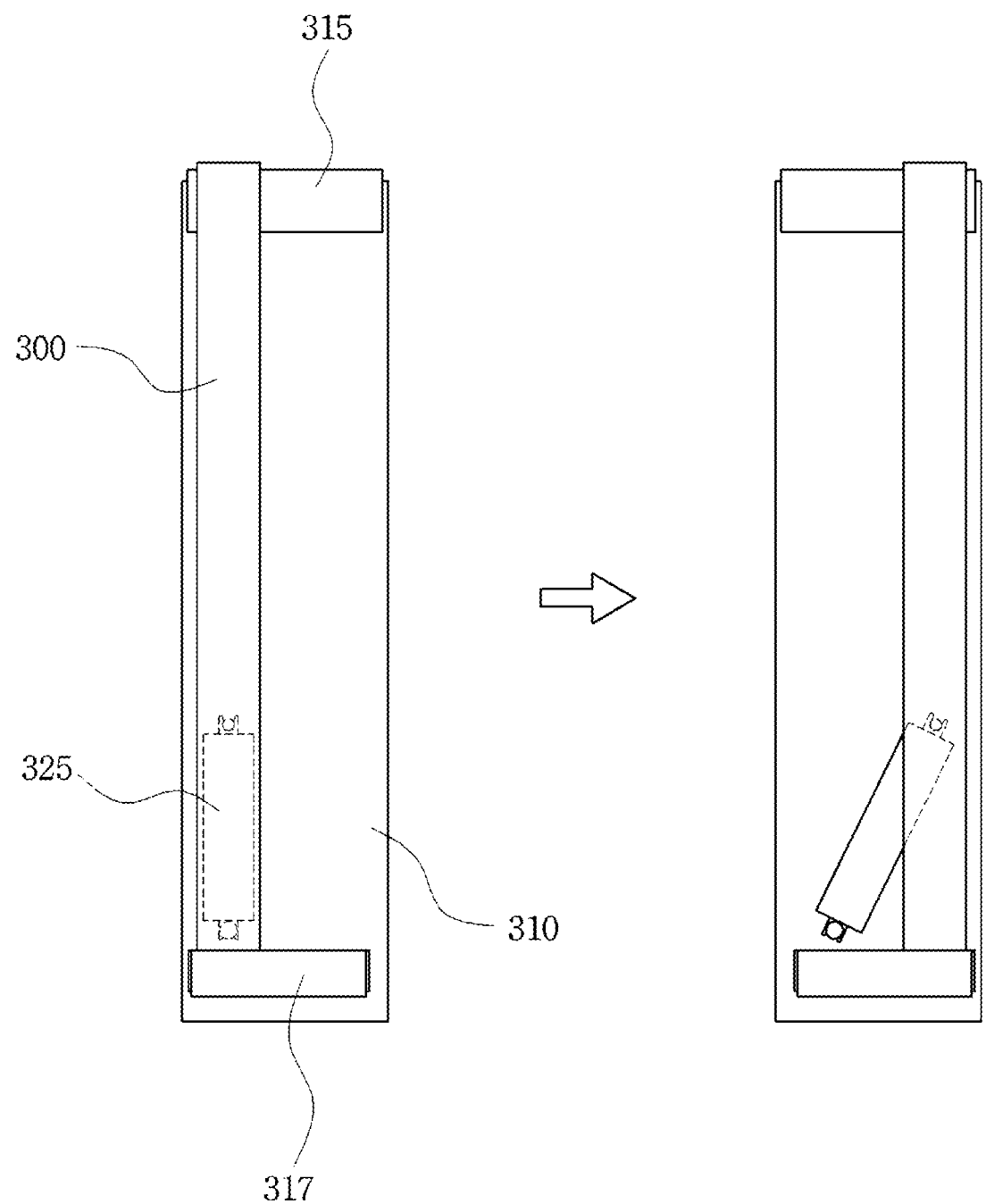
FIG. 97 is a diagram illustrating the sliding principle in FIG. 96.

FIG. 97 is a diagram illustrating the sliding principle in FIG. 96.

As shown in the drawing, the support plate 300 slides and moves over the plate 310. At this time, the spring assembly 325 relays the sliding.

The left side in FIG. 97 shows the state where the spring assembly 325 is compressed and the right side shows the state where the spring assembly is restored (the state where the force applied to the spring is released). That is, the support plate 300 moves with an application of a force while the spring assembly 325 is compressed, and is located at one end of the plate 310. With the release of the force, the spring assembly 325 is expanded (restored) and the support plate 300 is located at the other end of the plate 310.

Figure 98:
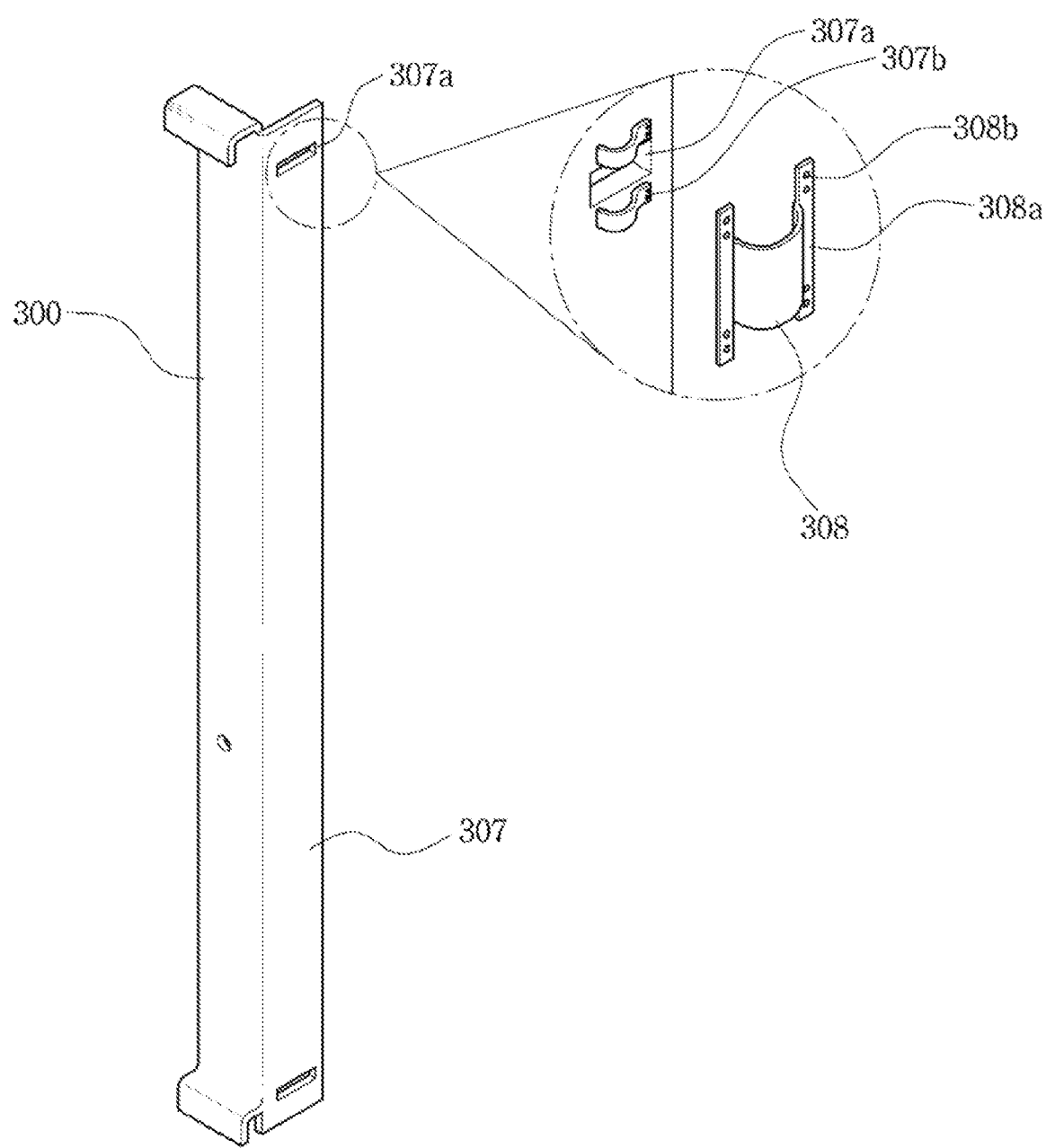
FIG. 98 is a diagram illustrating a side plate disposed in the support plate.

FIG. 98 is a diagram illustrating a side plate of the support plate.

As shown in the drawing, a side plate 307 is disposed on one side surface of the support plate 300 and the side plate 307 includes a spring protrusion 307b and an insertion hole 307a. The spring protrusion 307b and the insertion hole 307a are disposed on a deep side of the side plate 307 in the drawing, and are shown in a particularly enlarged view. The position of the spring protrusion 307b and the insertion hole 307a in the side plate 307 is indicated by a dotted circle.

The spring protrusion 307b is coupled to the side plate 307 with means such as a hinge or a screw. A curved housing 308 surrounding the spring protrusion 307b and the insertion hole 307a is further provided. The curved housing 308 is coupled to the side plate 307 with a coupling plate 308a. At this time, the coupling plate 308a is coupled using a coupling portion 308b such as a screw or a hinge.

The spring protrusion 307b has a curved shape, is formed of metal or plastic having an elastic force like a spring, and can be slightly deformed with an applied force or pressure.

Figure 99:
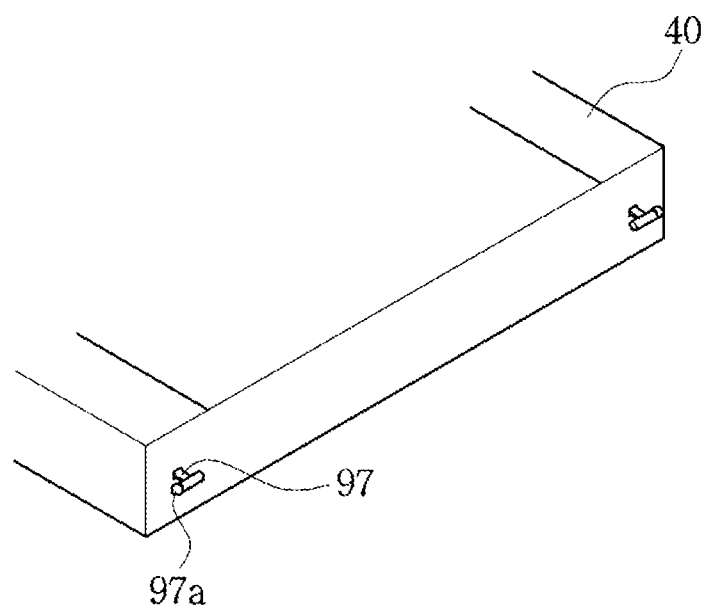
FIG. 99 is a diagram illustrating a coupling protrusion of the lower panel housing.

FIG. 99 is a diagram illustrating coupling protrusions of the lower panel housing.

As shown in the drawing, a coupling protrusion 97 and a protrusion head 97a are disposed on the side surface of the lower panel housing 40, the coupling protrusion 97 is inserted into the insertion hole 307a of the side plate 307, and the protrusion head 97a is located between the spring protrusion 307b and the curved housing 308.

Figure 100:
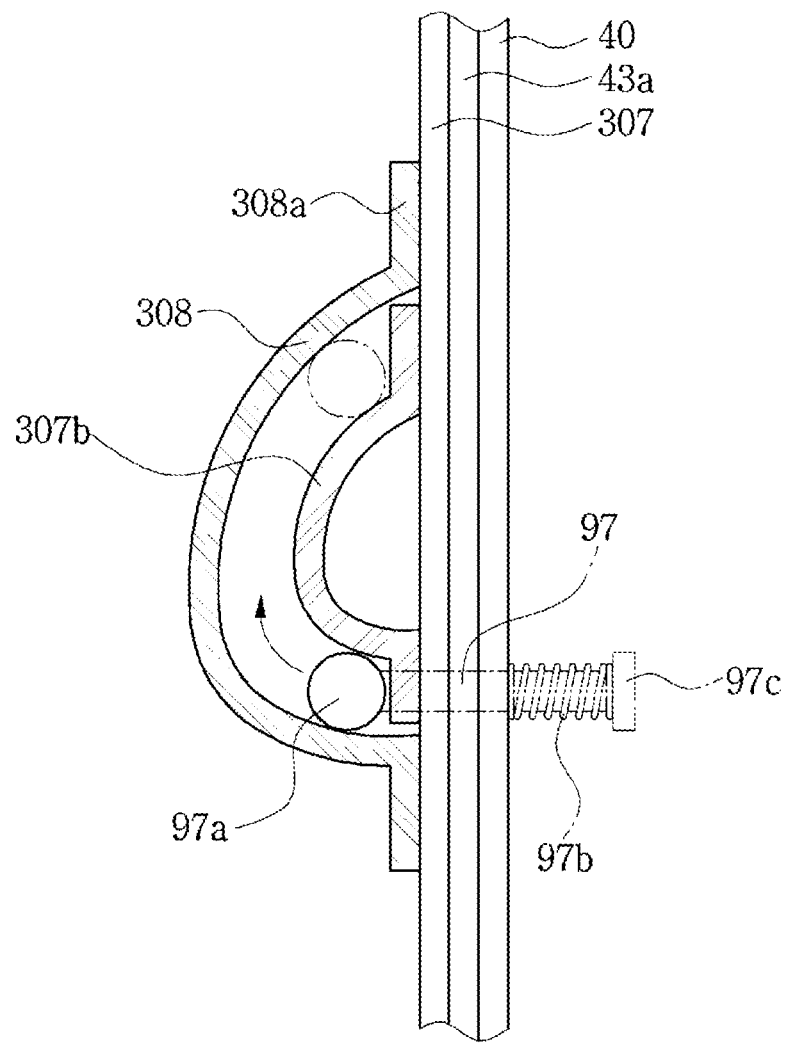
FIG. 100 is a diagram illustrating the principle of causing the panel housing to move by the use of a protrusion head.

FIG. 100 is a diagram illustrating the principle in which the panel housing moves through the use of the protrusion head.

in the invention, the spring protrusion 307b has a curved shape and is formed of metal of plastic having an elastic force. The protrusion head 87a is located between the spring protrusion 307b and the curved housing 308 and the protrusion head 97a vertically moves along the curved shape. That is, all of the curved housing 308, the spring protrusion 307b, the side plate 307, and the support 43a move downward, but the protrusion head 97a and the side surface of the lower panel housing 40 do not move downward relatively.

The upper panel housing 20 and the lower panel housing 40 vertically move along the curved shape with the movement of the protrusion head 97a.

In the drawing, the protrusion head 97a moves in the direction of an arrow and also moves in the opposite direction of the arrow.

On the other hand, the coupling protrusion 97 is also formed in the side wall of the lower panel housing 40 and is surrounded with a spring 97b. A protruding portion 97c is provided to prevent the coupling protrusion 97 from falling out of the side wall of the lower panel housing 40.

The protrusion head 97a can move along the surface of the curved spring protrusion 307b due to the spring 97b. That is, the coupling protrusion 97 can horizontally move about the side wall of the lower panel housing 40.

Figure 101:
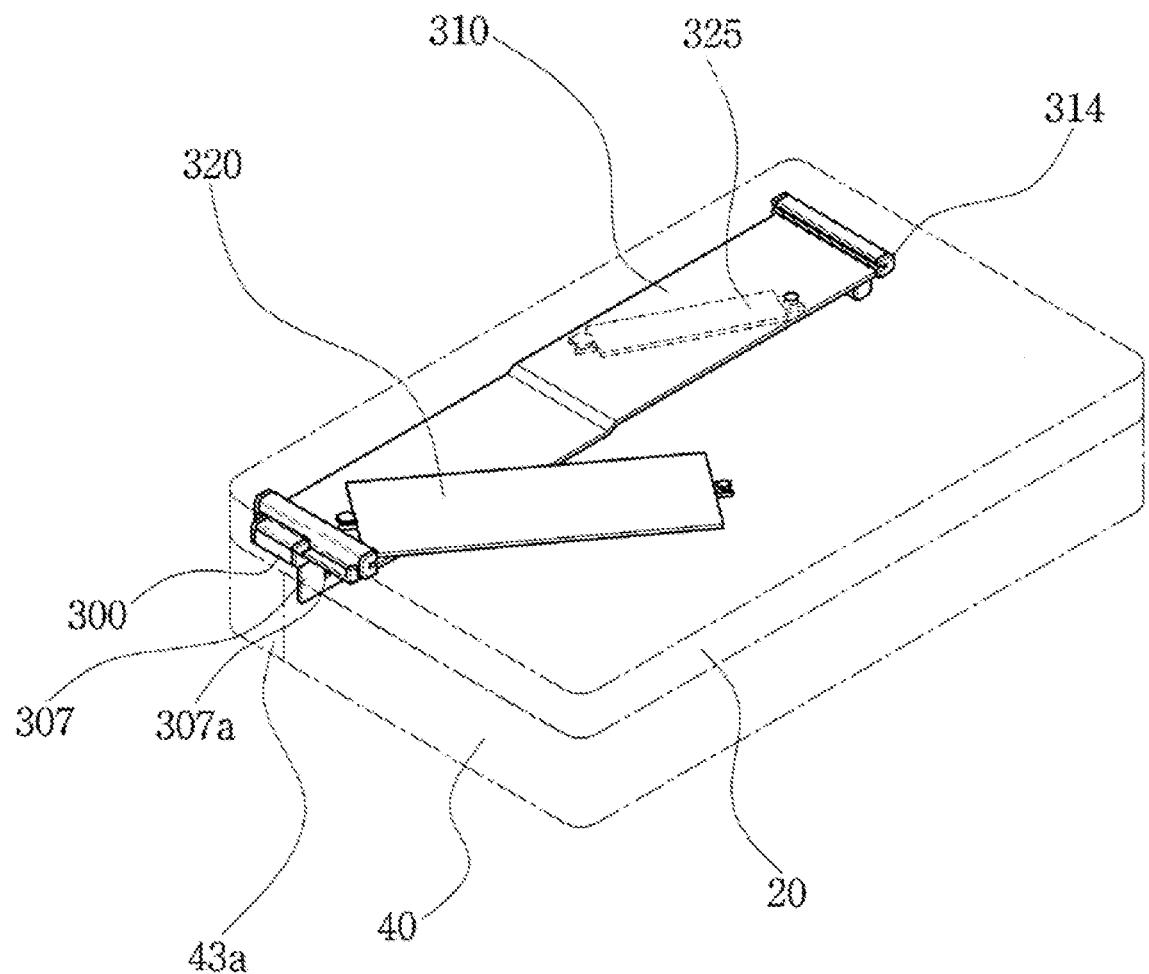
FIGS. 101 to 103 are diagrams illustrating the principle of causing the upper panel housing and the lower panel housing to move horizontally and vertically.
Figure 102:
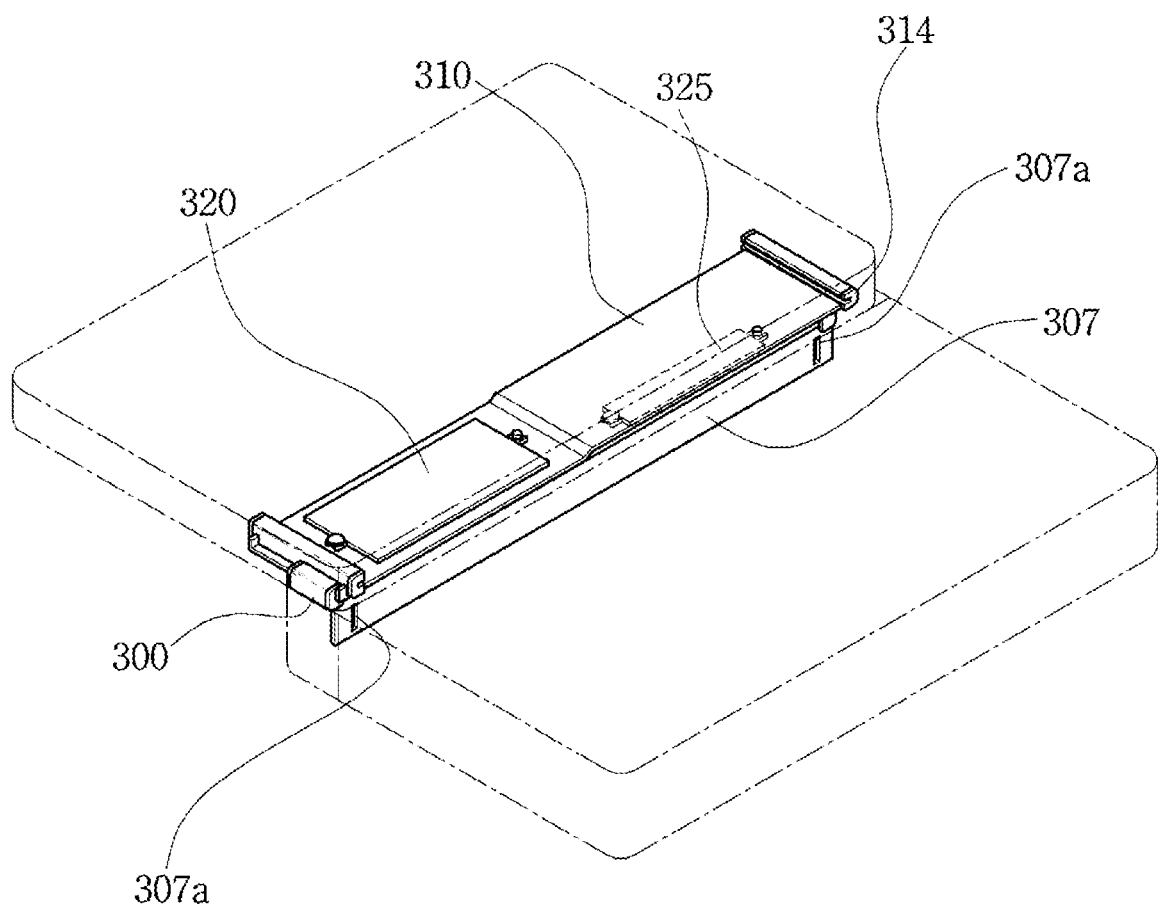
Figure 103:
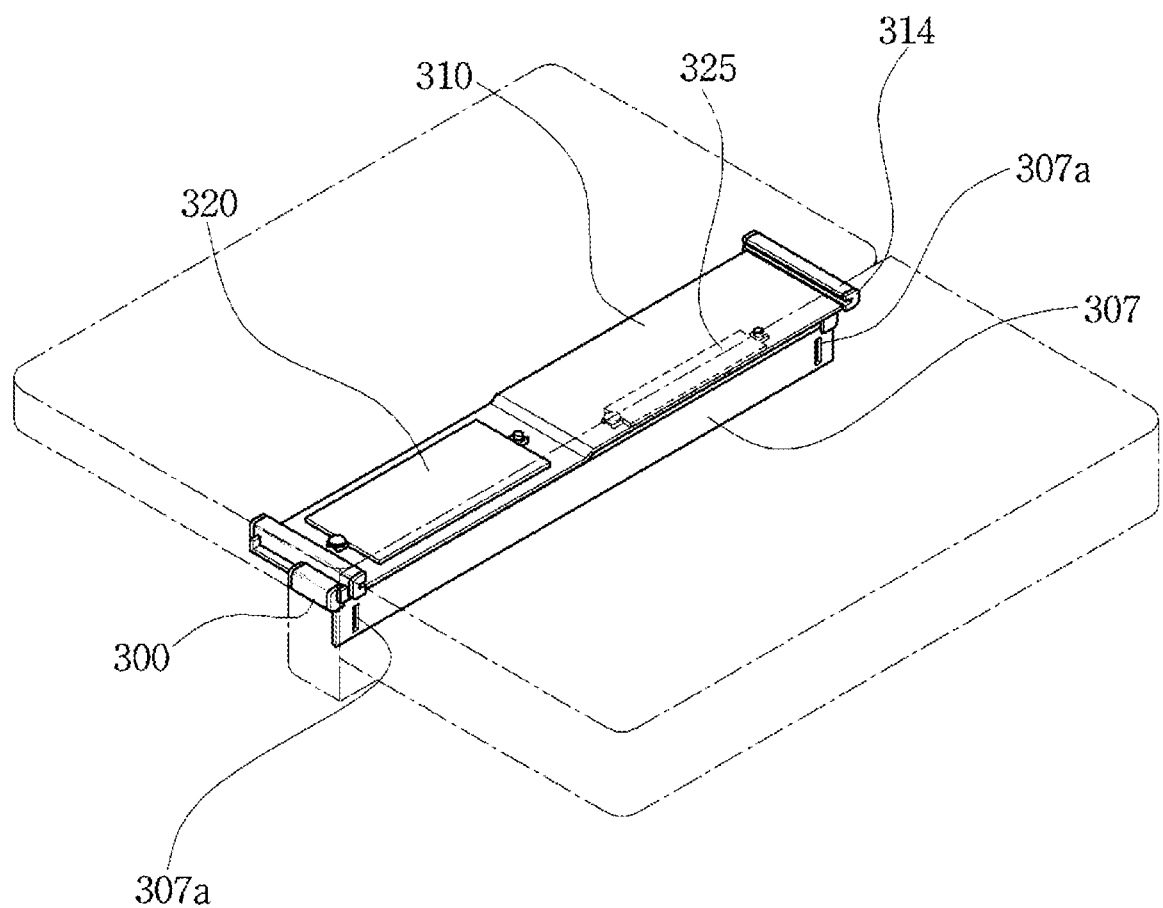

FIGS. 101 to 103 are diagrams illustrating the principle in which the upper panel housing and the lower panel housing move horizontally and vertically.

The bottom plate 330 is coupled to the bottom of the upper panel housing 20, and a sliding groove 80 is provided to insert the sliding protrusion 332 of the bottom plate 330 into the guide groove 314b of the plate 310. Although the groove is not shown in FIG. 101, the grooves 80 shown in FIG. 46 are referred to for the groove.

The plate 310 is disposed on the bottom of the bottom plate 330 and the spring assembly 320 is disposed between the bottom plate 330 and the plate 310. The support plate 300 is disposed on the bottom of the plate 310, and another spring assembly 325 is disposed between the plate 310 and the support plate 300.

At this time, the support plate 300 is strongly fixed to the top of the support 43a of the lower panel housing 40. Although not shown in the drawing, the support plate 300 is coupled to the support 43a in various coupling manners using a screw, a hinge, a groove and protrusion, and the like.

In the state where the upper panel housing 20 and the lower panel housing 40 are stacked and closed completely as shown in FIG. 101, the spring assemblies 320 and 325 are expanded (restored). That is, as described with reference to FIGS. 95 and 97, the spring assemblies 320 and 325 are expanded.

When the upper panel housing 20 and the lower panel housing 40 horizontally slide as shown in FIG. 102, they slide in the principle described with reference to FIGS. 94 and 96. That is, the bottom plate 300 and the plate 310 slide and the support plate 300 and the plate 310 slide. The spring assemblies 320 and 325 are compressed as described with reference to FIGS. 95 and 97.

The horizontal sliding is enabled by causing the fixing groove 311 through the bottom groove 80.

On the other hand, when the upper panel housing 20 is pushed as much as possible so as to horizontally slide, the upper panel housing 20 vertically moves and is in the state shown in FIG. 103. This is because the protrusion head 97a moves between the spring protrusion 307b and the curved housing 308 as shown in FIG. 100.

That is, when a force is applied, the upper panel housing 20 moves downward to come in close contact with the lower panel housing 40 with the spring protrusion 307b and thus two displays 2 and 4 are contiguous to each other as shown in FIG. 33.

Figure 104:
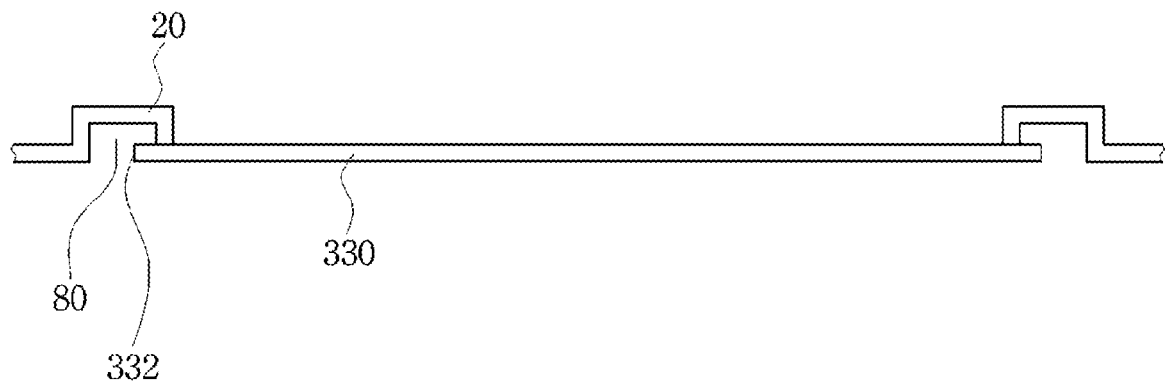
FIG. 104 is a diagram illustrating a sectional shape of a bottom plate.

FIG. 104 is a diagram illustrating the sectional shape of the bottom plate.

As shown in the drawing, the bottom plate 330 is coupled to the lower end of the upper panel housing 20 and is directly mounted on the lower end of the upper panel housing 20. Accordingly, the bottom plate 330 is formed of metal or the like so as to be strong. The sliding protrusion 332 is formed at both ends of the bottom plate 330, and the bottom groove 80 is formed so that the sliding protrusion 332 and the fixing groove 311 of the plate 310 are movably inserted into the bottom groove.

Figure 105:
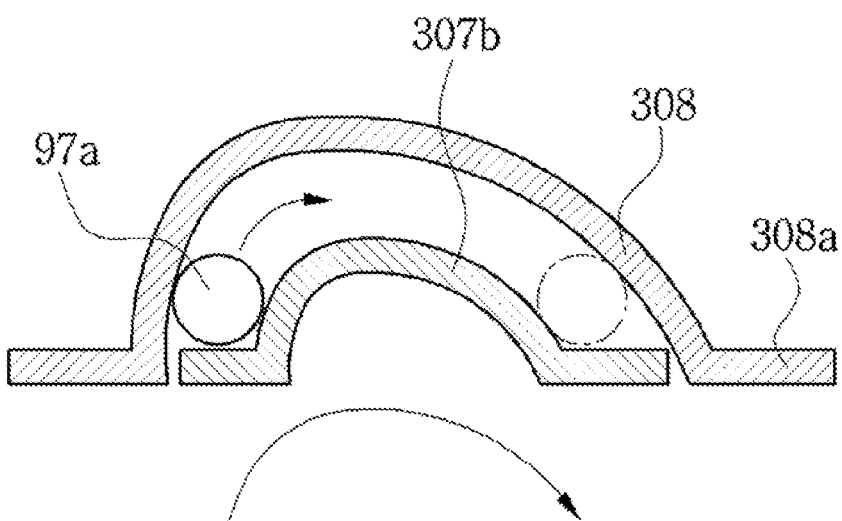
FIGS. 105 and 106 are diagrams illustrating the principle of a path through which the panel housing moves through the use of a spring protrusion.
Figure 106:
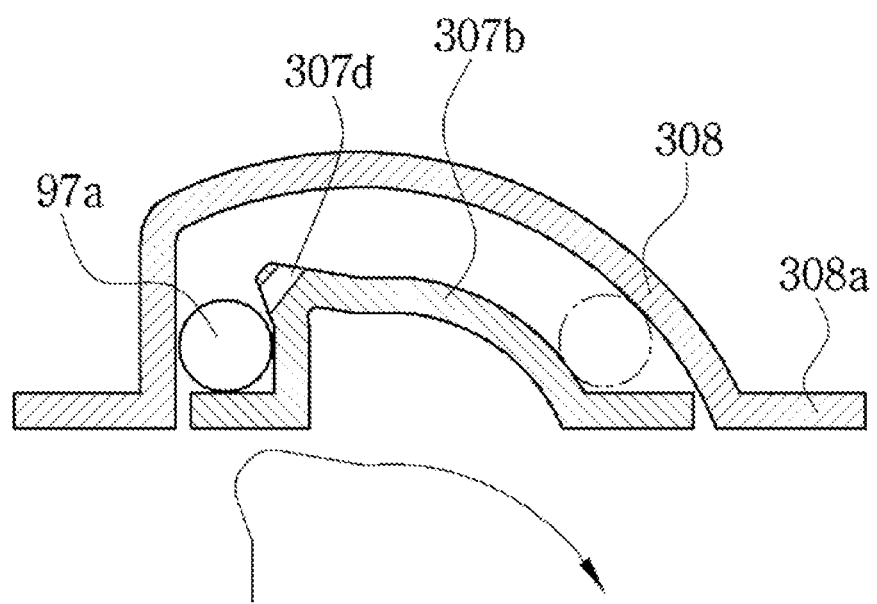

FIGS. 105 and 106 are diagrams illustrating the principle of the path along which the panel housing moves through the use of the spring protrusion.

In FIG. 105, the upper panel housing 20 vertically moves relative to the lower panel housing 40 in the opposite direction of the right-handed curved direction (indicated by an arrow). That is, the upper panel housing 20 and the lower panel housing 40 vertically move in a curved path instead of a straight path. As a result, the distance between the upper panel housing 20 and the lower panel housing 40 increases and then decreases in the course of vertical movement thereof.

At this time, the distance is preferably not excessively great but can be properly set to 0.5 mm, but may be set to 1 mm or 3 mm. This distance is determined depending on the horizontal width of the spring protrusion 307b.

FIG. 106 shows the spring protrusion 307b having a convex curved shape. The upper panel housing 20 and the lower panel housing 40 move reversely to such a shape.

That is, when the upper panel housing 20 moves down to the lower panel housing 40, the upper panel housing 20 moves downward from a position slightly higher than the lower panel housing 40. Finally, the upper panel housing and the lower panel housing come in close contact with each other in a state where they are flush with each other.

The distance from the higher position is typically 0.5 mm and may be any value smaller than 3 mm.

On the contrary, the lower panel housing 20 is returned to the original position along the reverse path.

On the other hand, as shown in the drawing, the protrusion 307d may be designed to easily contract by adding a particular spring.

Figure 107:
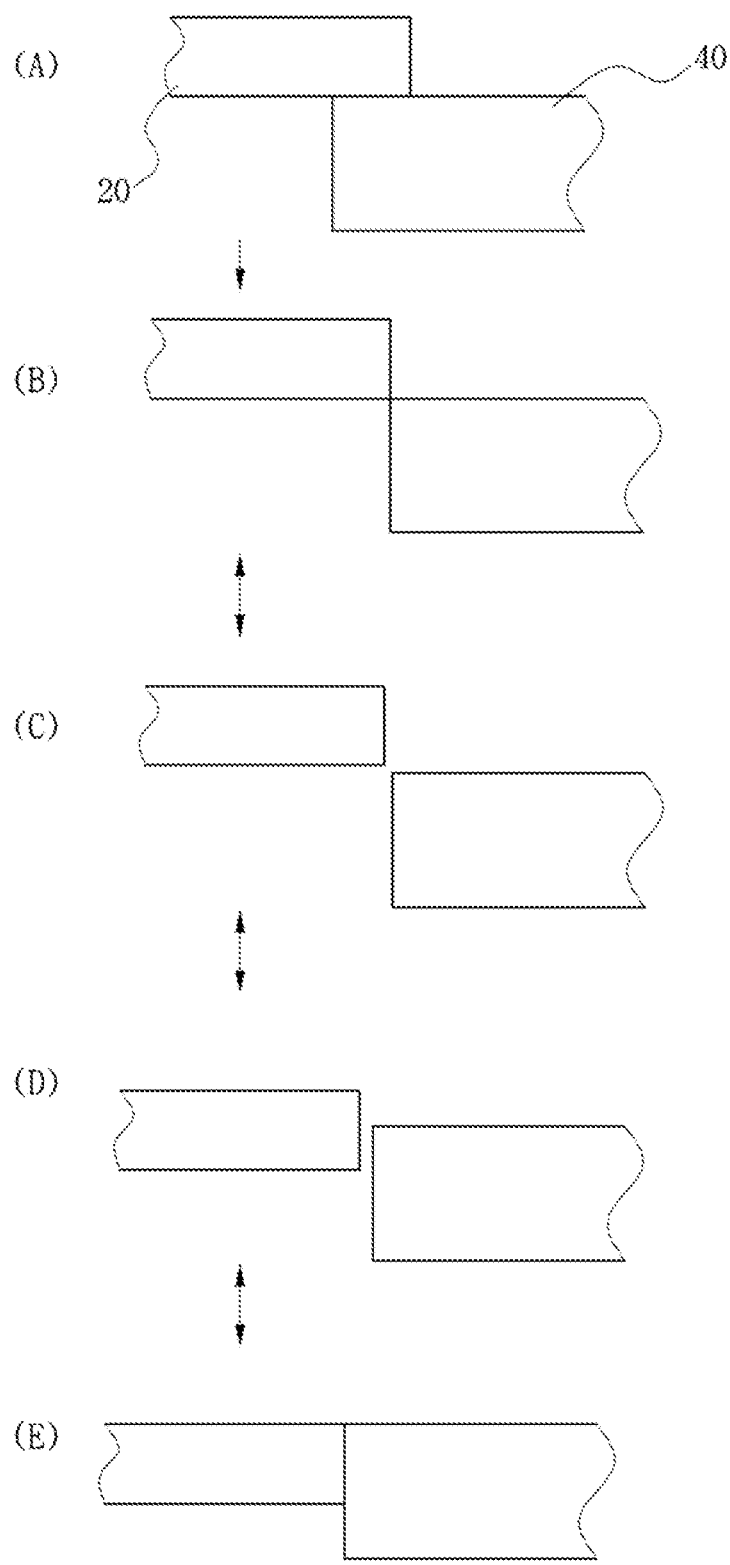
FIG. 107 is a diagram illustrating the movement of the upper and lower panel housings.

FIG. 107 is a diagram illustrating the movement of the upper and lower panel housings.

As shown in the drawing, the upper and lower panel housings 20 and 40 horizontally slide (see (A) of the drawing) and is in the state just before vertically moving (see (B) of the drawing). This movement occurs while the spring assemblies 320 and 325 are compressed with an application of a pressure.

When a pressure is further applied, the upper panel housing 20 moves to a position slightly higher than the lower panel housing 40 (see (C) of the drawing). At this time, the distance of slight upward movement may be 0.05 mm which is very small, but may be appropriately set to the range of 0.5 to 3 mm. This distance is determined depending on the size of the protrusion 307d.

The upper panel housing 20 slightly moves upward and then moves downward (see (D) of the drawing). At this time, the upper panel housing 20 and the lower panel housing 40 move in a state where they are slightly separated from each other. In this case, the separated distance may be 0.05 mm which is very small, but may be appropriately set to the range of 0.5 to 3 mm.

Through these processes, the displays are contiguous to each other (see (E) of the drawing). These processes may be reversely performed with an application of a pressure.

These processes are compared with reference to the drawings. The state (where the protrusion head located downside is indicated by a solid line in FIGS. 35 and 36) where the protrusion head 97a is located downside in FIGS. 105 and 106 corresponds to the state of (B) of FIG. 107, and the state (where the protrusion head located upside is indicated by a one-dot chained line in FIGS. 35 and 36) where the protrusion head 97a is located upside corresponds to the state of (E) of FIG. 107. These processes can be repeated with the application and release of a pressure.

FIGS. 108 to 111 are diagrams illustrating examples of the spring assembly.

In the invention, a typical spring assembly which can be compressed with an application of a force and can be restored with a release of the force or which can be expanded with an application of a force and can be restored with a release of the force is used. An example thereof is shown in the drawings. In addition to the example, various spring assemblies which can be compressed and restored or which can be expanded and restored may be used.

Figure 108:
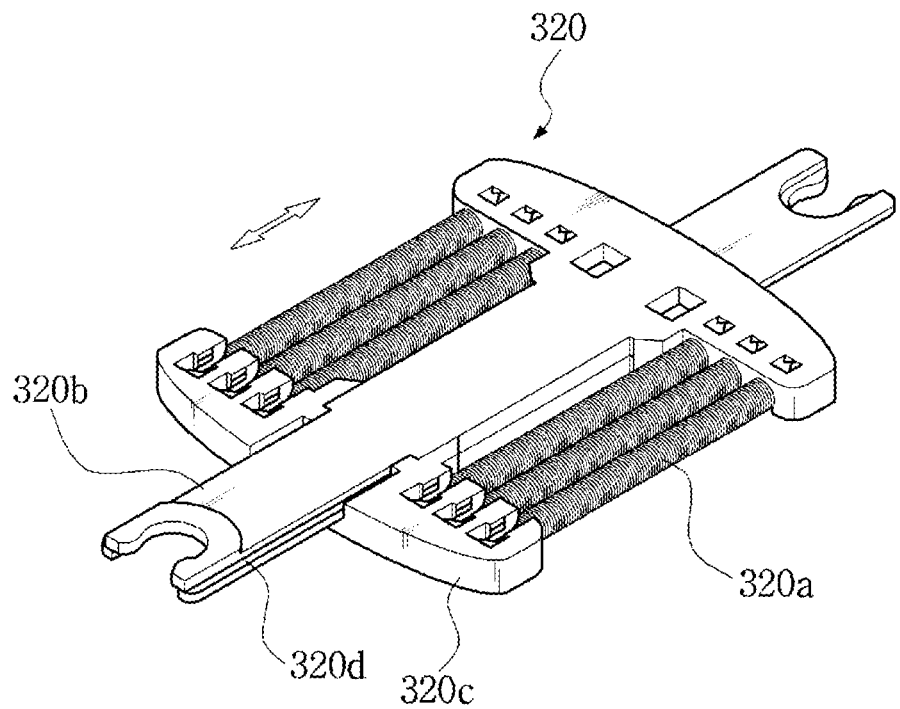
FIGS. 108 to 111 are diagrams illustrating examples of a springing assembly.

In FIG. 108, two sliding bars 320b and 320c coupled with a coil spring 320a slide relative to each other through the use of sliding means 320d. At this time, the two sliding bars 320b and 320c can be relatively compressed and expanded through the use of the coil spring 320a. one end of each of the sliding bars 320b and 320c is coupled to the bottom plate 330 and the other end thereof is coupled to the plate 310.

Figure 109:
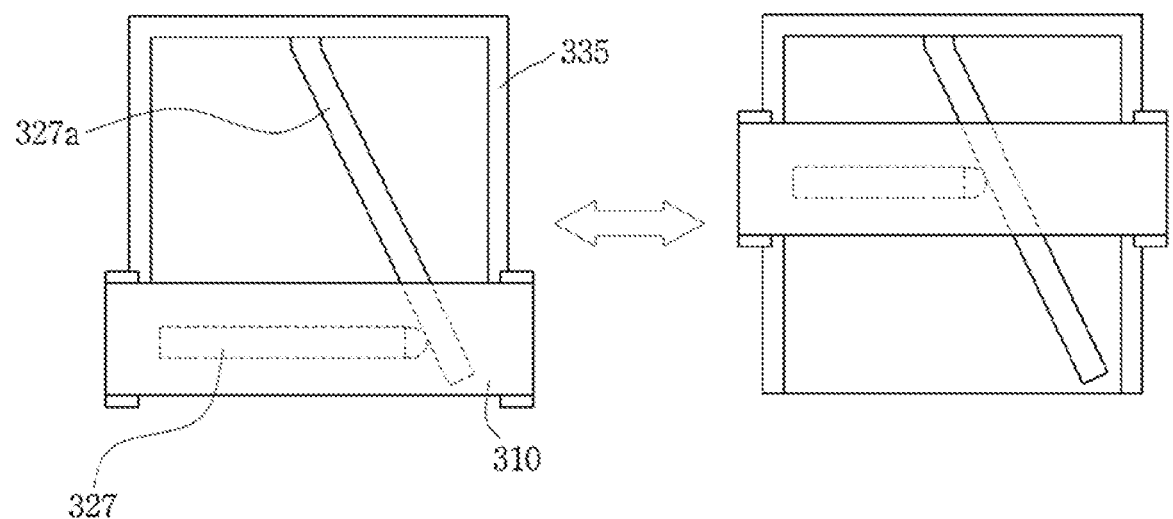

FIG. 109 shows the principle in which the plate 310 can move using a tilted bar 327a and a compression spring 327. That is, when a pressure is applied to the plate 310 to push up the plate, the compression spring 327 is compressed by the tilted bar 327a. When the pressure is released, the compression spring 327 is expanded to restore the plate 310 to the original position through the use of the sliding groove or the sliding bar 335.

Figure 110:
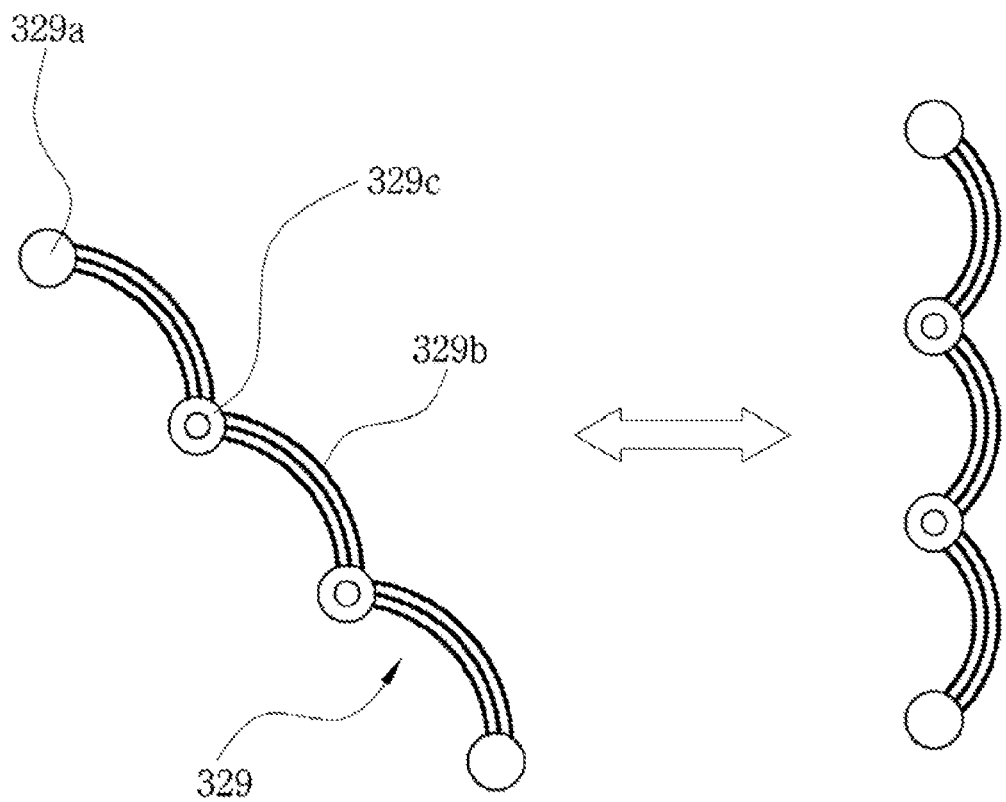
Figure 111:
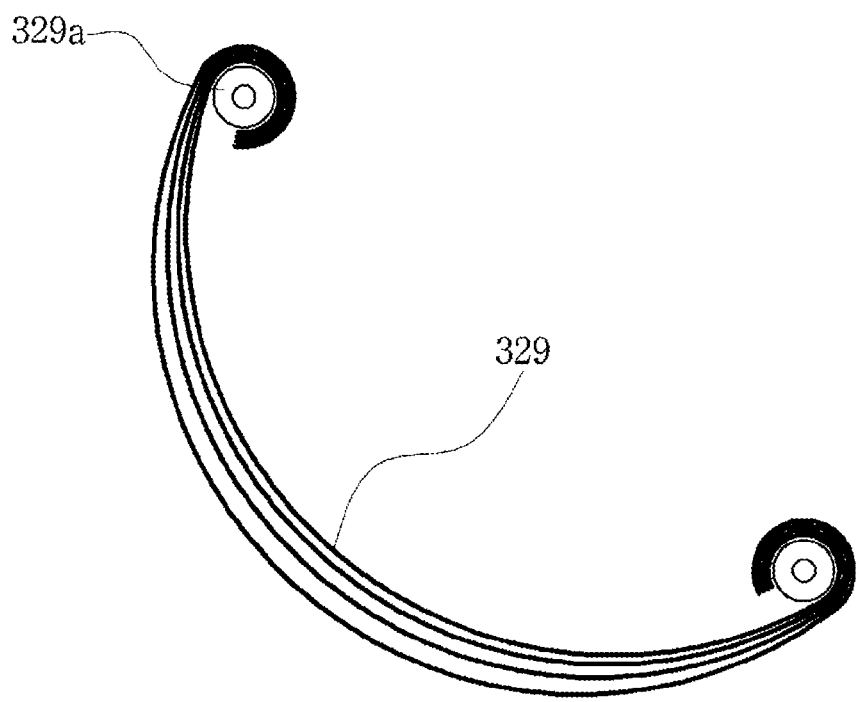

FIGS. 110 and 111 show examples of a spring assembly in which plural wire springs having a semicircular shape are connected so as to be compressed and expanded. That is, plural wire springs 329b having a semicircular shape are connected with a rotational hinge 329c to form a rotatable joint and fixing portions 329a and 329b are disposed at both ends thereof.

One of the fixing portions 329a and 329d is fixed to the plate 310 and the other is fixed to the bottom plate 330. When a force is applied to the plate 310 and the bottom plate 330 to slide, the wire springs 329b are compressed. When the force is released, the wire springs 329c are expanded to restore the positions of the plate 310 and the bottom plate 330.

FIG. 111 shows another example of the semicircular spring assembly. The example shown in FIG. 111 is used when the moving distance of two panel housings is great.

Embodiment 10

FIGS. 112 to 118 are diagrams illustrating other examples of the sliding structure.

Among these, FIGS. 112 to 115 show the principle of sliding movement. The spring assembly 320 connected to the plate 310 is coupled to the bottom plate (the connection to the bottom plate of the upper panel housing is not shown but the principle of the examples shown in FIGS. 94 to 103 can be applied) so that the upper panel housing 20 and the lower panel housing 40 horizontally slide.

At this time, the spring assembly repeats the expansion and restoration or the compression and restoration and is formed of a spring so as to enable the sliding with its elastic force.

A support plate 340 is further provided. The support plate 340 and the plate 310 is incorporated into a body and can move together. The shape of the support plate 340 is obtained by modifying the shape of the protrusion plate 76 shown in FIGS. 92 and 93.

The support plate 340 is mounted on the inside of the lower panel housing 40 and is configured to slide from the lower panel housing so that a part thereof protrudes externally. At this time, the principle in which the support plate 340 slides out from the inside of the lower panel housing 40 is the same as the principle in which the plate 310 and the spring assembly 320 move. Alternatively, a typical guide structure and a spring may be employed.

The principle in which the support plate 340 moves in this embodiment is not described, because the principle of the previously-mentioned embodiments can be employed.

At this time, when a part of the support plate 340 protrudes from the lower panel housing, a structure supporting the support plate 340 can be obtained. The structure of the lower panel housing shown in FIGS. 85 to 88 can be employed as this structure.

Figure 112:
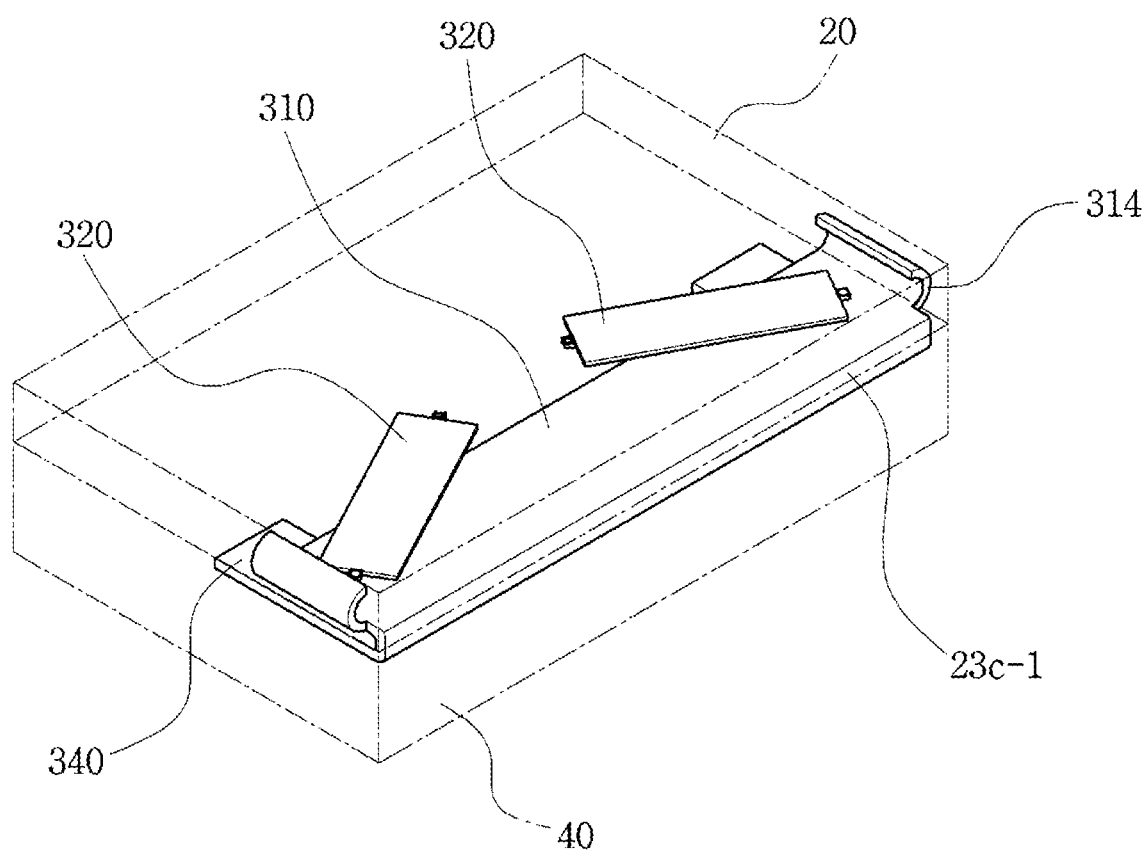
FIGS. 112 to 118 are diagrams illustrating other examples of the sliding structure.
Figure 113:
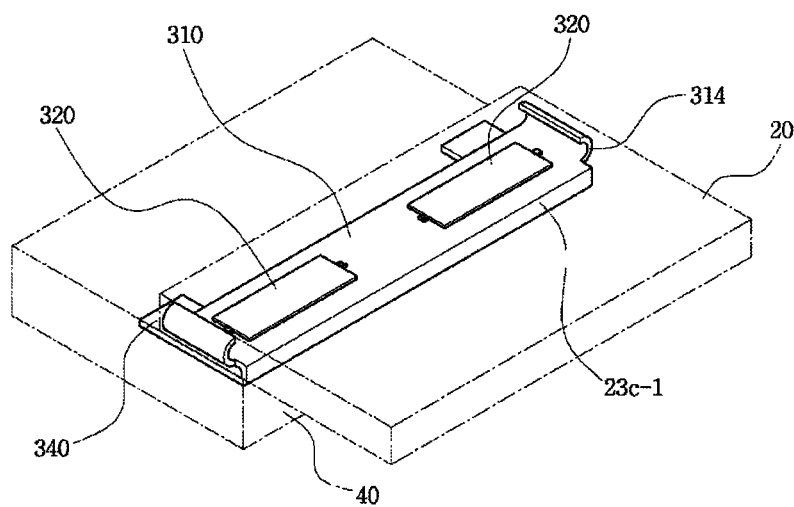

When a user of the display device pushes the upper panel housing 20 out of the stacked upper and lower panel housings (FIG. 112), the plate 310 moves, the spring assembly 320 is compressed or expanded, and thus the upper and lower panel housings are stretched horizontally (FIG. 113).

Figure 114:
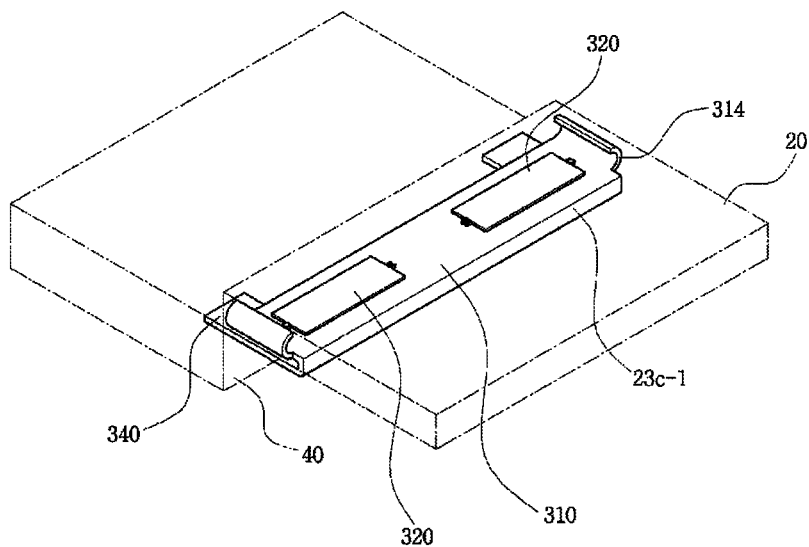

When the user additionally pushes the upper panel housing, the support plate 340 protrudes externally and thus the plate 310 coupled to the support plate protrudes form the boundary of the lower panel housing (FIG. 114). Here, when the support plate 340 protrudes from the panel housing, the spring mounted on the support plate is compressed or expanded.

Figure 115:
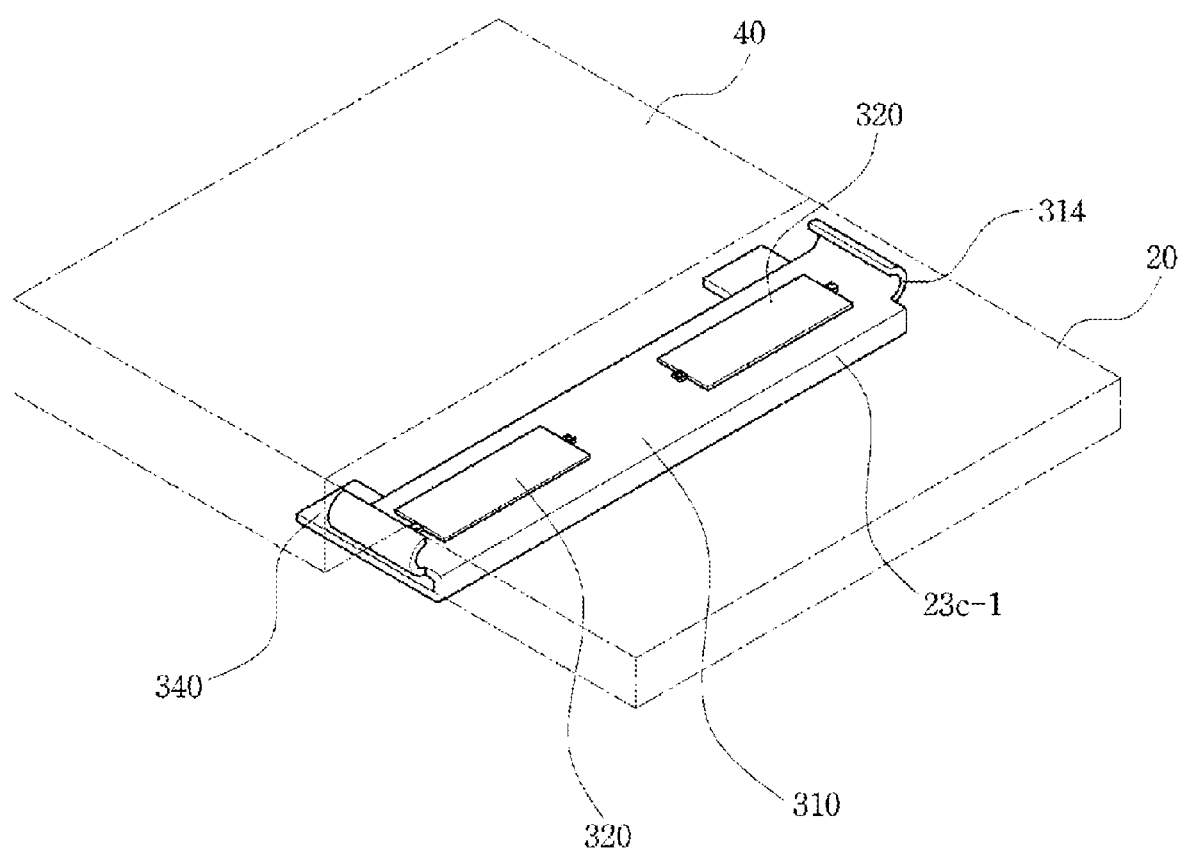

Then, when the user pushes the upper panel housing downward, the upper panel housing and the lower panel housing are flush with each other (FIG. 115). For this purpose, the support plate 340 moves downward in the lower panel housing 40, the plate 310 also moves downward, and thus the upper panel housing 20 supported by the plate 310 moves down.

The mechanism for causing the support plate 340 to move downward can be implemented by the use of the compression or expansion of a spring and movement guiding elements.

On the other hand, when the upper and lower panel housings are flush with each other, the flush state is maintained by the use of coupling means or locking means.

When the user of the display device releases the coupling means or the locking means, the spring used to cause the support plate 340 to move downward is restored and thus the upper panel housing moves over the lower panel housing. The springs of the support plates 340 and the plate 310 used to cause the upper panel housing to horizontally move are restored and thus the upper and lower panel housings are stacked in the original state.

Figure 116:
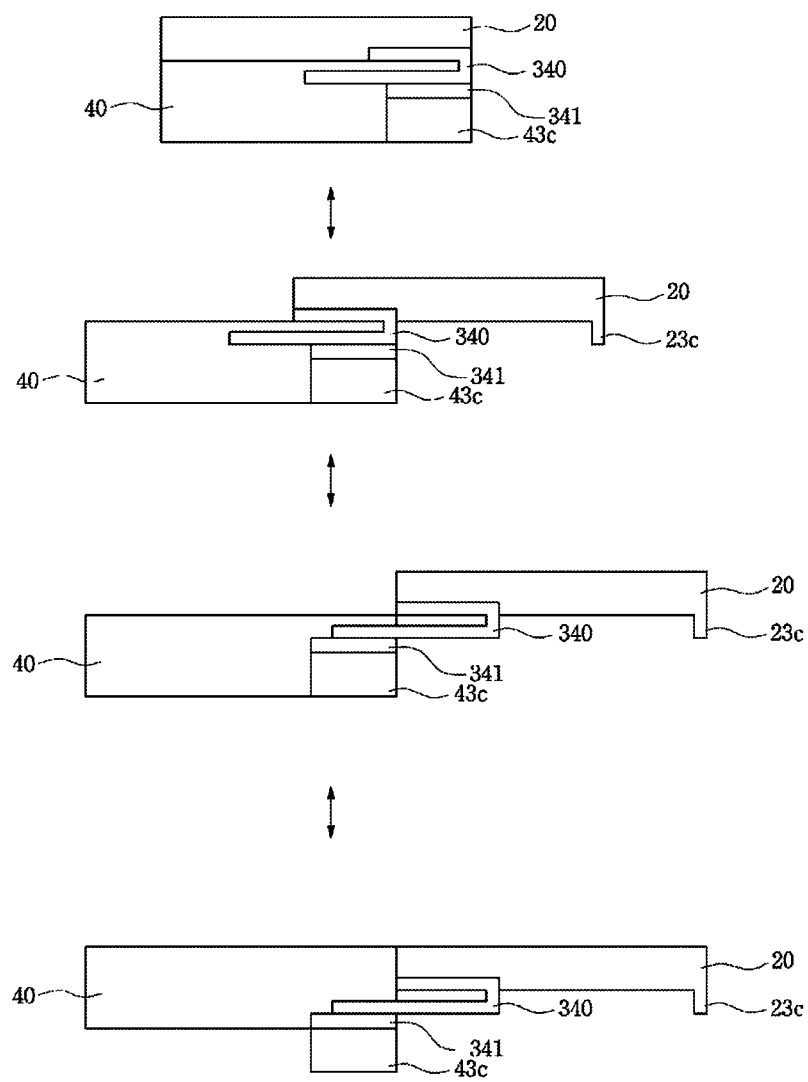

FIG. 116 is a diagram illustrating the principle in which the upper and lower panel housings move by the use of the movement of the side surfaces. Here, moving means 341 used to cause the support 43C supporting the support plate 340 and the support plate 340 to move is provided. The moving means 341 employ an element having the principle in which the plate and the bottom plate move through the use of the spring assembly.

On the other hand, when the panel housings 20 and 40 are stretched and then move vertically, the height of one panel housing needs to be reduced so as to reduce the distance of vertical movement. The structure of this thinner panel housing may employ the example shown in FIGS. 53 and 58.

Figure 117:
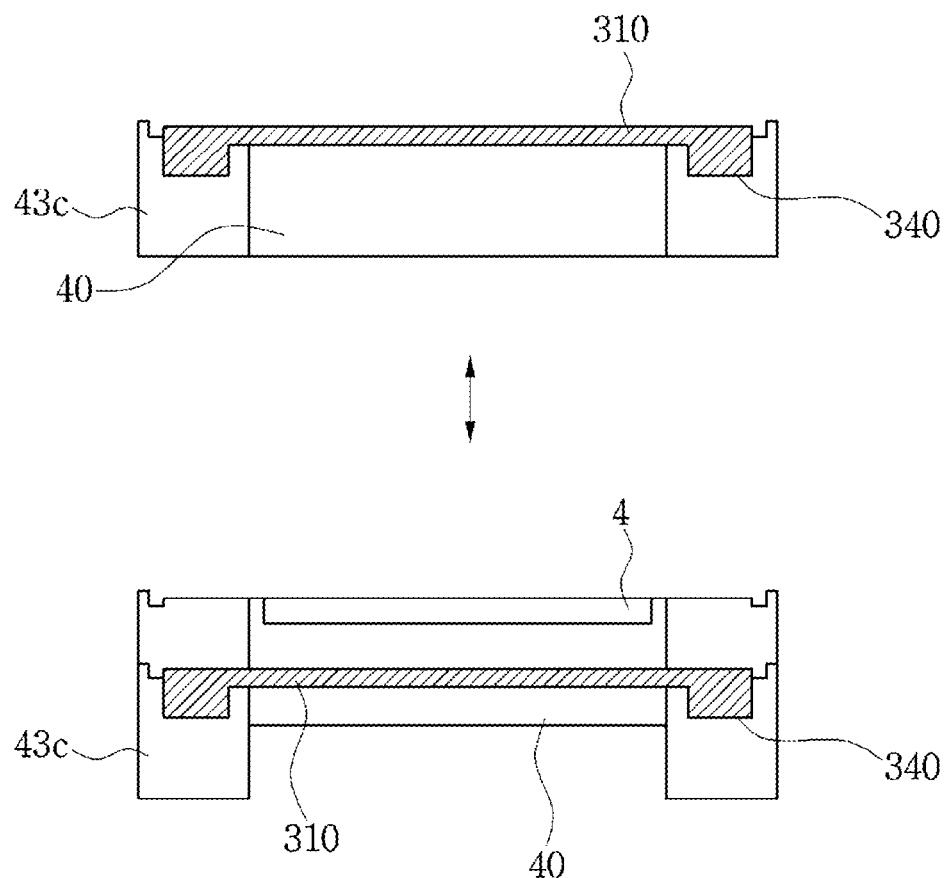
Figure 118:
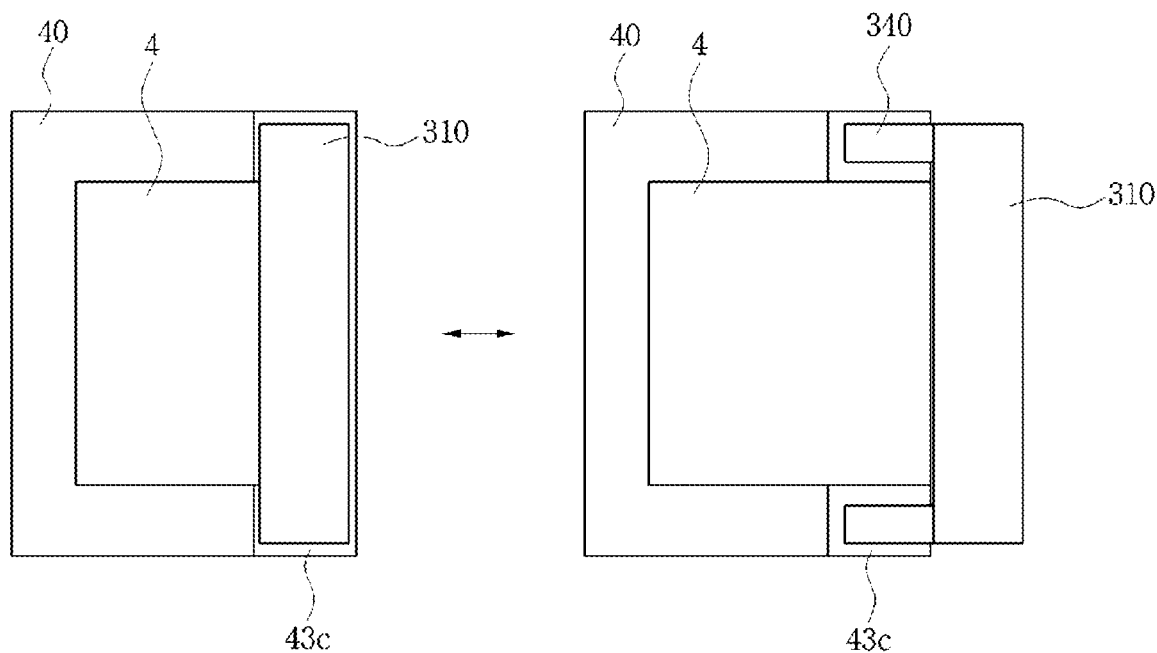

FIGS. 117 and 118 are diagrams schematically illustrating the state of the lower panel housing, to which the shape of the protrusion plate 76 shown in FIGS. 92 and 93 is modified. In FIG. 117, the plate 310 and the support plate 340 are coupled into a single body and the support plate 340 moves downward with the downward movement of the support 43C. In FIG. 117, the intermediate part of 23c in FIG. 112 is removed.

Therefore, in FIG. 117 in which the intermediate part of 23c is removed, the lid 23 described with reference to FIG. 37 should be provided to the upper panel housing. The lid should have the same application as the lid 23 shown in FIG. 37.

FIG. 118 is a diagram illustrating a state where the support plate 340 and the plate 310 move out of the boundary of the lower panel housing. By employing the structure in which the plates move outward, the upper panel housing moves downward.

Figure 119:
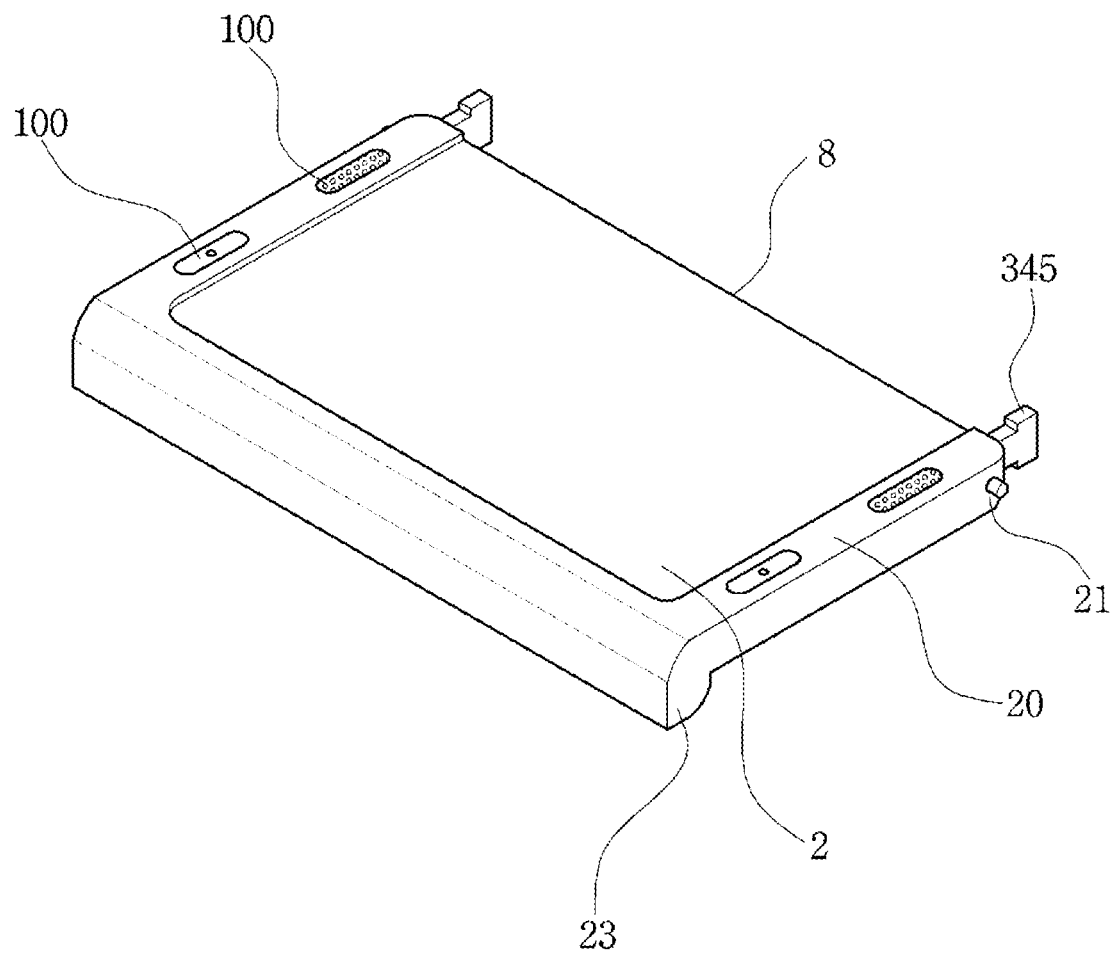
FIGS. 119 and 120 are diagrams illustrating an example where an extension is provided.
Figure 120:
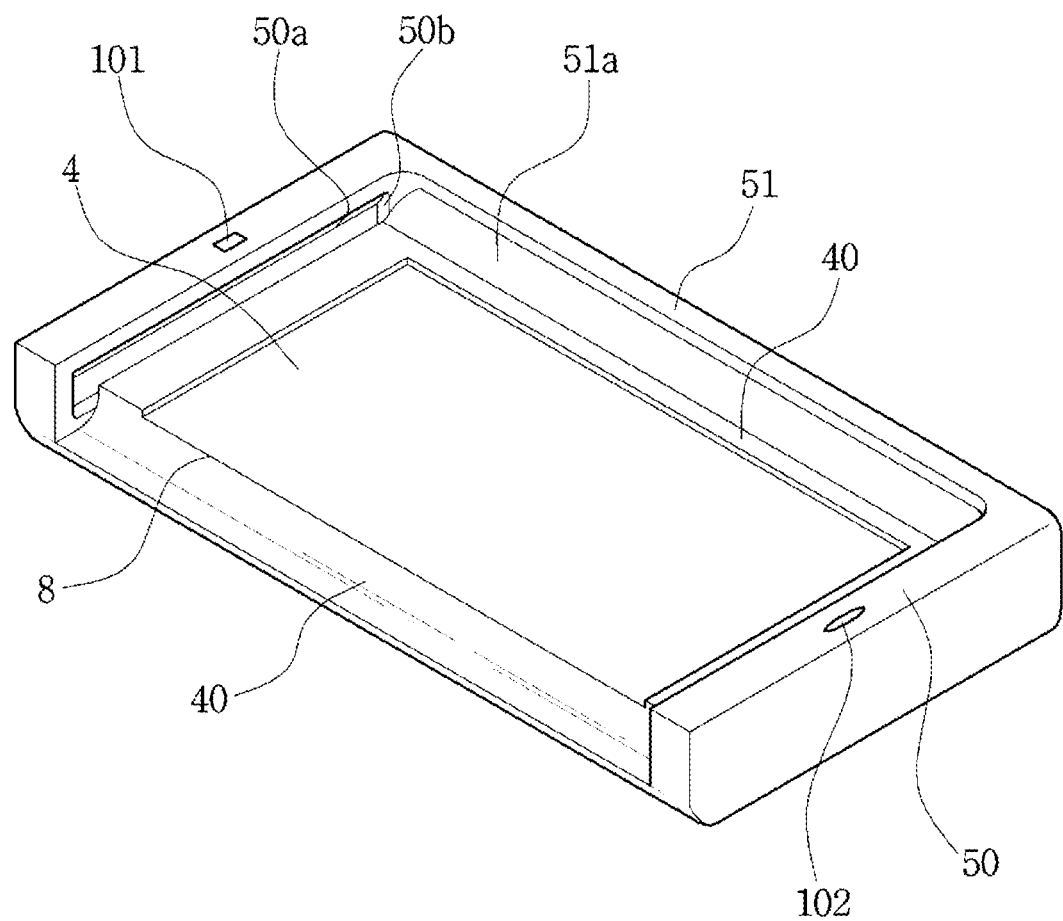

FIGS. 119 and 120 are diagrams illustrating an example where an extension is provided.

The display device employs the examples shown in FIGS. 32 to 40 and further includes an extension 345 protruding outward from the boundary of the panel housings. The extension serves to more strongly support the upper and lower panel housings in the state where they are flush with each other.

Here, the extension 345 is configured to slide within both side surfaces of the upper panel housing 20 through the use of a spring and guiding means. Accordingly, the extension 345 goes in the upper panel housing in the state where the upper panel housing and the lower panel housing are stacked, and the extension 345 goes out in the state where they are stretched.

Figure 121:
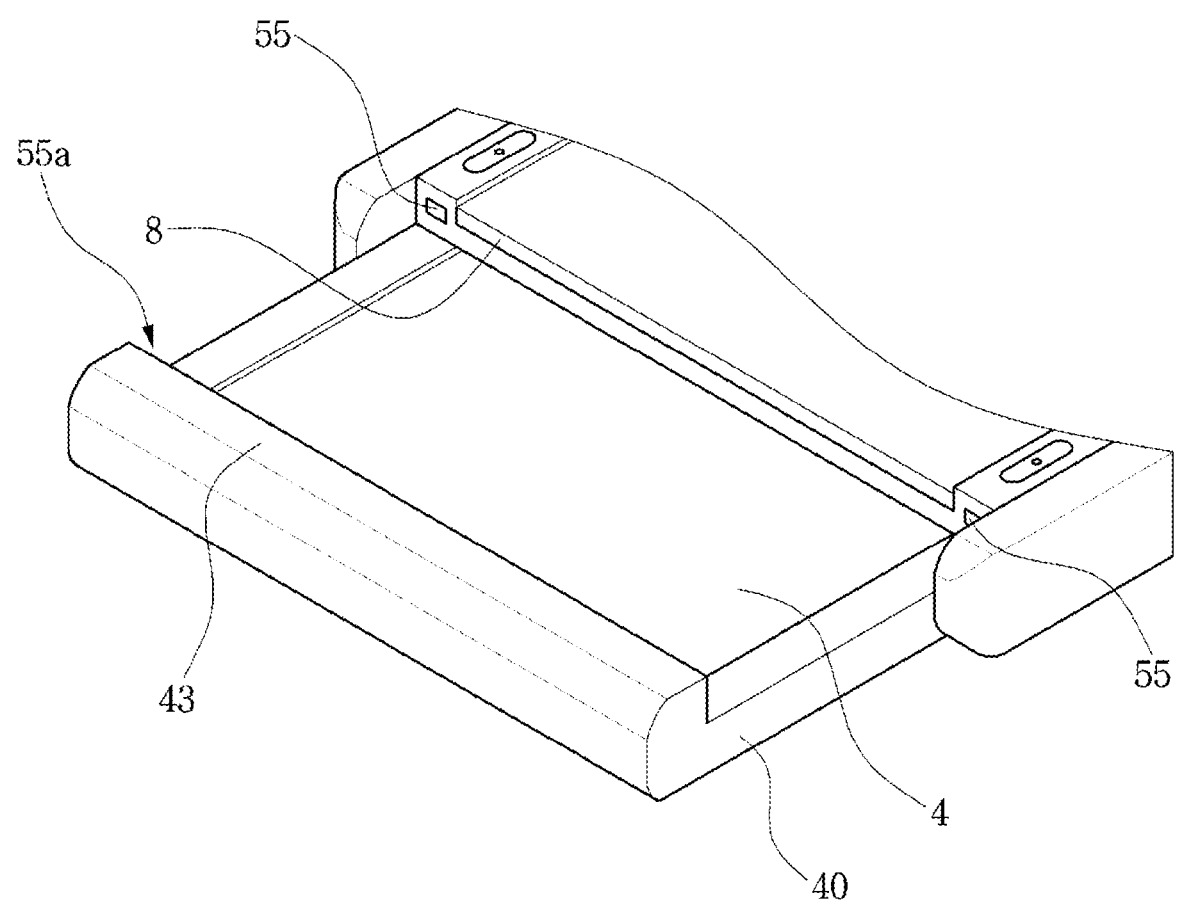
FIG. 121 is a diagram illustrating an example of coupling means.

FIG. 121 is a diagram illustrating an example of the coupling means.

In the state where the upper panel housing and the lower panel housing are stretched and then are flush with each other, the coupling means 55 and 55a or the locking means 55 and 55a for maintaining the state are exemplified.

In the drawing, when the upper and lower panel housings are stretched to be flush with each other, a protrusion or a groove is formed at a position where they come in contact with each other to provide a coupling and supporting force. In FIG. 121, the positions of the coupling means or locking means 55 and 55a are shown but are not limited thereto as long as they are positions where the upper panel housing and the lower panel housing come in contact with each other.

The object of the invention can be achieved by employing a structure having a groove and a protrusion which engage with each other.

Figure 122:
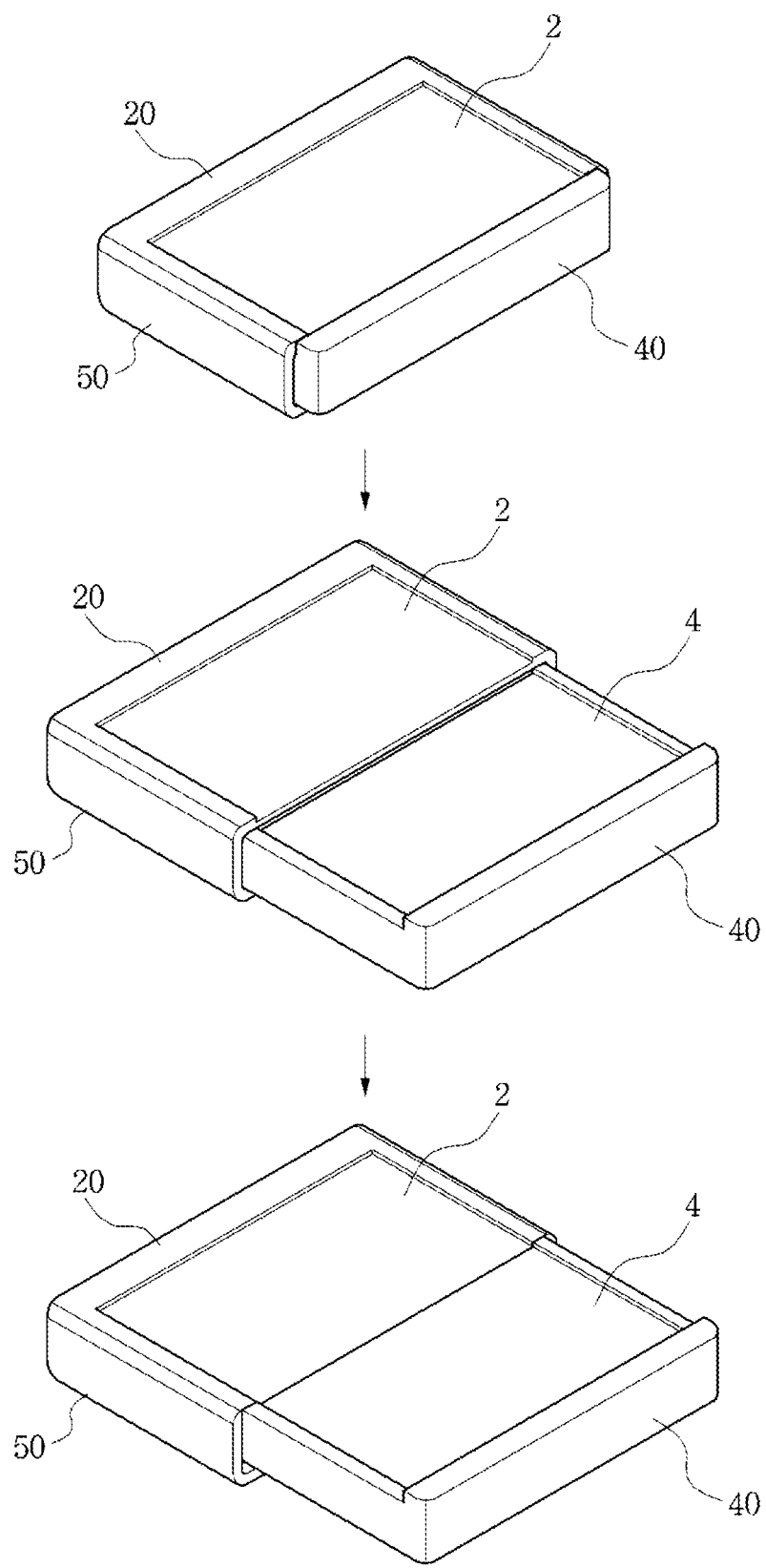
FIGS. 122 and 123 are diagrams illustrating other examples where the lower panel housing moves.
Figure 123:
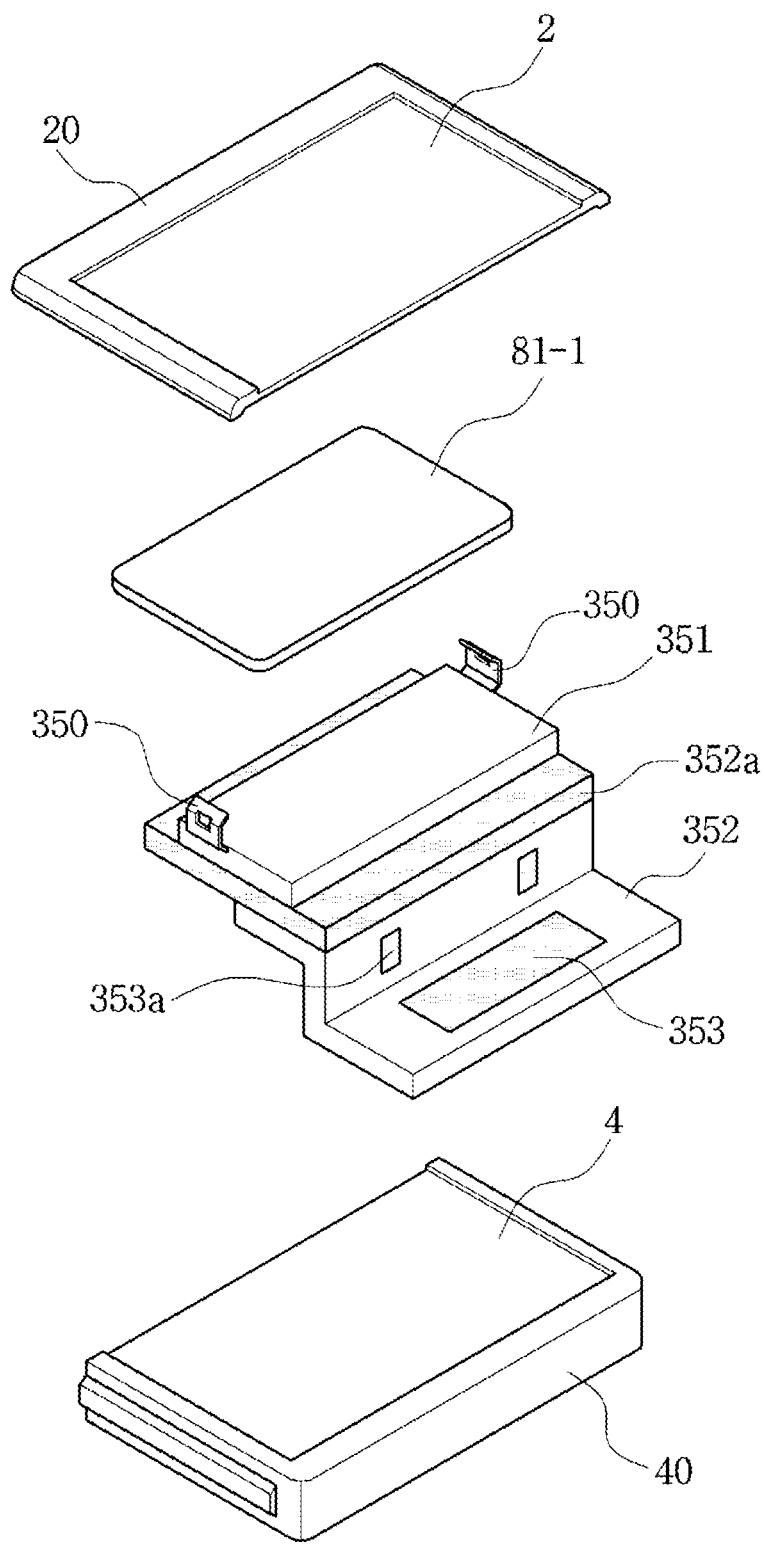

FIGS. 122 and 123 are diagrams illustrating another example where the lower panel housing moves.

FIG. 122 shows the principle in which the lower panel housing 40 in the housing 50 horizontally slides and the moves upward to stretch two panel housings.

FIG. 123 shows the principle of the movement, where a bottom plate 81-1 is disposed below the upper panel housing and the fixing groove 350 moves through both side protrusions of the bottom plate 81-1.

The support plate 351 into which the fixing groove 350 is incorporated includes an extending support plate 352. That is, the extending support plate 352 is further stretched and thus the lower panel housing 40 goes out of the boundary of the upper panel housing 20. The lower panel housing 40 moves upward through the use of springs 353 and 353a. Moving means 352a is a spring assembly enabling the support plate 351 and the extending support plate 352 to horizontally move.

That is, the bottom plate 81-1 and the fixing groove 350 are used to allow the lower panel housing 40 to move horizontally. The support plate 351 and the extending support plate 352 are used to allow the lower panel housing 40 to go out of the boundary of the upper panel housing 20. The springs 353 and 353a are used to allow the lower panel housing 40 going out to move upward.

In the example shown in FIGS. 112 to 118, the springs are expanded or compressed when the panel housings 20 and 40 are stretched to be flush with each other (FIG. 115), and the springs are restored when the panel housings are stacked (FIG. 112). On the contrary, in the example shown in FIGS. 1122 and 123, the springs are expanded or compressed when the panel housings are stacked, and the springs are restored when the panel housings are stretched.

Therefore, in the example shown in FIGS. 112 to 118, when the panel housings 20 and 40 are stretched to be flush with each other, this state is maintained through the use of the locking means or the coupling means (description with reference to FIG. 121). However, in FIGS. 122 and 123, when two panel housings are stacked, this state is maintained through the use of the locking means or the coupling means (description with reference to FIG. 121).

By reversing the expanded, compressed, and restored states of the springs, the springs may be restored when the panel housings are stretched in FIGS. 112 to 118. That is, the locking means or the coupling means are disposed at the positions where the upper and lower panel housings come in contact with each other when the springs are compressed or expanded, thereby locking both panel housings.

The operation of the coupling means or the locking means can be seen from the movement of the two panel housings in FIG. 107. That is, two panel housings come in contact with each other after they are slightly separated. At this time, the locking operation of the locking means or the coupling means is also performed.

The invention claimed is:

1. A portable display device comprising:
    at least two panel housings that are vertically stacked; and
    displays that are mounted on the panel housings, respectively,
    wherein the upper display is activated when the two panel housings are stacked, and the displays are contiguous to each other when the two panel housings are stretched, and
    wherein when the displays are contiguous to each other, the distance between the displays is in the range of 0.1 mm to 5 mm and the distance between input units, which are mounted on the displays, respectively, is in the range of 0.1 mm to 5 mm,
    wherein when the panel housings slide, a plate-like structure formed of metal or alloy supports the panel housings to slide.

2. The portable display device according to claim 1, wherein one of the two panel housings is thinner than the other.

3. The portable display device according to claim 2, wherein the corresponding display is mounted directly on the bottom of the thinner panel housing.

4. The portable display device according to claim 1, wherein when the two panel housings are similar to each other in thickness, a battery and a main controller are mounted on the different panel housings.

5. The portable display device according to claim 1, wherein when a mask print is formed on the input units, the mask print has a "⊂" shape.

6. The portable display device according to claim 1, wherein when a " -shaped" mask print is formed on the input units, a part close to a joint has a smaller width.

7. The portable display device according to claim 1, wherein when a part of the input units to which information is input is defined as an active area, the active area is formed closer to one side of a joint than the other side of the joint.

8. The portable display device according to claim 7, wherein the distance between the active area of the input units and the boundary of the input units in the joint is in the range of 2.5 mm to 3.5 mm.

9. The portable display device according to claim 1, wherein a protrusion is formed between the displays and the corresponding input units to support the corresponding input units.

10. The portable display device according to claim 1, wherein an intermediate plate is disposed between the displays and the corresponding input units to support the corresponding input units.

11. The portable display device according to claim 10, wherein the intermediate plate is transparent.

12. The portable display device according to claim 1, further comprising a driver that drives the displays,
    wherein when the joint of the respective displays is located on the right side, the driver is located on the upper side or lower side thereof.

13. The portable display device according to claim 12, further comprising supply lines that connect the driver and electrodes in the respective displays,
    wherein more of the supply lines are disposed on the side opposite to the joint than the side of the joint.

14. The portable display device according to claim 12, further comprising supply lines that connect the driver and electrodes in the respective displays,
    wherein the supply lines are disposed on the side opposite to the joint.

15. The portable display device according to claim 1, further comprising a connector that connects the displays,
    wherein the connector is disposed on the side opposite to the joint.

16. The portable display device according to claim 1, wherein a first input unit outputs a control signal corresponding to a first display and a second input unit outputs a control signal corresponding to a second display so as to use the two input units as a single input unit.

17. The portable display device according to claim 1, wherein a speaker and a microphone for telephone conversation are provided to the upper panel housing in a state where the two panel housings are stacked.

18. The portable display device according to claim 1, wherein a button image is displayed on the display mounted on the upper panel housing in a state where the two panel housings are stacked.

19. The portable display device according to claim 18, wherein when the two panel housings are stretched, an input keyboard image is displayed on one display.

20. The portable display device according to claim 1, wherein the plate-like structure is movable outward from the boundary of the lower panel housing.

21. The portable display device according to claim 20, wherein the plate-like structure moving outward from the boundary of the lower panel housing moves downward and the upper panel housing moves down accordingly, so that the display of the upper panel housing and the display of the lower panel housing are flush with each other.

22. The portable display device according to claim 1, wherein the plate-like structure slides through the use of a spring assembly that can be compressed or expanded.

23. The portable display device according to claim 1, further comprising a sensor that is used to determine whether the panel housings are in a stacked stated.

24. The portable display device according to claim 23, wherein a keyboard type to be displayed on a screen is switched depending on whether the two panel housings are in a stacked state or in a stretched state.

25. The portable display device according to claim 1, further comprising a sensor that is used to determine whether the panel housings are in a stacked stated,
wherein a keyboard type when the panel housings are in a stacked state and a keyboard type when the panel housings are in a stretched state are selectively displayed on the basis of the sensing result of the sensor.

\* \* \* \* \*